US009286770B2

(12) United States Patent
Lawver et al.

(10) Patent No.: US 9,286,770 B2
(45) **Date of Patent: *Mar. 15, 2016**

(54) AUTOMATED BANKING SYSTEM WITH COIN HOLDER AND ELECTRICALLY CONDUCTIVE TRACE

(71) Applicant: Diebold Self-Service Systems Division of Diebold, Incorporated, North Canton, OH (US)

(72) Inventors: Mike Lawver, Dover, OH (US); Steven R. Davis, North Lawrence, OH (US); Mark A. Douglass, North Canton, OH (US); Neil Gromley, Kensington, OH (US); Timothy M. Dewell, Fairlawn, OH (US)

(73) Assignee: Diebold Self-Service Systems Division of Diebold, Incorporated, North Canton, OH (US)

( * ) Notice: Subject to any disclaimer, the term of this patent is extended or adjusted under 35 U.S.C. 154(b) by 181 days.

This patent is subject to a terminal disclaimer.

(21) Appl. No.: 14/502,528

(22) Filed: Sep. 30, 2014

(65) Prior Publication Data

US 2015/0015397 A1 Jan. 15, 2015

Related U.S. Application Data

(63) Continuation of application No. 13/745,928, filed on Jan. 21, 2013, now Pat. No. 8,844,807.

(60) Provisional application No. 61/632,345, filed on Jan. 23, 2012.

(51) Int. Cl.
*G06K 19/00* (2006.01)
*G07F 19/00* (2006.01)
*G08B 3/10* (2006.01)

(52) U.S. Cl.
CPC .............. *G07F 19/207* (2013.01); *G07F 19/00* (2013.01); *G07F 19/205* (2013.01); *G08B 3/10* (2013.01)

(58) Field of Classification Search
USPC .......................................... 235/435, 439, 451
See application file for complete search history.

(56) References Cited

U.S. PATENT DOCUMENTS 8,844,807 B1 * 9/2014 Lawver et al. ................ 235/379

* cited by examiner

*Primary Examiner* — Matthew Mikels
(74) *Attorney, Agent, or Firm* — Black McCuskey Souers & Arbaugh, LPA

(57) ABSTRACT

An automated banking machine operates responsive at least in part to data read from data bearing records. The automated banking machine operates to read card data from user cards and to cause a determination to be made that the read data corresponds to at least one of a user and account that is authorized to operate the machine. The machine operates responsive at least in part to the determination to perform a transaction function and to cause the account to be assessed an amount corresponding to the transaction function. The machine includes a housing including a currency holding area, and operates to generate signals responsive to unauthorized access to the currency holding area.

19 Claims, 47 Drawing Sheets

AUTOMATED BANKING SYSTEM WITH COIN HOLDER AND ELECTRICALLY CONDUCTIVE TRACE

CROSS REFERENCE TO RELATED APPLICATIONS

This application is a continuation of U.S. application Ser. No. 13/745,928, now U.S. Pat. No. 8,844,807, which claims benefit pursuant to 35 U.S.C. §119(e) of Provisional Application 61/632,345 filed Jan. 23, 2012. The disclosures of the aforementioned applications are incorporated herein by reference in their entirety.

TECHNICAL FIELD

This invention relates to automated banking machines that operate responsive to data read from user cards and which may be classified in U.S. Class 235, Subclass 379.

BACKGROUND

Automated banking machines may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user, to carry out at least one transaction which may be operative to transfer value to or from at least one account. A record of the transaction is often printed through operation of the automated banking machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, and other types of transactions. For purposes of this disclosure an automated banking machine, automated transaction machine or an automated teller machine (ATM) shall be deemed to include any machine that may be used to automatically carry out transactions involving transfers of value.

Automated banking machines may benefit from improvements.

OVERVIEW OF EXEMPLARY EMBODIMENTS

Described in an example embodiment herein is an automated banking machine, including at least one processor and a coin holder housing. The coin holder housing is configured to house a plurality of coins therein. The coin holder housing includes a coin removal opening, a door that is movable relative to the coin holder housing and is movable between a closed position wherein the door closes the coin removal opening and an open position wherein the door is disposed away from the coin removal opening. The coin holder housing further comprises a lock that is in operative connection with at least one of the coin holder housing and the door. The lock is changeable between locked and unlocked conditions. In the locked condition the door is held in the closed position responsive at least in part to the lock. The coin holder housing further comprises at least one electrically conductive trace. The at least one trace is in operatively attached connection to the at least one coin holder housing, and is in operative connection with at least one trace connected processor of the at least one processor. The at least one trace connected processor is operative to cause at least one output signal responsive at least in part to a changed condition of the at least one trace.

DESCRIPTION OF EXAMPLE EMBODIMENTS

Figure 1:
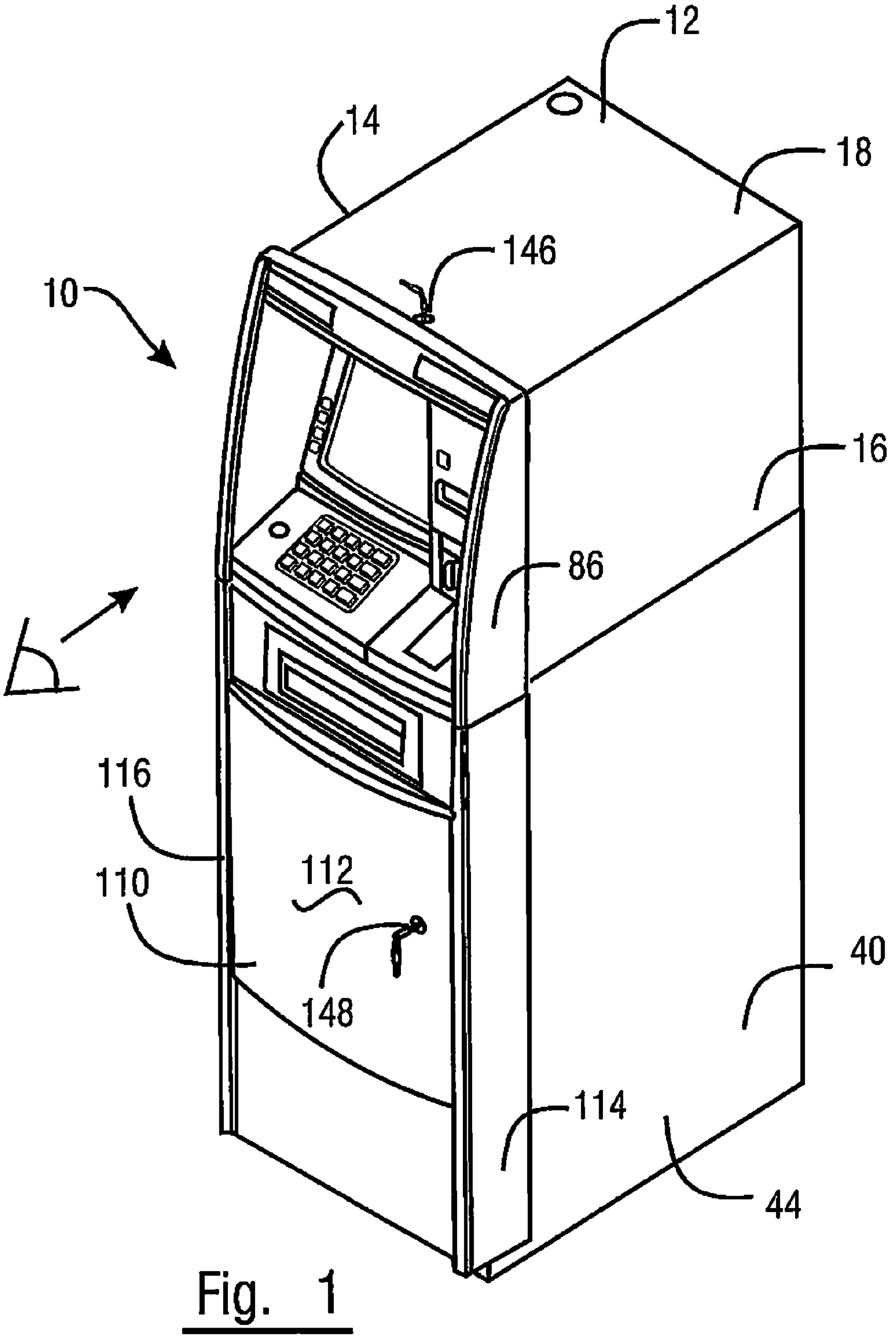
FIG. 1 is an isometric view of an automated banking machine of an exemplary embodiment.
Figure 2:
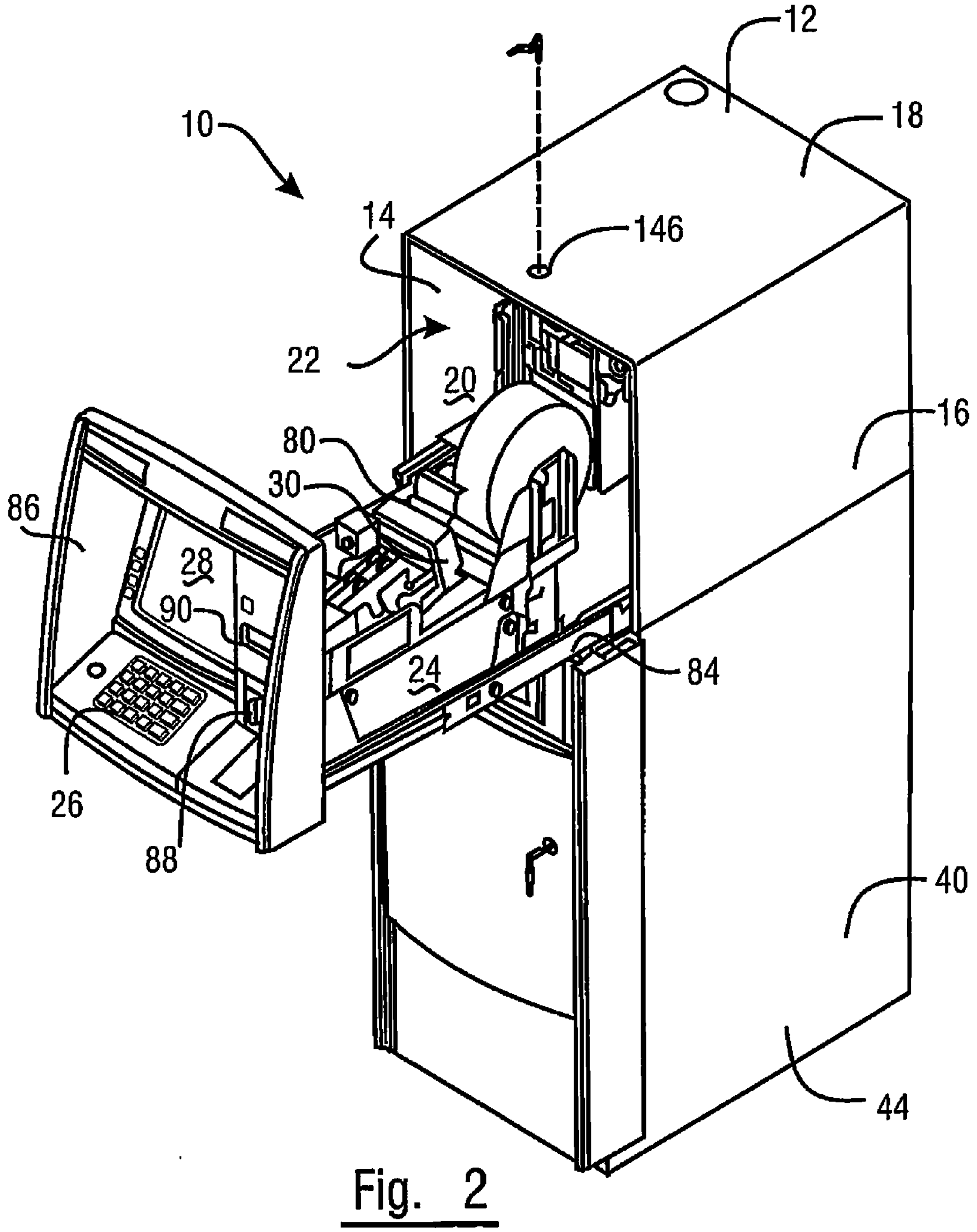
FIG. 2 is an isometric view of the automated banking machine of FIG. 1 with a rollout tray extended.

Referring now to the drawings, and particularly to FIGS. 1-2, there is shown therein an automated banking machine of a first exemplary embodiment, generally indicated 10. In this exemplary embodiment, automated banking machine 10 is an automated teller machine (ATM). Machine 10 includes a top housing 12 having side walls 14 and 16, and top wall 18. Housing 12 encloses an interior area indicated 20. Housing 12 has a front opening 22. In this exemplary embodiment, the rear of housing 12 is closed by a rear wall 19, shown in FIG. 7. However, in other embodiments, the rear of housing 12 may be accessible through an access door or similar device. Top housing 12 is used to house certain banking machine components such as input and output devices.

Figure 3:
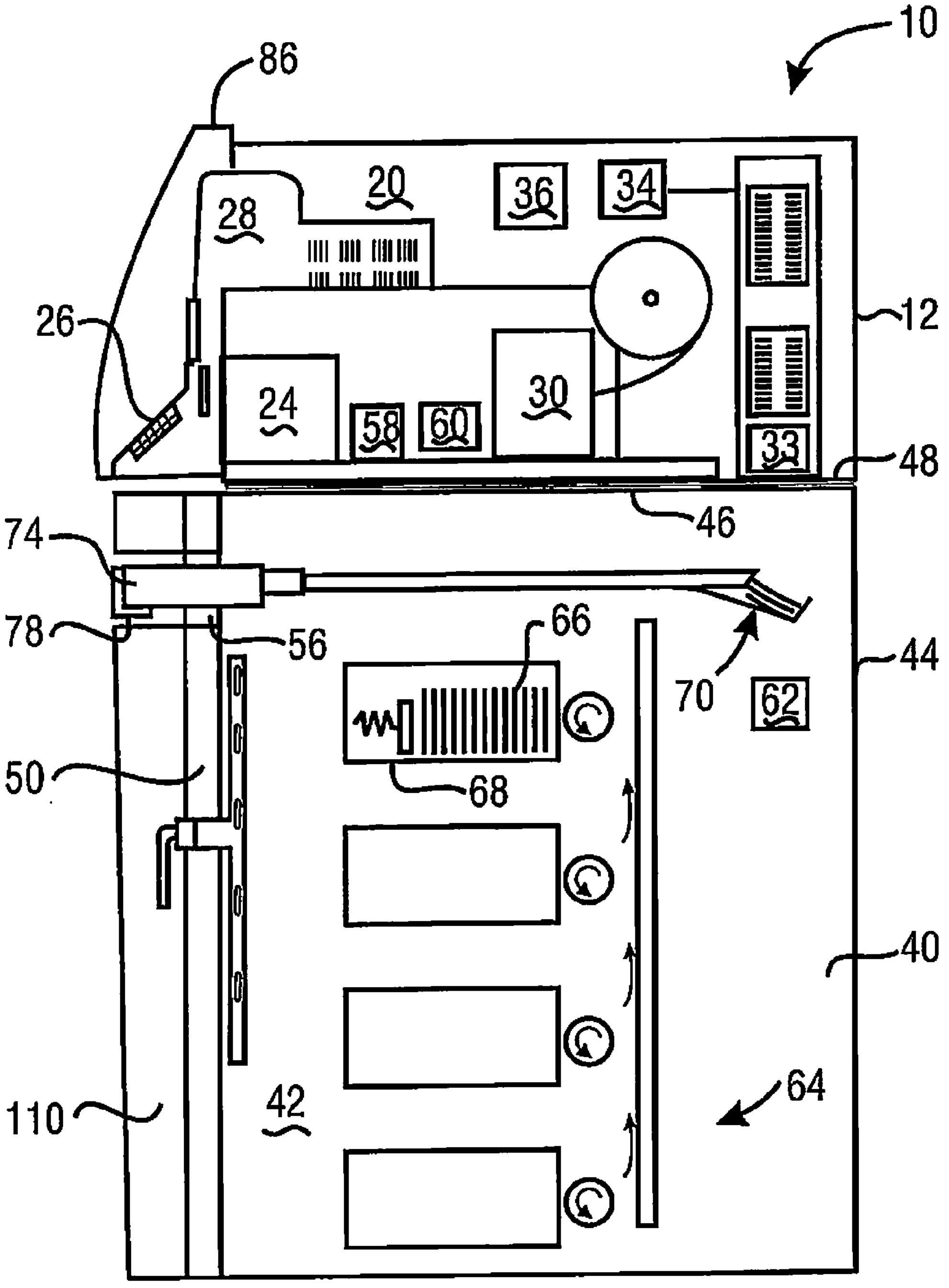
FIG. 3 is a side schematic view of an automated banking machine illustrating various banking machine components.

With reference to FIG. 3, in this exemplary embodiment the input devices include a card reader schematically indicated 24. Card reader 24 is operative to read a customer's card which includes indicia thereon. The indicia may correspond to information about the customer and/or information about a customer's financial account, such as the customer's account number. In some embodiments the card reader 24 may be a card reader adapted for reading magnetic stripe cards and/or so called "smart cards" which include a programmable memory. Other embodiments may read data from cards wirelessly such as radio frequency identification (RFID) cards. Exemplary embodiments may include features of the type discussed in U.S. Pat. No. 7,118,031 the disclosure of which is incorporated herein by reference in its entirety. Another input device in the exemplary embodiment includes input keys 26. Input keys 26 may in some embodiments, be arranged in a keypad or keyboard. Input keys 26 may alternately or in addition include function keys or other types of devices for receiving manual inputs. It should be understood that in various embodiments other types of input devices may be used such as biometric readers, speech or voice recognition devices, inductance type readers, infrared (IR) type readers, and other devices capable of communicating with a person, article or computing device, radio frequency type readers and other types of devices which are capable of receiving information that identifies a customer and/or their account.

The exemplary embodiment of machine 10 also includes output devices providing outputs to the customer. In the exemplary embodiment machine 10 includes a display 28. Display 28 may include an LCD, CRT or other type display that is capable of providing visible indicia to a customer. In other embodiments output devices may include devices such as audio speakers, radio frequency (RE) transmitters, IR transmitters or other types of devices that are capable of providing outputs which may be perceived by a user either directly or through use of a computing device, article or machine. It should be understood that embodiments may also include combined input and output devices such as a touch screen display which is capable of providing outputs to a user as well as receiving inputs.

The exemplary embodiment of the automated banking machine 10 also includes a receipt printer schematically indicated 30. The receipt printer is operative to print receipts for users reflecting transactions conducted at the machine. Embodiments may also include other types of printing mechanisms such as statement printer mechanisms, ticket printing mechanisms, check printing mechanisms and other devices that operate to apply indicia to media in the course of performing transactions carried out with the machine.

Automated banking machine 10 further includes one or more processors schematically indicated 33. Processor 33, alternately referred to as a computer or a controller, is in operative connection with at least one memory or data store which is schematically indicated 34. The processor 33 is operative to carry out programmed instructions to achieve operation of the machine in accomplishing transactions. The processor 33 is in operative connection with a plurality of the transaction function devices included in the machine.

The exemplary embodiment includes at least one communications device 36. The communications device 36 may be one or more of a plurality of types of devices that enable the machine to communicate with other systems and devices for purposes of carrying out transactions. For example, communications device 36 may include a modem for communicating messages over a data line or wireless network, with one or more other computers that operate to transfer data representative of the transfer of funds in response to transactions conducted at the machine. Alternately the communications device 36 may include various types of network interfaces, line drivers or other devices suitable to enable communication between the machine 10 and other computers and systems. Exemplary embodiments may include features like those disclosed in U.S. Pat. No. 7,266,526 the disclosure of which is incorporated herein by reference in its entirety.

ATM 10 further includes a safe or chest 40 enclosing a secure area 42. Secure area 42 is used in the exemplary embodiment to house critical components and valuable documents. Specifically in the exemplary embodiment secure area 42 is used for housing currency, currency dispensers, currency stackers, and other banking machine components. For purposes of this disclosure a cash dispenser shall include any mechanism that makes currency stored within the machine accessible from outside the machine. Cash dispensers may include features of the type disclosed in U.S. Pat. Nos. 7,261,236; 7,240,829; 7,114,006; 7,140,607 and 6,945,526 the disclosures of each of which are incorporated herein by reference in their entirety. Chest 40 includes a chest housing 44 including a top wall 46 having an upper surface 48 outside of the secure area 42. Top housing 12 is supported on the chest 40 such that the secure area 42 is generally below the interior area 20.

Chest 40 also includes a chest door 50 that is moveably mounted in supporting connection with the housing. Chest door 50, shown in the closed position in FIG. 4 and in an open condition in FIG. 5, is generally closed to secure the contents of the chest 40. In this exemplary embodiment, the chest door 50 is used to close a first opening 52 at a first end 54 of the chest housing 44. In other embodiments the chest opening and door may have other configurations. In the exemplary embodiment, chest door 50 includes a first device opening 56 therethrough and cooperates with mechanisms inside and outside the chest for passing currency or other items between a customer and devices located inside the chest 40.

Referring again to FIG. 3, machine 10 also includes a plurality of sensing devices for sensing various conditions in the machine. These various sensing devices are represented schematically by component 58 for simplicity and to facilitate understanding. It should be understood that a plurality of sensing devices is provided in the machine for sensing and indicating to the processor 33 the status of devices within the machine.

Exemplary automated banking machine 10 further includes a plurality of actuators schematically indicated 60 and 62. The actuators may comprise a plurality of devices such as motors, solenoids, cylinders, rotary actuators and other types of devices that are operated responsive to the processor 33. It should be understood that numerous components within the automated banking machine are operated by actuators positioned in operative connection therewith. Actuators 60 and 62 are shown to schematically represent such actuators in the machine and to facilitate understanding.

Machine 10 further comprises at least one currency dispenser mechanism 64 housed in secure area 42. The currency dispensing mechanism 64 is operative responsive to the processor 33 to pick currency sheets from a stack of sheets 66 housed in one or more canisters 68. The picked currency sheets may be arranged by a currency stacker mechanism 70 for presentation through a delivery mechanism 74 which operates to present a stack of note or other documents to a customer.

When chest door 50 is in the closed position, at least an end portion of a sheet delivery mechanism 74 extends through first opening 56 in the chest door 50. In response to operation of the processor 33, when a desired number of currency sheets have been collected in a stack, the stack is moved through delivery mechanism 74.

As the sheets are moved through delivery mechanism 74 toward the first opening 56, the controller 32 operates a suitable actuating device to operate a gate 78 so as to enable the stack of sheets to pass outward through the opening. As a result the user is enabled to receive the sheets from the machine. After a user is sensed as having removed the stack from the opening, the controller may operate to close the gate 78 so as to minimize the risk of tampering with the machine.

With reference to FIG. 2, in this exemplary embodiment the banking machine 10 further includes a rollout tray 80. Rollout tray 80 is moveably mounted in supporting connection with slides 84. The slides 84 enable movement of the rollout tray 80 between the extended position shown in FIG. 2 and a retracted position within the interior area 20 of the top housing 12. Rollout tray 80 in the exemplary embodiment may be similar to that shown in U.S. Pat. No. 6,082,616, the disclosure of which is incorporated herein by reference in its entirety.

Rollout tray 80 may have several upper banking machine components supported thereon including card reader 24, input keys 26, display 28, receipt printer 30, and other components as appropriate for the particular machine 10.

This exemplary embodiment further includes an upper fascia 86 in supporting connection with rollout tray 80. The upper fascia 86 may include user interface openings such as a card opening 88 through which a customer operating the machine 10 may insert a credit, debit or other card, or a receipt delivery slot 90 through which printed transactions receipts may be delivered to the customer. Rollout tray 80 moveably supports upper fascia 86 relative to the top housing 12 so that upper fascia 86 is movable between a first position covering the front opening and a second position in which the upper fascia is disposed from the front opening 22.

As illustrated in FIG. 1, in the operative condition of machine 10, the rollout tray 80 is retracted into the interior area 20 of the housing 12. Upper fascia 86 operates to close front opening 22 and provide an attractive appearance for machine 10, while allowing a customer to input information and receive outputs from machine 10.

Figure 6:
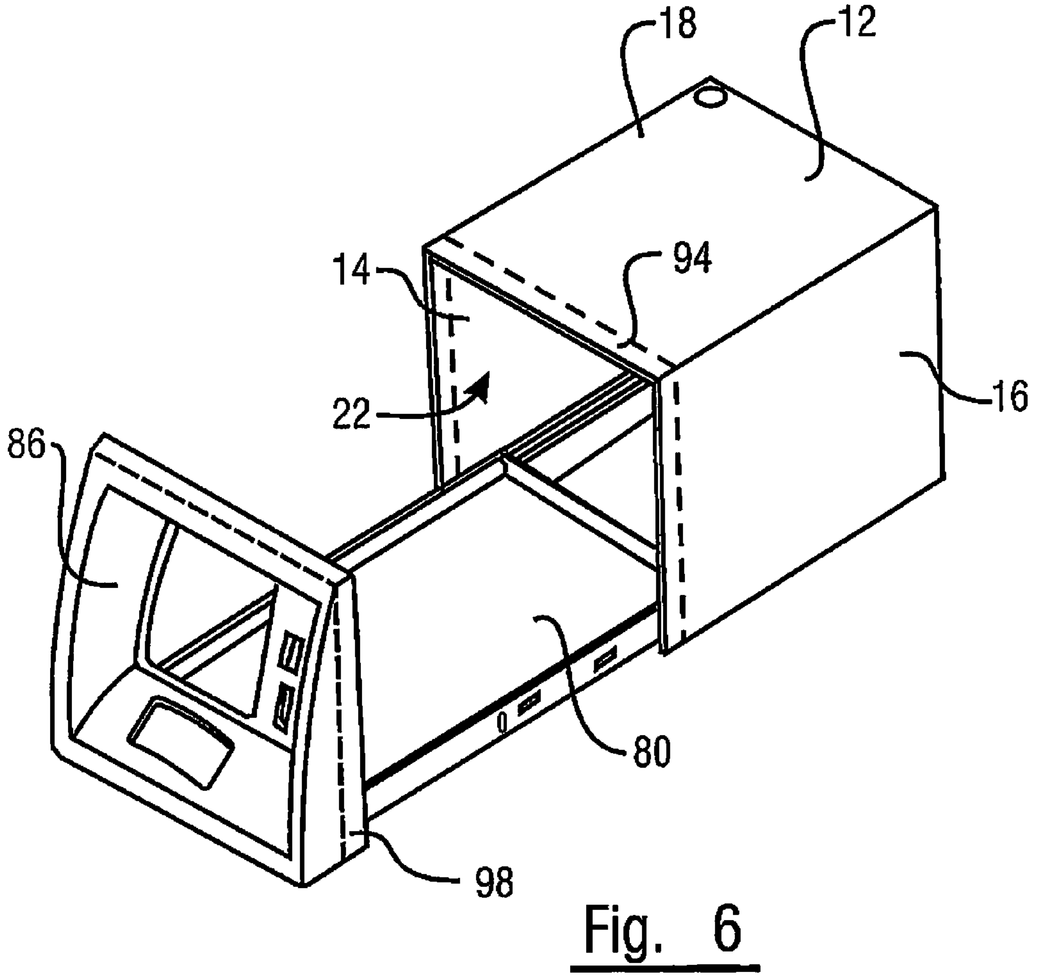
FIG. 6 is an isometric view of a top housing for an automated banking machine supporting a rollout tray in an extended position.

With reference to FIG. 6, in this exemplary embodiment, the forward-most parts of side walls 14 and 16 and top wall 18 of housing 12 define a forward region 94, shown in dashed lines, bounding the front opening 22. In this exemplary embodiment, upper fascia 86 includes a rearwardly extending portion 98, also shown in dashed lines. Rearwardly extending portion 98 is dimensioned to overlie in generally surrounding relation, the forward region 94 when rollout tray 80 is retracted and upper fascia 86 is in the first position. In some embodiments the rearwardly extending portion may be contoured or tapered so as to extend further inwardly with increasing proximity to the front of the fascia. Such tapered control may engage and help to close and/or align the fascia and the top housing 12.

Figure 7:
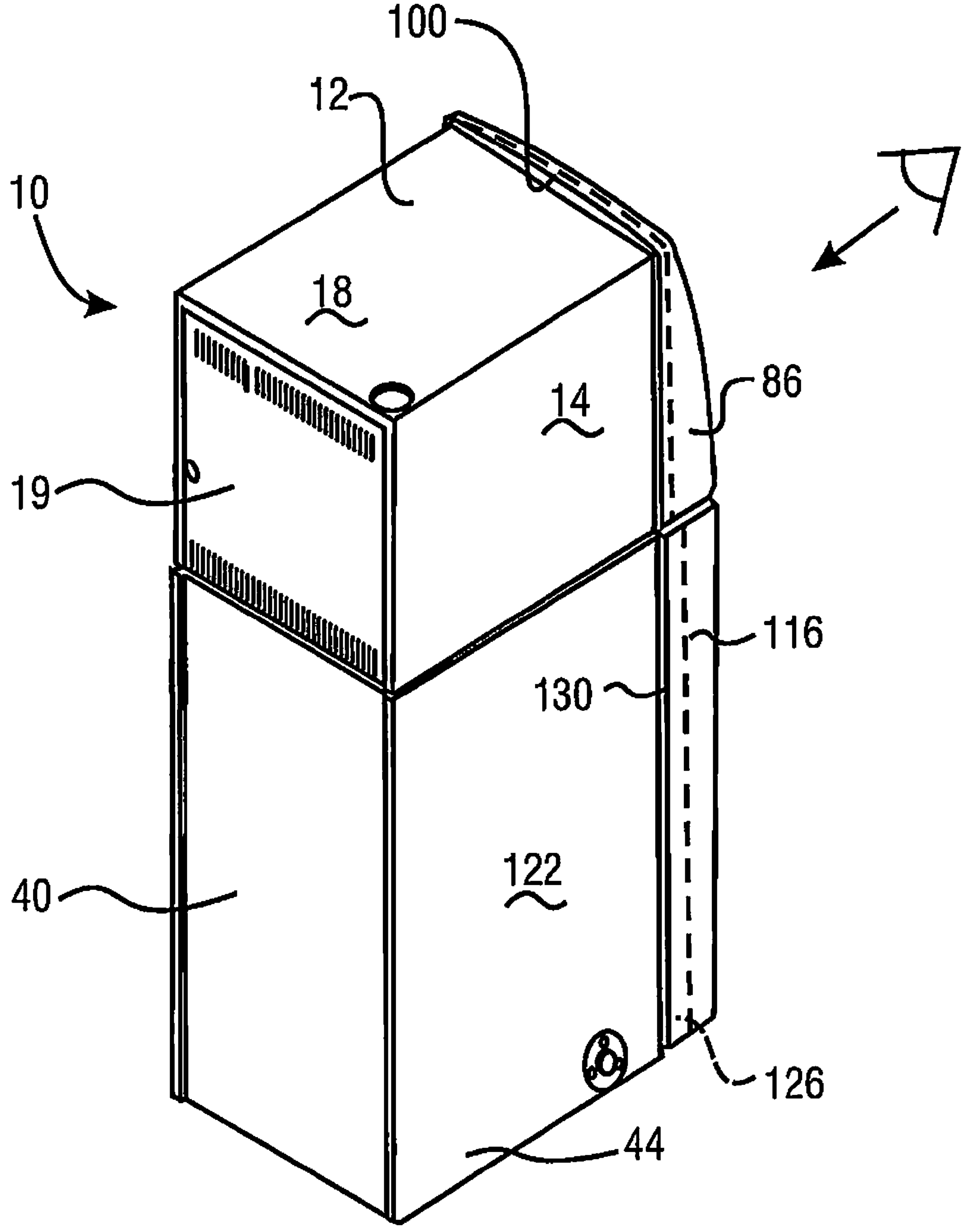
FIG. 7 is an isometric rear view of the automated banking machine of FIG. 1.

With reference to FIG. 7, when machine 10 is viewed from the rear, there may be a first gap 100 separating the rearwardly extending portion 98 of upper fascia 86 from the top housing 12. In some embodiments it may be desirable that first gap 100 be minimal to prevent unauthorized access to interior area 20. First gap 100 in the exemplary embodiment is not visible when machine 10 is viewed from the front.

In this exemplary embodiment, the upper fascia 86 is formed of a plastic material and the top housing 12 is formed of sheet metal. Alternately, the extending portion 98 or forward portion 94 shown in FIG. 6, or both, may include resilient materials to provide for engagement and sealing of the housing and the fascia in the closed position. However, other materials may be chosen, and these approaches are exemplary.

Figure 4:
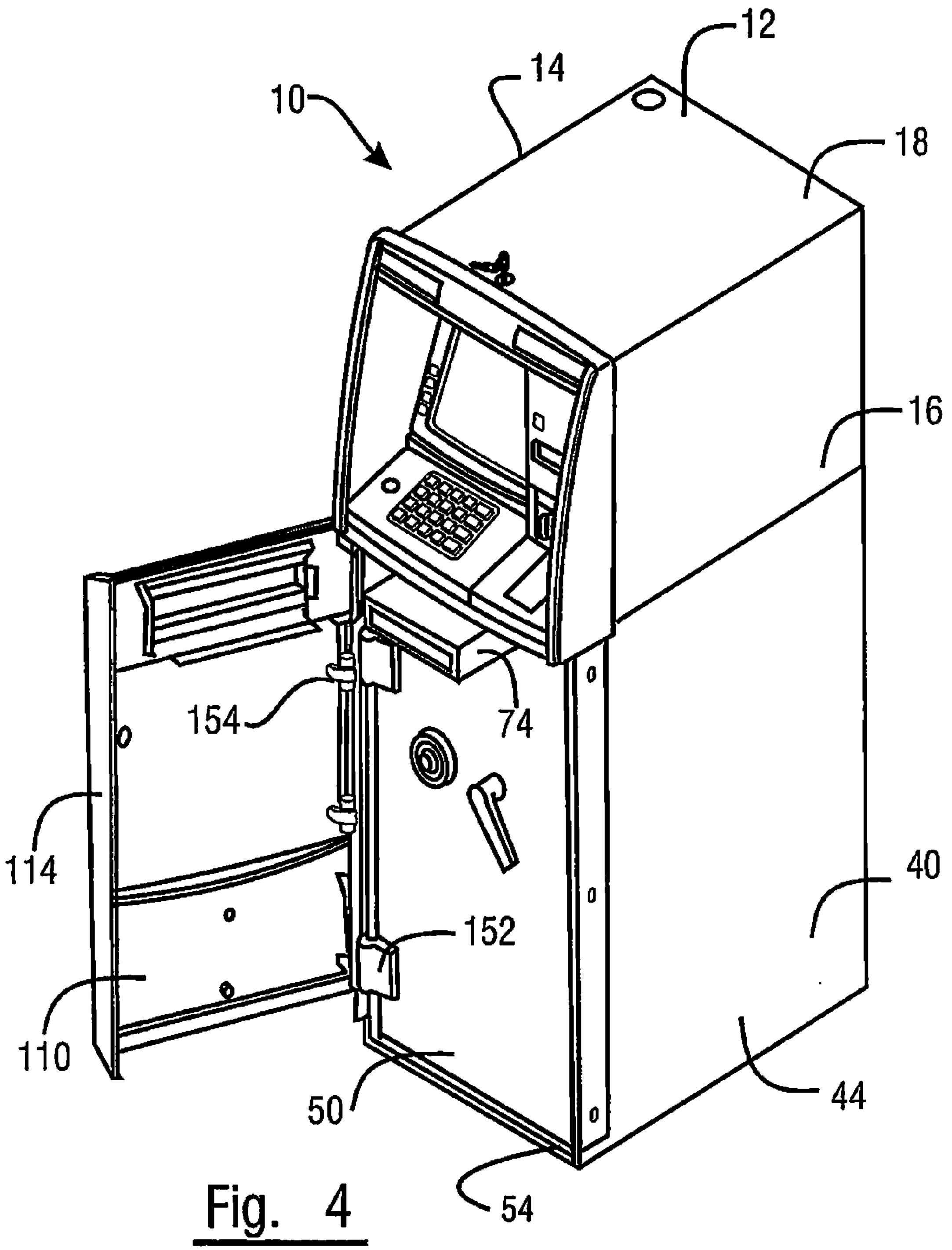
FIG. 4 is an isometric view of the automated banking machine of FIG. 1 with a lower fascia in an accessible position.
Figure 5:
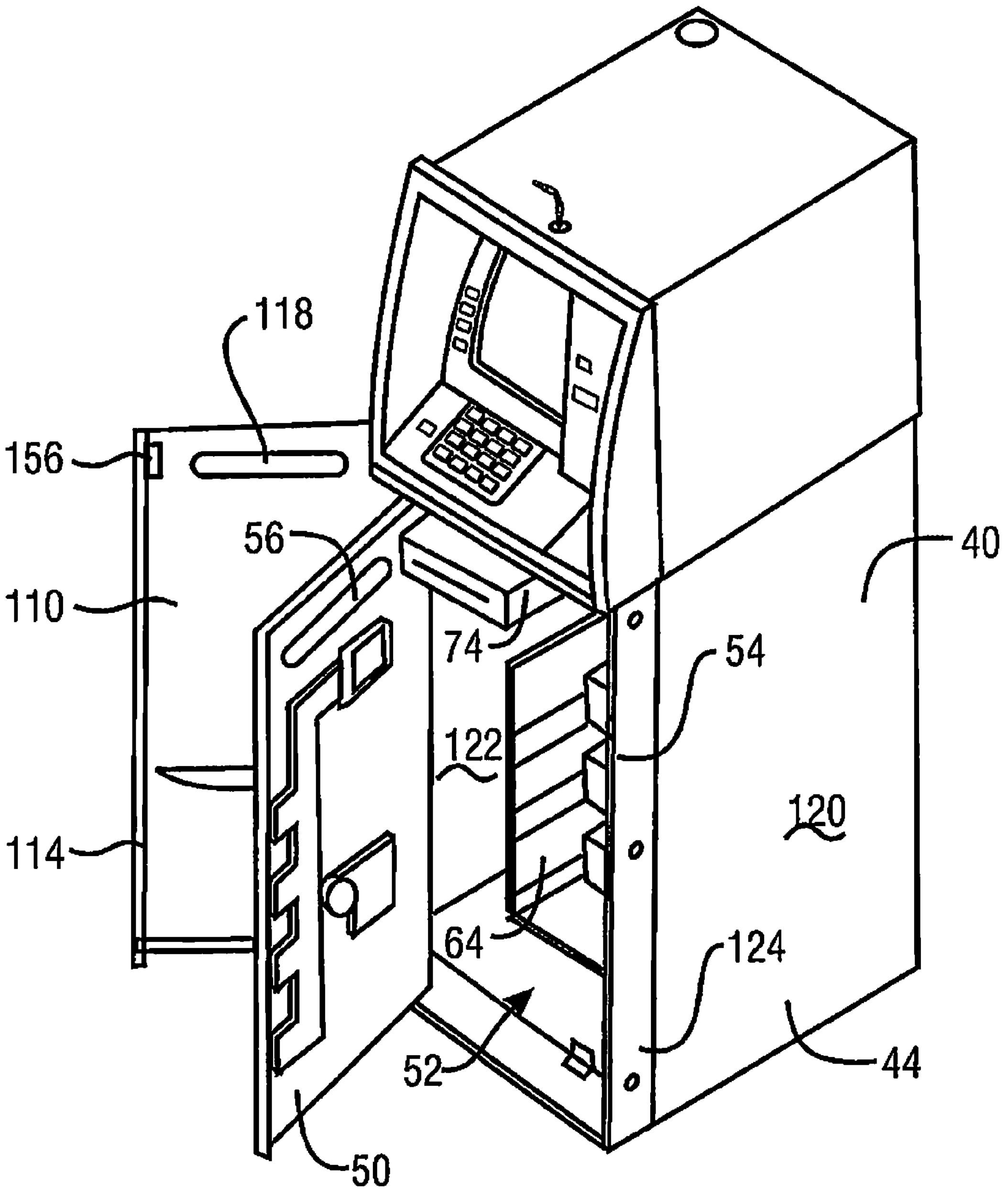
FIG. 5 is an isometric view of the automated banking machine of FIG. 1 with a lower fascia in an accessible position and a chest door in an open position.

With reference to FIGS. 1, 4 and 5, the exemplary embodiment further includes a lower fascia 110 moveably mounted on the chest housing 44. In this exemplary embodiment, lower fascia 110 is operable to move between a covering position as illustrated in FIG. 1, and an accessible position as illustrated in FIGS. 4-5. In other applications, it may be preferable to provide a selectively removable lower fascia, or other approaches to supporting the lower fascia on the chest portion.

The exemplary lower fascia 110 operates to cover the chest 40 to thereby provide a more attractive appearance to machine 10. In the exemplary embodiment, lower fascia 110 includes a front face 112 and first and second side extensions 114, 116, respectively.

In the exemplary embodiment, illustrated in FIGS. 5 and 7, chest housing 44 includes first and second side walls 120, 122, respectively. First side wall 120 includes a forward portion 124 and second side wall includes a forward portion 126 (shown in phantom in FIG. 7). When the chest door 50 is in the closed position and the lower fascia 110 is in the covering position, the first and second side extensions 114, 116, respectively, overlie forward portions 124, 126.

Thus, when machine 10 is viewed from the front (see FIG. 1), the lower fascia 110 covers the chest 40 from side to side. When machine 10 is viewed from the rear (see FIG. 7), a lower gap (not shown) between the first side extension 114 and the first side wall 120 of the chest housing 44 and a lower gap 130 between the second side extension and 116 the second side wall 122 may be visible, although such lower gaps are not viewable from the front of machine 10. In some applications, it may be desirable to minimize the lower gaps 130.

Figure 8:
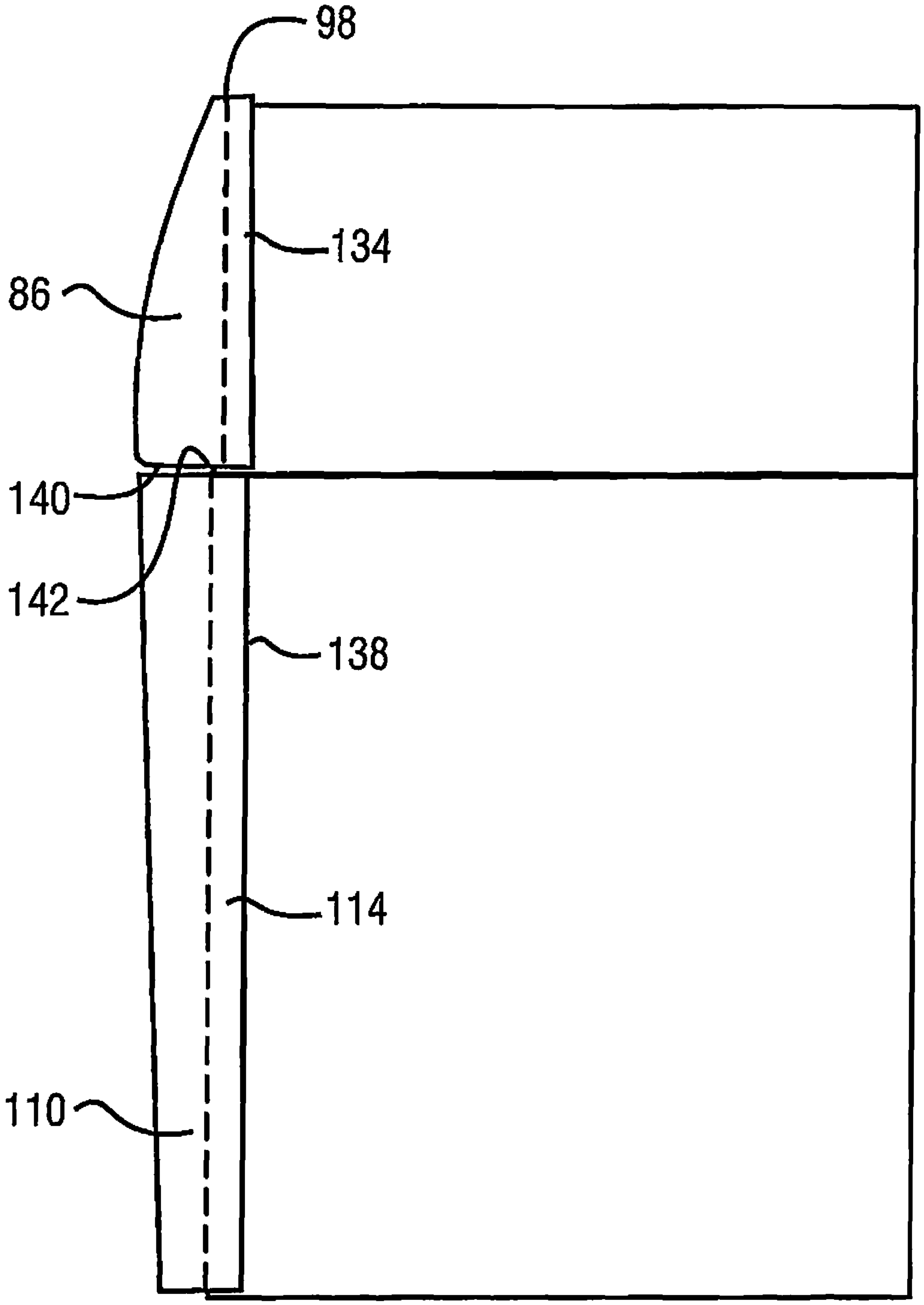
FIG. 8 is a side schematic view of an exemplary embodiment of an automated banking machine illustrating the alignment of an upper fascia and a lower fascia.

As best illustrated in FIG. 8, in the exemplary embodiment, the rearwardly extending portion 98 of upper fascia 86 includes a rearward facing end edge 134. Also, in the exemplary embodiment, first side extension 114 of lower fascia 110 includes rearward facing end edge 138. When viewed from the first side of machine 10, in the exemplary embodiment, end edge 134 of upper fascia 86 and end edge 138 of lower fascia 110 are substantially vertically aligned along a first side of machine 10 when the upper fascia 86 is in the first position and the lower fascia 110 is in the covering position.

With continued reference to FIG. 8, in the exemplary embodiment, upper fascia 86 is bounded by a lower surface 140. Lower fascia 110 is bounded by an upper surface 142. In the exemplary embodiment, lower surface 140 is adapted for substantial parallel horizontal alignment with upper surface 142 when the upper fascia 86 is in the first position and the lower fascia 110 is in the covering position. The alignment of the fascia surfaces presents an attractive appearance to machine 10.

In this exemplary embodiment, the rearwardly extending portion 98 further operates to simplify the manufacture and assembly of the machine 10. In some previous machines, it was necessary to more precisely control the alignment of the walls of the upper fascia 86 with the perimeter of the front opening. However, in this disclosed exemplary embodiment, because the rearwardly extending portion 98 overlies the forward region 94, the required precision is lessened. Further, in those embodiments which include a tapered engagement, alignment of the top housing 12 and upper fascia 86 is facilitated.

With particular reference to FIG. 5, lower fascia 110 may include an access opening 118 therein. In this exemplary embodiment, access opening 118 in the lower fascia 110 is adapted to be substantially aligned with first device opening 56 in chest door 50 when the chest door is closed and lower fascia 110 is in the covering position. In this exemplary embodiment, when the chest door 50 is closed and lower fascia 110 is in the covering position, at least an end portion of sheet delivery mechanism 74 extends in the first device opening 56 in chest door 50 and access opening 118 in lower fascia 110.

As illustrated in FIGS. 1 and 2, in this exemplary embodiment, machine 10 includes a first locking mechanism 146 for selectively retaining the rollout tray 80 in the retracted position when upper fascia 86 covers the front opening 22. The first locking mechanism may be of the type described in U.S. Pat. No. 6,082,616 the disclosure of which is incorporated herein by reference in its entirety.

In the exemplary embodiment, machine 10 also includes a second locking mechanism 148 for selectively securing lower fascia 110 in the covering position.

Figure 9:
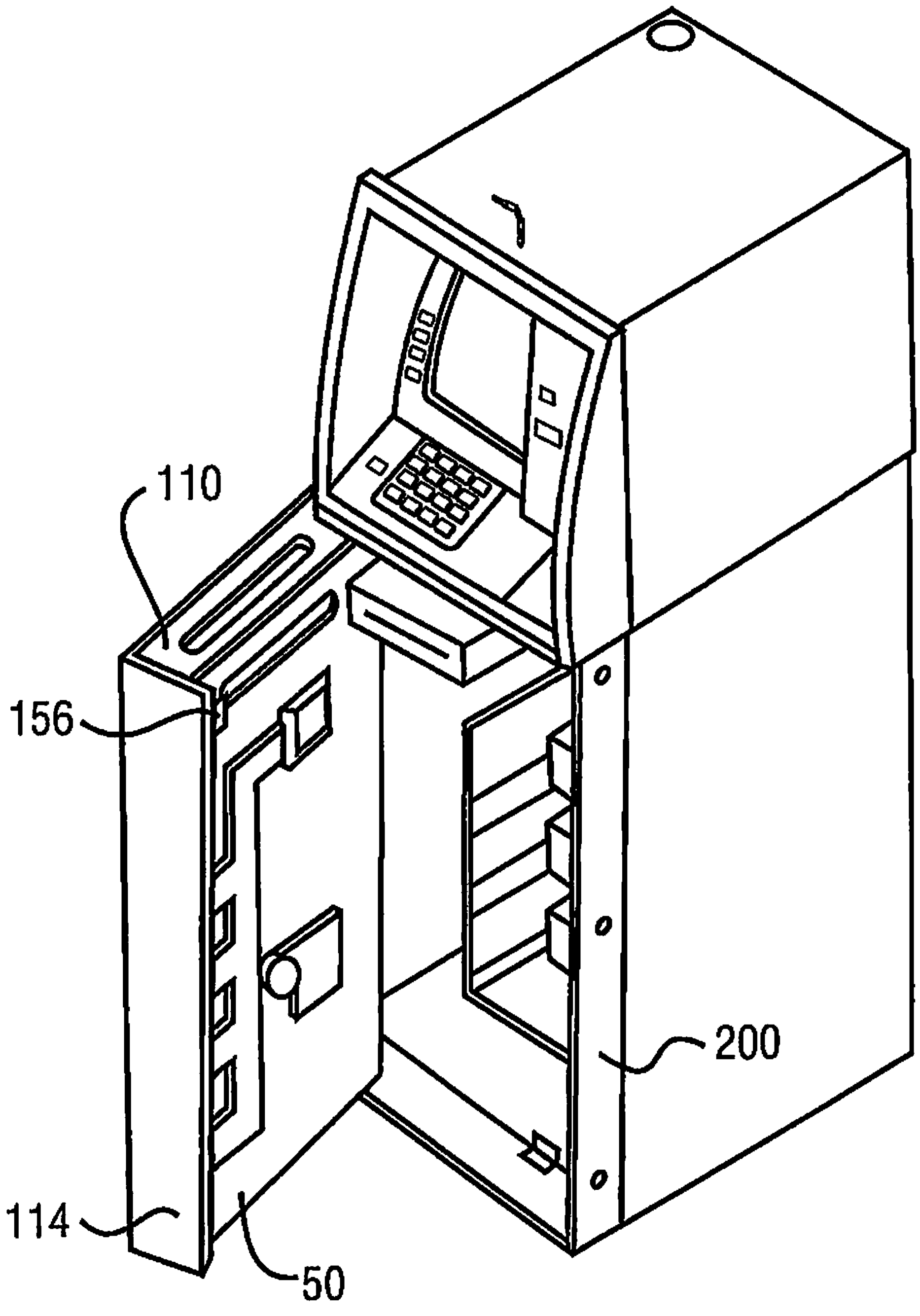
FIG. 9 is an isometric view of an automated banking machine similar to FIG. 5 showing the chest door selectively engaged with the lower fascia.

With particular reference to FIGS. 4, 5 and 9, in another exemplary embodiment machine 10 may include a top housing 12 as previously described. machine 10 further includes chest 40 having chest door 50 mounted to the housing 44 by one or more chest door hinge assemblies 152. Lower fascia 110 is moveably mounted to chest housing 44 by one or more fascia hinges 154. In this exemplary embodiment, fascia hinge 154 and chest door hinge assembly 152 are situated on the same side of the chest housing 44 so that lower fascia 110 and chest door 50 pivot generally in the same direction relative to the chest.

From time to time, the banking machine components enclosed within secure enclosure 42 must be accessed for replenishment or other servicing activity. Thus, lower fascia 110 may be selectively moved from a covering position into an accessible position to allow access to chest door 50. Chest door 50 may then be selectively opened.

In this exemplary embodiment, as best seen in FIG. 9, lower fascia 110 is operable to engage the open chest door 50 to prevent its movement back to a closed position. In this exemplary embodiment, lower fascia 110 includes an inwardly directed flange 156 carried on an inner surface at a side opposite the fascia hinge 154. Inwardly directed flange 156 is dimensioned to engage at least a portion of chest door 50 when the lower fascia 110 is in the accessible position and the chest door 50 is in the open position. In the exemplary embodiment, lower fascia 110 is adapted to pivot away from the chest door 50 to at least an extent where the chest door may be disengaged from inwardly directed flange 156. Exemplary embodiments may include features of the type discussed in U.S. Pat. Nos. 7,159,767; 7,152,784; 7,000,830; and 6,871,602 the disclosures of each of which are incorporated herein by reference in their entirety.

An exemplary embodiment includes a method for accessing the contents of the secure area for servicing components housed therein or to replenish currency sheets. The method includes placing the lower fascia into an accessible position from a covering position to uncover the chest door; opening the chest door to provide access to the secure area through an opening in the chest housing; and engaging the chest door and the lower fascia to hold the chest door in an open condition. Thus, a currency dispenser mechanism or other components may be accessed. Servicing the currency dispenser may include adding or removing currency sheets from operative engagement with the currency dispenser mechanism.

The method may further include engaging the chest door with an inwardly directed flange that is mounted in supporting connection with the lower fascia.

To return the machine to an operational condition, the method includes moving the lower fascia outwardly relative to the engaged chest door to disengage the chest door; closing the chest door; and repositioning the lower fascia into the covering position.

Repositioning the lower fascia into the covering position includes overlying a first forward portion of the chest housing with a first side extension of the lower fascia and overlying a second forward portion of the chest housing with a second side extension of the lower fascia.

Prior to placing the lower fascia into the accessible position, the method includes unlocking a first locking mechanism operable to selectively retain the lower fascia in a covering position.

Figure 10:
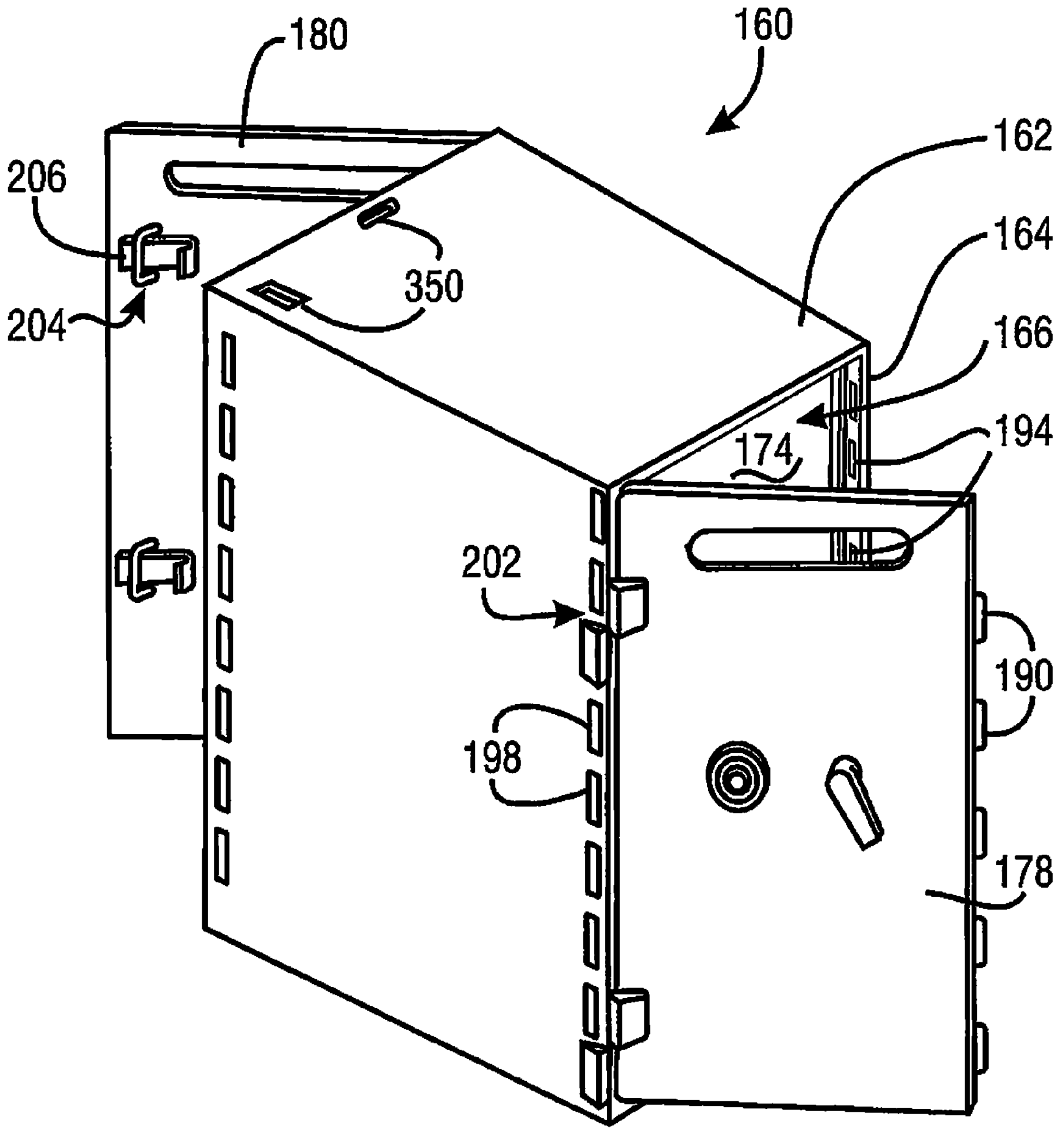
FIG. 10 is a schematic view of an alternate embodiment of a chest for an automated banking machine, as viewed from the front.
Figure 11:
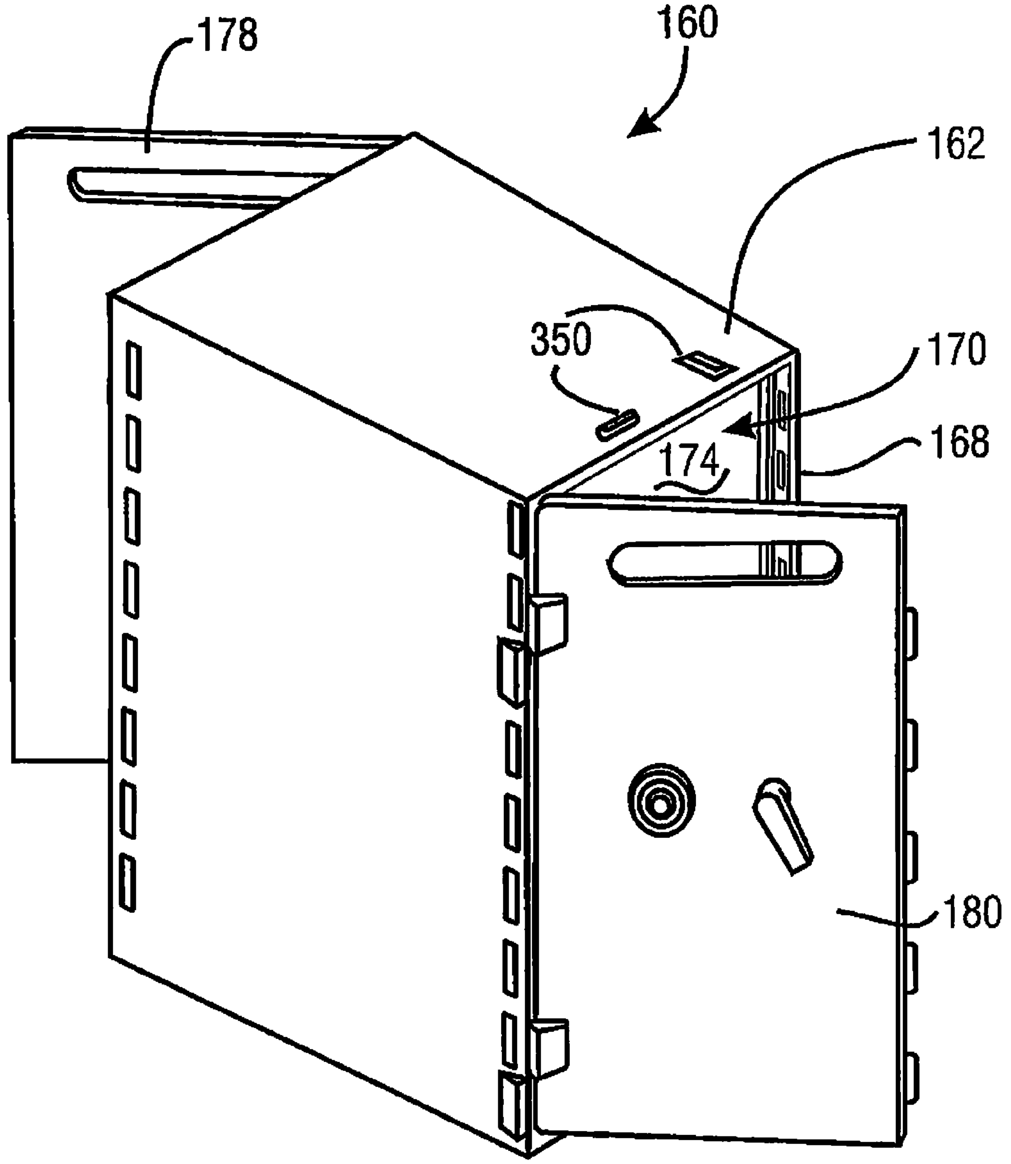
FIG. 11 is a schematic view of the alternate embodiment of the chest shown in FIG. 10, as viewed from the rear.

Some machines may be equipped with another exemplary embodiment of a chest or safe 160, as best seen in FIGS. 10-11. Chest 160 includes a chest housing 162 having a first end 164 defining a first opening 166 therein and second end 168 defining a second opening 170 therein. The chest of this exemplary embodiment is particularly adapted for applications wherein a common chest housing can be utilized in either "front-load" machines or "rear-load" machines. By "front-load" machine it is meant that access to a secure area 174 in an operable machine may be selectively attained from the front of the machine, which is the same side that customers use to provide input to the machine. By "rear-load" machine it is meant that access to the secure area 174 in an operable machine may be selectively attained from the rear of the machine, while customer inputs are provided at the front of the machine.

In this exemplary embodiment, chest 160 includes a first chest door 178 moveably mounted adjacent a first end 164 of chest housing 162 to selectively close the first opening 166. Chest 160 further includes a second chest door 180 moveably mounted adjacent the second end 168 to selectively close the second opening 170.

In the exemplary embodiment illustrated in FIG. 10, chest 160 is adapted for use in a front load machine wherein under usual operating conditions, first chest door 178 is selectively movable to open or close first opening 166 to allow access to secure area 174. In this exemplary embodiment, second chest door 180 is adapted to remain closed during usual operation of the machine, including those times when access to secure area 174 is desired. For purposes of this disclosure, the term "semi-permanently" closed is used to describe a condition of a chest door that closes an opening in the chest housing in a manner that does not readily permit access to the secure area. In this way, a "semi-permanently" closed chest door is not used as the primary means for accessing the chest interior. However, under appropriate conditions the semi-permanently closed chest door can be opened.

In this exemplary embodiment, first chest door 178 is the operable door and second chest door 180 is adapted to be semi-permanently closed. In other embodiments, for instance in rear-load machines, it may be desirable to utilize chest 160 as illustrated in FIG. 11 where the second chest door 180 is the operable door while first chest door 178 is adapted to be semi-permanently closed.

Figure 12:
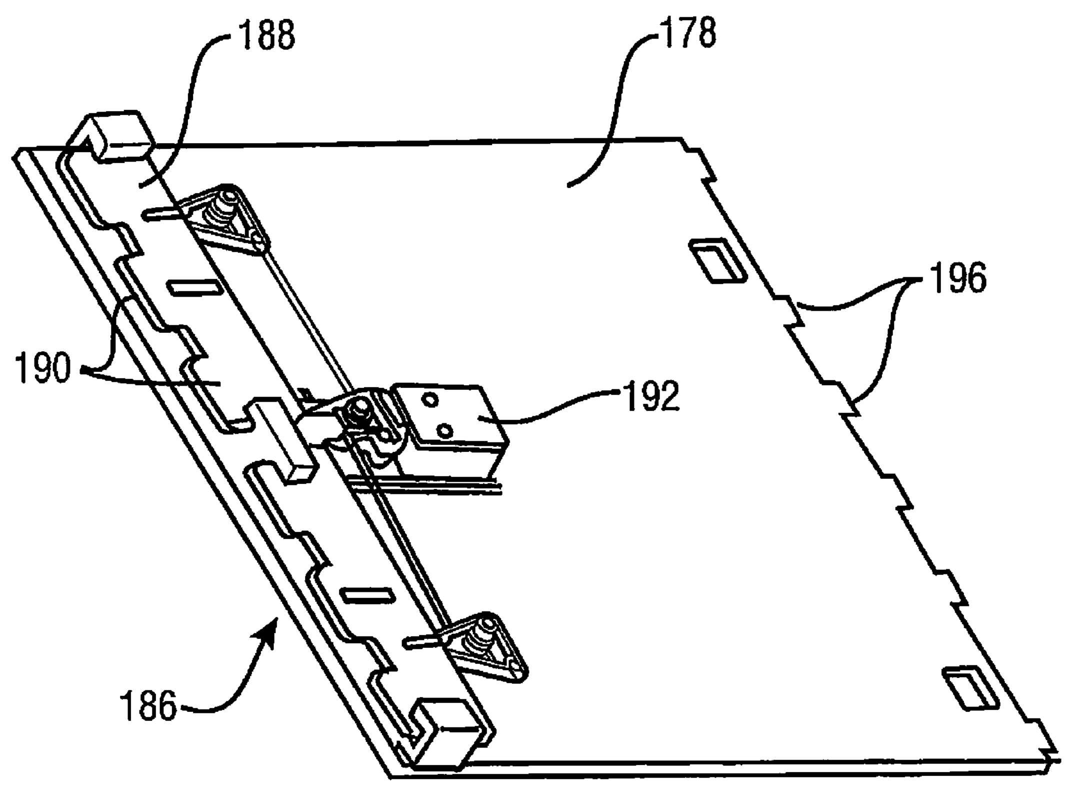
FIG. 12 is an isometric view of a chest door illustrating a locking bolt mechanism.

With particular reference to FIGS. 10 and 12, in the exemplary embodiment, the first chest door 178 is equipped with a suitable locking bolt mechanism generally denoted 186. Locking bolt mechanism 186 is operative to selectively enable securing first chest door 178 in a locked condition. Locking bolt mechanism 186 may be of the type described in U.S. Pat. No. 6,089,168 which is incorporated by reference in its entirety as if fully rewritten herein. Of course, other suitable bolt works can be utilized to accomplish the objectives.

Locking bolt mechanism 186 of the exemplary embodiment includes a locking bolt 188 which includes a plurality of locking bolt projections 190. Locking bolt 188 is mounted in operatively supported connection with an interior surface of first chest door 178 so as to be slidably movable between an extended position and a retracted position.

First chest door 178 also has a lock 192 mounted thereto. Lock 192 cooperates with locking bolt mechanism 186 so that first chest door 178 is enabled to be changed from a locked condition to an unlocked condition. As shown in FIG. 10, the chest housing 162 includes a plurality of vertically spaced locking bolt apertures 194 which are sized and positioned for accepting the locking bolt projections 190.

It will be appreciated by those skilled in the art that the locking bolt mechanism because it provides multiple places for engagement with the chest housing, achieves more secure locking of the door in the closed position than a locking bolt mechanism providing a single place for engagement with the chest housing.

In the exemplary embodiment, first chest door 178 includes a plurality of dead bolt projections 196 extending on a hinge side of the door. These dead bolt projections 196 are preferably positioned and sized to be accepted in the dead bolt apertures 198 in housing 162. As will be appreciated, the acceptance of the dead bolt projections 196 into the dead bolt apertures 198 provides enhanced security. In an exemplary embodiment, the dead bolt apertures and the locking bolt apertures are covered by trim pieces 200 (shown in FIG. 9) that extend on the outside of the housing.

With reference to FIG. 10, in the exemplary embodiment, the first chest door 178 is operably connected to the chest housing via one or more first chest hinge assemblies 202. The exemplary chest hinge assembly 202 may be of the type described in U.S. Pat. No. 6,089,168 and/or 7,156,297, the disclosures of which are incorporated herein in their entirety. It will be readily understood that other hinge constructions may be used in other embodiments.

In the exemplary embodiment, the second chest door 180 may be secured in a closed position by a securing mechanism that generally mirrors the locking bolt mechanism 186 and lock 192. Alternately, as illustrated in FIG. 10, second chest door 180 may be "semi-permanently" secured by an alternate securing mechanism 204. The alternate securing mechanism 204 may include a bolt member 206 or other mechanism that is less complex than the locking bolt mechanism and lock previously described. In this exemplary embodiment, routine access to the secure area 174 via second chest door 180 is not necessary during normal operation of the machine. Thus, the alternate securing mechanism 204 is operable to "semi-permanently" engage the chest door 180. This may be done, for example, by securing the bolt with fasteners or other devices that are only accessible from within the interior of the chest portion. Of course, in some alternative embodiments both chest doors may be equipped with operational locking bolt mechanisms and locks.

The manufacture of an exemplary machine may be simplified by use of chest 160. A common chest housing may be utilized in applications requiring a front-load machine or a rear-load machine. After the housing has been assembled, the positioning of a locking bolt mechanism may be chosen according to the configuration of the chest. Additionally, at a subsequent time, the operational features may be changed so that the initial operational chest door becomes the non-operational door and vice versa. Thus, the manufacturing process is simplified by the versatility of the chest housing.

Of course it will be readily appreciated that machines incorporating this exemplary embodiment of chest 160 may include any of the other features described elsewhere.

An exemplary embodiment includes a method for utilizing a machine that is equipped with a chest having two opposed openings. The chest housing includes a first opening at a first end thereof and a second opening at a second opposed end. The first door is moveably mounted in supporting connection with the chest housing so that the first chest door is operative to selectively close the first opening. A second chest door is moveably mounted in supporting connection with the chest housing so that the second door is operative to semi-permanently close the second opening. At least one lower banking machine component is mounted in supporting connection with the chest housing in the secure area.

In the exemplary method, a first locking bolt mechanism in supporting connection with the first chest door is operated to selectively securely engage the first chest door with the chest housing. A first securing mechanism in supporting connection with the second chest door is operated to semi-permanently securely engage the second chest door with the chest housing.

The method includes accessing at least one lower banking machine component of a machine through a first opening in a chest housing bounding a secure area; and preventing access to the at least one lower banking machine component through the second opening.

The method further includes replacing the first locking bolt mechanism with a second securing mechanism in supporting connection with the first chest door, wherein the second securing mechanism is operative to semi-permanently securely engage the first chest door with the chest housing; and replacing the first securing mechanism with a second locking bolt mechanism in supporting connection with the second chest door, wherein the second locking bolt mechanism is operative to selectively securely engage the second chest door with the chest housing. Thus, the door chosen as the operative door can be selected and changed.

The exemplary machine may include a lower fascia that is mounted in supporting connection with the chest housing, wherein the lower fascia is selectively movable between a covering position and an accessible position. The exemplary method may include moving the lower fascia from the covering position to the accessible position prior to accessing the lower banking machine component. Further, the method may include engaging the first chest door with the lower fascia to hold the first door in the open condition.

The at least one lower banking machine component may comprise a currency dispenser mechanism. The exemplary method includes servicing the currency dispenser mechanism after the at least one lower banking machine component is accessed. This may include for example features included in U.S. Pat. Nos. 7,195,237 and/or 7,111,776 the disclosures of each of which are incorporated herein by reference in their entirety.

The at least one lower banking machine component may comprise a currency stacker. The exemplary method includes servicing the currency stacker.

Figure 13:
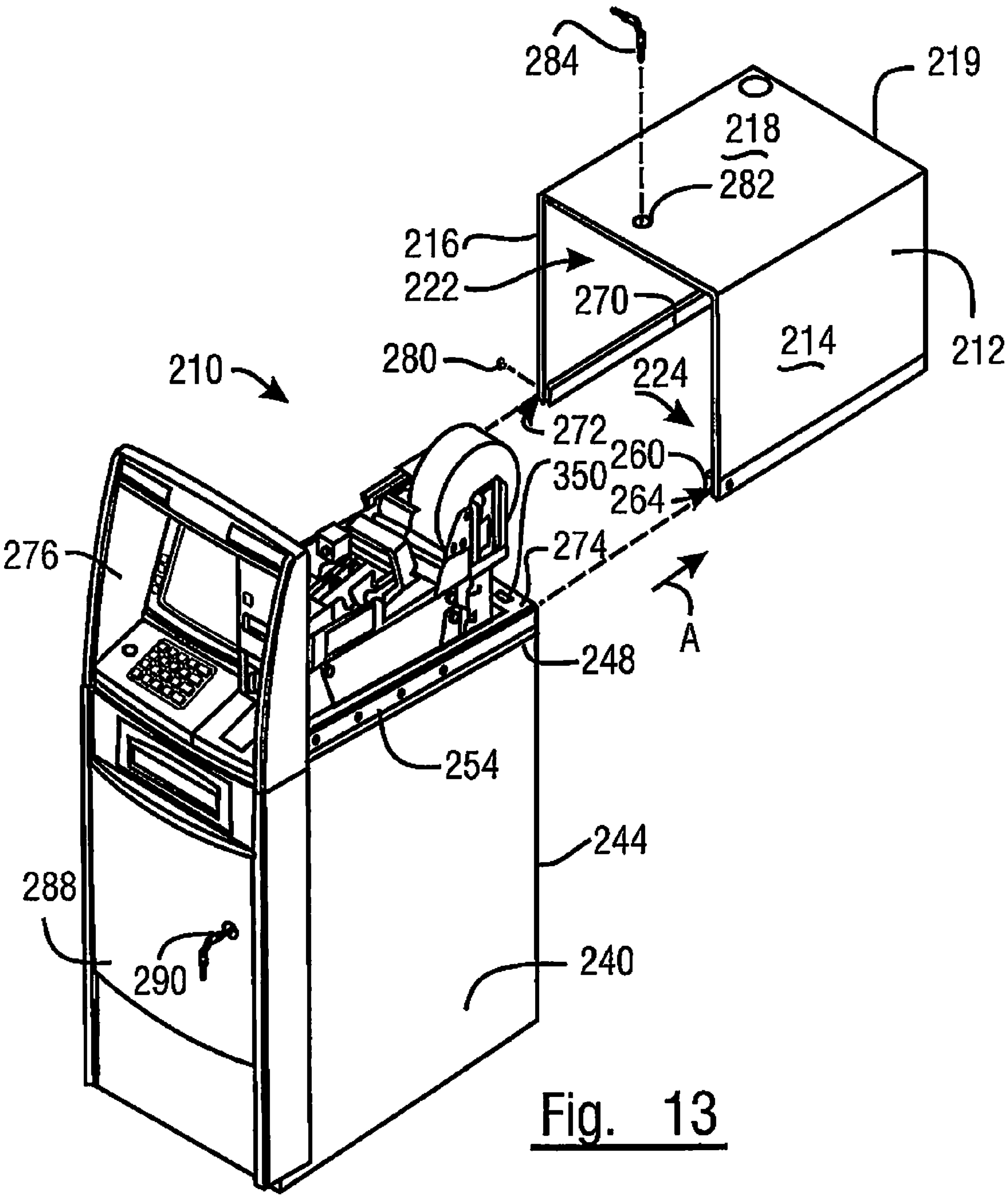
FIG. 13 is an isometric exploded view of an alternate embodiment of an automated banking machine.
Figure 14:
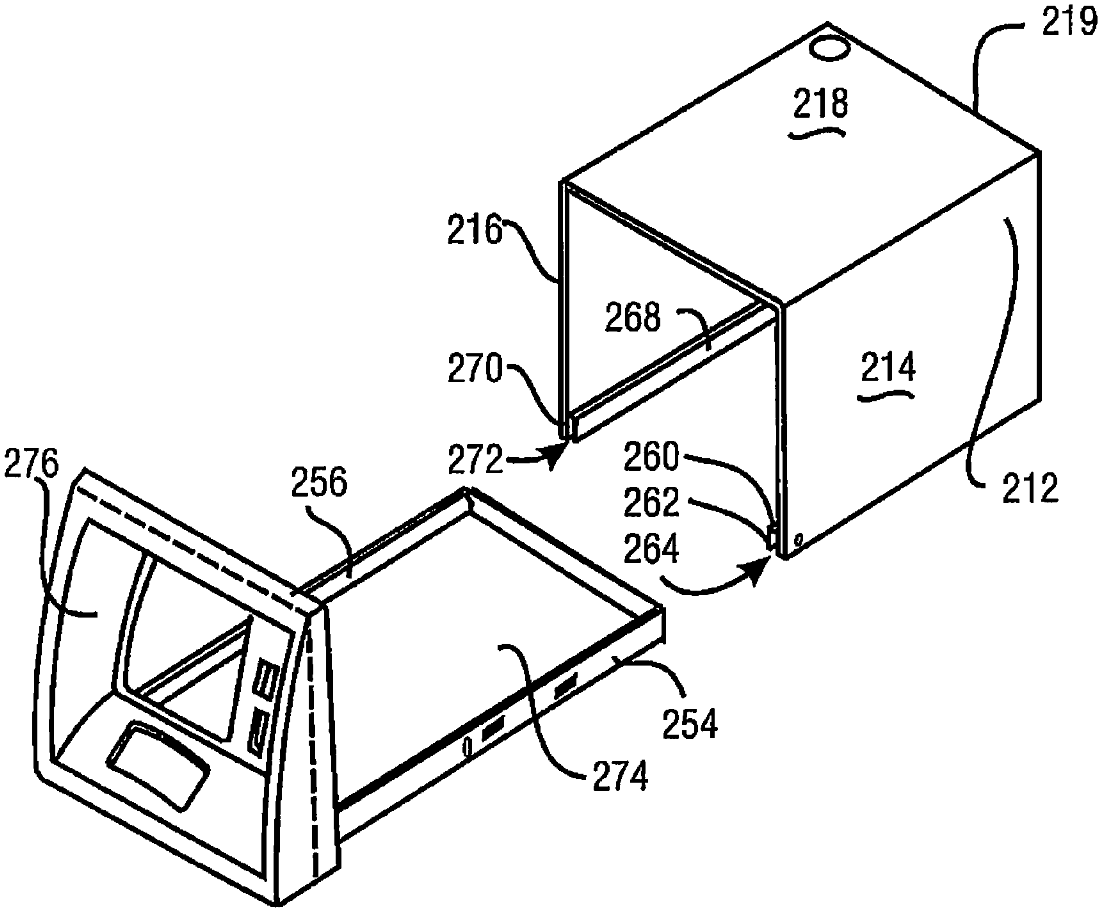
FIG. 14 is an isometric view of a top housing cover, a mounting tray and an upper fascia of an automated banking machine.
Figure 15:
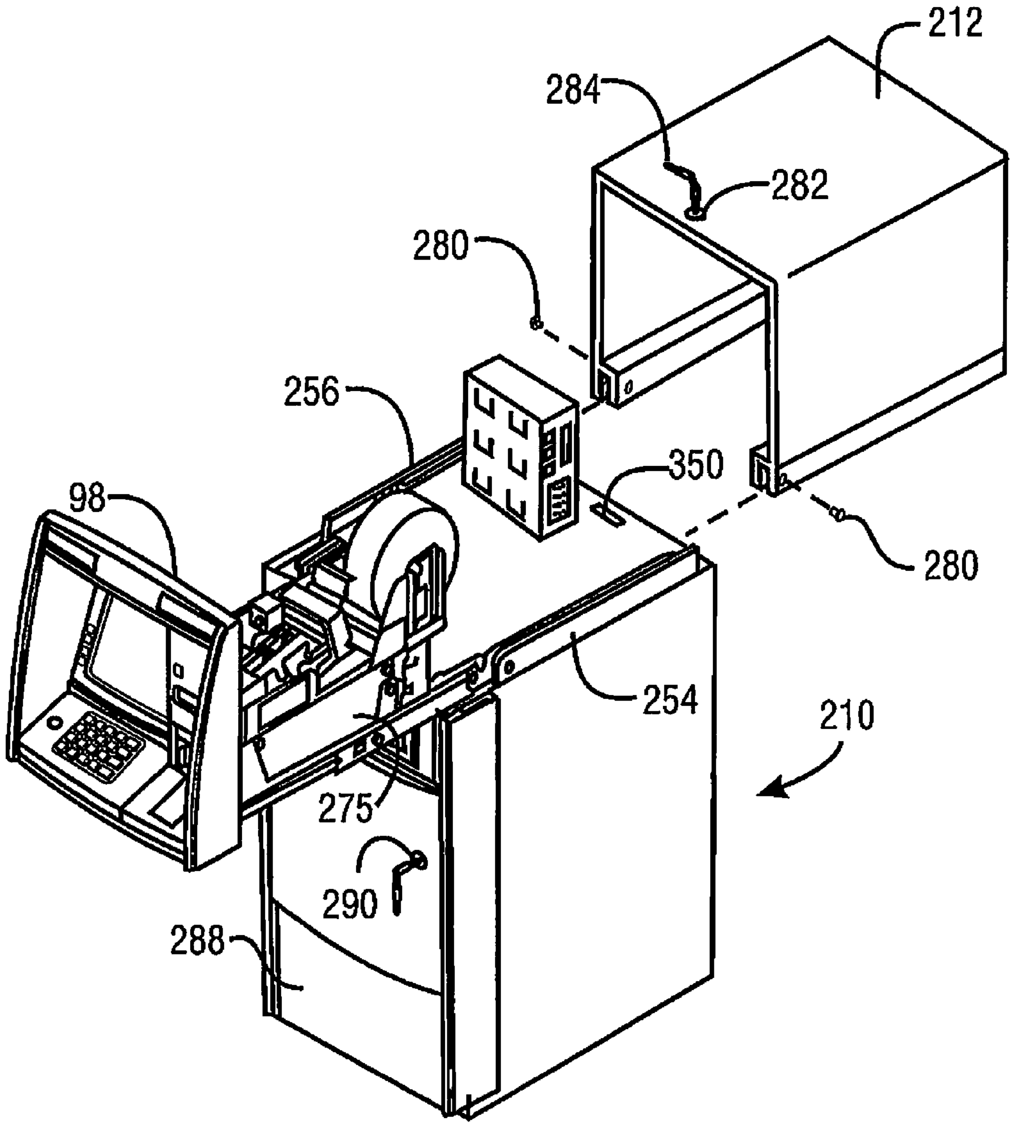
FIG. 15 is an isometric view of an alternate embodiment of an automated banking machine.

Yet another exemplary embodiment of an automated banking machine 210 is illustrated in FIGS. 13-15. machine 210 includes a top housing cover 212 including first and second side walls 214, 216, top wall 218, and rear wall 219. Top housing cover 212 defines a front opening 222 and a bottom opening 224. In a first (operable) position, top housing cover 212 covers an interior area in which various upper banking machine components such as a display, a receipt printer, a card reader, input keys, a controller, communication device, and others may be disposed.

In this exemplary embodiment, machine 210 further includes a chest 240 bounding a secure area in a manner similar to that previously described. Chest 240 includes a housing 244 having a top wall 248. Top housing cover 212 is adapted for rearward slidable movement relative to top wall 248 to a second position for service.

In this exemplary embodiment, a first upwardly extending flange member 254 is mounted in supporting connection with top wall 248 along a first side thereof. A second upwardly extending flange member 256 (not shown in this view) is mounted in supporting connection with top wall 248 along a second side thereof.

Supported on the first side wall 214 of top housing cover 212 is a first cooperating channel member 260 having a pair of spaced downwardly extending projections 262 defining a first channel 264 therebetween. Likewise, on the second side wall 216 of top housing cover 212 there is supported a second cooperating channel member 268 having a pair of spaced downwardly extending projections 270 defining a second channel 272 therebetween.

Top housing cover 212 is adapted for slidable movement relative to the top wall 248 by the slidable engagement of the first flange member 254 within first channel 264 and the slidable engagement of the second flange member 256 within second channel 272.

In this exemplary embodiment, machine 210 includes an upper fascia 276 operable to selectively cover the front opening 222. The top housing cover 212 is adapted for rearward movement relative to the top wall 248 in the direction of arrow A such that rearward displacement of the top housing cover 212 allows access to the upper banking machine components in the interior area, for example, for servicing.

It is contemplated that in exemplary embodiments the positioning of the flange members 254, 256 and the channels 264, 272 be reversed. For example, the top housing cover 212 may support flange members and the mounting tray may support cooperating channel members to accomplish a similar slidable relationship therebetween.

FIG. 14 illustrates an exemplary embodiment wherein the flange members 254, 256 are incorporated into a mounting tray 274 which is operable to receive and support one or more upper banking machine components, which for ease of illustration are not shown in this view. This embodiment allows for ease of assembly of the exemplary machine 210. The applicable upper banking machine components can be readily mounted onto mounting tray 274, which is mounted in supporting connection with top wall 248 of chest housing 244. Top housing cover 212 may thereafter be positioned by slidable movement of flange members 254, 256 in respective channels 264, 272.

In an alternate exemplary embodiment, illustrated in FIG. 15, machine 210 may include a rollout tray 275 similar to rollout tray 80 as previously described. Flange members 254, 256 may be mounted in supporting connection with rollout tray 275. Thus, upper banking machine components may be accessed by rearwardly sliding the top housing cover 212, extending the rollout tray 275, or a combination of both.

Machine 210 may further include at least one removable fastener 280 for selectively engaging the top housing cover 212 with at least one flange member 254, 256 to prevent relative slidable movement therebetween. In the exemplary embodiment, first and second fasteners 280 are used to secure the top housing cover 212.

Machine 210 may further include a first locking mechanism 282 to secure the top housing cover to upper fascia 276. In this exemplary embodiment, the locking mechanism is operable in response to a key 284. In the exemplary embodiment illustrated in FIG. 15 it is contemplated that fasteners 280 are covered by a rearwardly extending portion of upper fascia similar to portion 98 shown in FIG. 6. Thus, fasteners 280 are not accessible from outside the machine until first locking mechanism 282 has been operated to release upper fascia 276 so that the upper fascia 276 can be moved away from top housing cover 212.

In the exemplary embodiment, machine 210 may include a lower fascia 288 with features similar to a lower fascia previously described. Lower fascia 288 may be secured in the covering position by a second locking mechanism 290.

This exemplary embodiment provides ready access to the upper banking machine components, for example, for servicing or replacing. To access the upper banking machine components, fasteners 280 are removed. It is contemplated that in an exemplary embodiment, the fasteners may not be accessible until after the first locking mechanism 282 is unlocked and the upper fascia is displaced slightly to uncover fasteners 280. In other embodiments, the fasteners may be directly accessed.

The top housing cover 212 may then be moved rearwardly, away from upper fascia 276 so that the interior area is accessible. During servicing, the top housing cover 212 may be selectively positioned so that some portion or none of the upwardly extending flanges 254, 256 remain engaged with the channel members 260, 268, respectively.

In one exemplary embodiment, a method is provided for accessing banking machine components of a machine. The exemplary method includes supporting the top housing cover in a slidable relationship with the top wall of the chest housing, wherein the top housing cover includes a front opening; selectively rearwardly sliding the top housing cover away from a first position in which an upper fascia covers the front opening; and accessing at least one upper banking machine component that is mounted in supporting connection with the top wall of the chest housing.

The exemplary method further includes removing fasteners that may be used to selectively secure the top housing cover in the first position.

The exemplary method further includes operating a locking mechanism to release the top housing cover and the upper fascia.

The exemplary method further includes accessing an upper banking machine component for servicing. The at least one upper banking machine component may be a display that is accessed for servicing.

In one embodiment the machine includes side flange members mounted in supporting connection with a top wall of a chest housing and cooperative channel members mounted in supporting connection with the top housing cover. In this exemplary embodiment, the method further includes slidably engaging a first flange member with a first channel of a first channel member.

Figure 16:
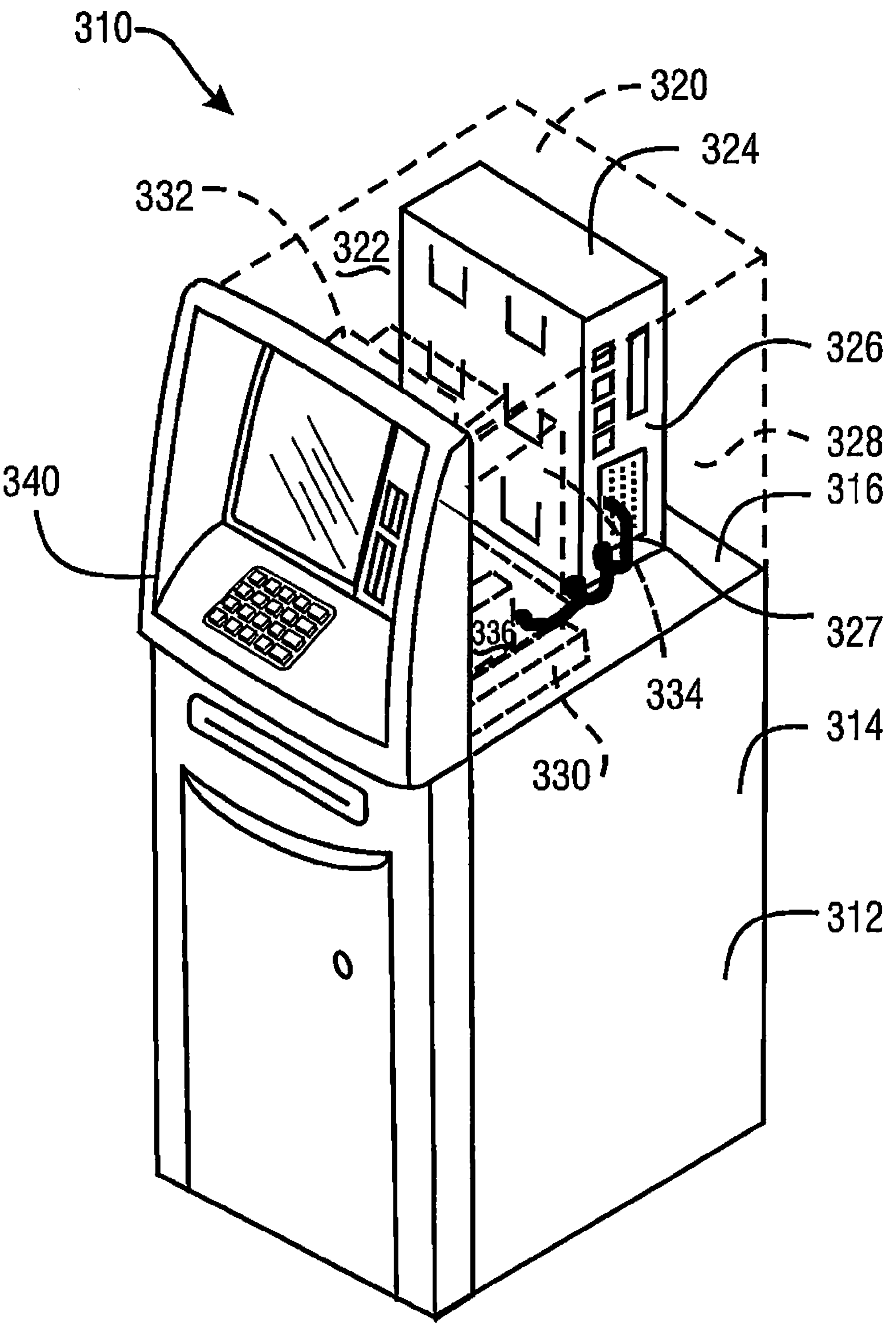
FIG. 16 is an isometric view, partly in phantom, of an alternate exemplary embodiment of an automated banking machine in an operational condition.
Figure 17:
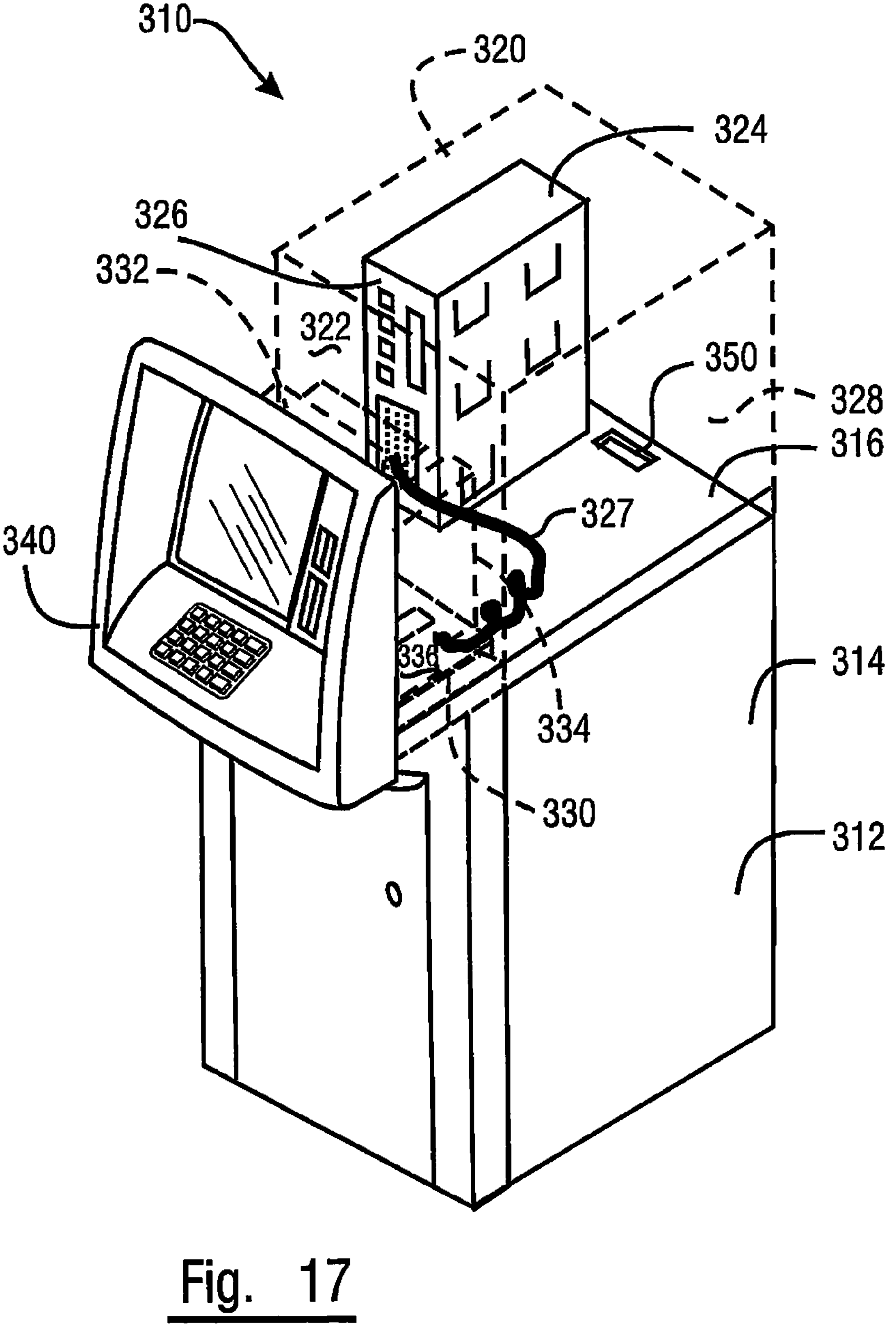
FIG. 17 is an isometric view, partly in phantom, of the automated banking machine of FIG. 16, in a serviceable condition.

In another exemplary embodiment, illustrated in FIGS. 16 and 17, machine 310 may include a chest 312 having a chest housing 314 including top wall 316. As in previously described embodiments, chest housing 314 bounds a secure area which holds lower banking machine components including a currency dispenser mechanism which may be similar to mechanism 64 shown in FIG. 3. Machine 310 further includes a top housing 320 (shown in phantom) bounding an interior area 322.

In this exemplary embodiment, machine 310 includes a processor case 324 that houses the primary machine processor. The processor may be an Intel Pentium (PL type) processor. Of course, in some embodiments the case may house multiple processor or no processors at all. The machine processor causes operation of the various devices and mechanisms in the machine.

In this exemplary embodiment, processor case 324 is in supporting connection with top wall 316 of chest housing 314. Processor case 324 includes a first functional side 326 that is operable to establish connections, such as through cable 327, from the various banking machine components. Other processor components, including but not limited to circuit cards having various functions, additional processors, drives (CD, DVD, floppy), power supplies, memory, or encryption cards, may be carried on or within processor case 324. Such components may also be accessed, removed and/or replaced and routine maintenance performed through access to the functional side of the processor case.

In order to minimize the space occupied by machine 310, it is advantageous to orient processor case 324 of the exemplary embodiment so that the first functional side 326 is substantially parallel to a first side wall 328 (shown in phantom) of top housing 320. However, in order to easily access first functional side 326 for servicing or connecting cables, it is advantageous to orient processor case 324 so that the first functional side 326 is substantially perpendicular to the first side wall 328, facing the front opening of the machine. In order to accomplish both these purposes, the processor case 324 of the exemplary embodiment is rotationally supported in connection with the top wall 316 of the chest housing 314. The processor case 324 is selectively rotationally movable between an operational position, shown in FIG. 17, wherein the first functional side 326 is substantially parallel to the first side wall 328, and a service position, shown in FIG. 16, wherein the first functional side 326 is substantially perpendicular to the first side wall 328.

In this exemplary embodiment, a rollout tray 330 is supported on the top wall 316 of the chest housing 314. As in earlier described exemplary embodiments, the rollout tray 330 is selectively movable between a retracted position wherein the rollout tray 330 is within the interior area 322, and an extended position wherein the rollout tray 330 extends outwardly from the interior area through a front opening in the top housing 320. In the exemplary embodiment, various upper banking machine components such as display 332, receipt printer 334, and card reader 336 are supported on rollout tray 330. Also, an upper fascia 340 may be mounted in supporting connection with rollout tray 330. As in other described embodiments, when the rollout tray is in the retracted position, the upper fascia 340 covers the front opening in the top housing.

In the exemplary embodiment, when rollout tray 330 is in the retracted position, as illustrated in FIG. 16, the processor case 324 is prevented from rotating from the operational position to the service position. When the rollout tray 330 is in the extended position, as illustrated in FIG. 17, there is enough clearance in the interior area 322 to permit the processor case 324 to be rotated into the service position. Thus, when the rollout tray 330 is in the extended position, the upper banking machine components supported thereon are readily accessible for service. Likewise, the cable connections and any processor components carried on the processor case are accessible for service.

In a method for servicing banking machine components of a machine, a rollout tray 80 mounted in supporting connection with a top housing 320 is extended from a retracted position so that the rollout tray extends through a front opening in the top housing 320. The method includes disengaging any locking mechanisms that operate to retain the rollout tray 80 in the retracted position.

A processor case 324 disposed in an interior area 322 bounded by the top housing 320 may be rotated from an operational position to a service position. At least one processor component mounted in supporting connection with the processor case 324 may be accessed for servicing. After servicing of the processor component is complete, the processor case 324 may be rotationally returned to the operational position from the service position. Thereafter, the rollout tray 80 may be repositioned into the retracted position.

The step of servicing the processor component may include connecting or disconnecting cables or connections, adding or replacing components such as circuit cards, performing diagnostic tests and other functions to facilitate operation of the machine.

Prior to repositioning the rollout tray 80, other banking machine components may be serviced while the rollout tray is extended. For example, a display, card reader, and receipt printer assembly are readily accessible for service. The service can include routine maintenance, replacement of non-working components, addition of other banking machine components, and the like. Connections with the processor can be readily made while the rollout tray is in the extended position and the processor case is in the service position.

The machine may include a slidable top housing cover 212 as earlier described. The service method includes the step of rearwardly sliding the top housing cover 212. After the servicing of banking machine components is completed, the method includes returning the top housing cover 212 to an operational position.

During servicing of the machine, the lower banking machine components may also be accessed for servicing. The service method includes disengaging any locking mechanisms that retain the lower fascia in a covering position. The lower fascia may thereafter be moved into the accessible position. The locking bolt mechanism that securely engages the chest door with the chest housing may be disengaged so that the chest door may be placed in the open position.

An exemplary method further includes the step of engaging the chest door with the lower fascia when the chest door is in the open position and the lower fascia is in the accessible position in order to retain the door in the open position.

The lower banking machine includes components such as currency stacker, currency dispenser mechanism, and currency delivery mechanism (as shown in FIG. 3). An exemplary service method includes performing routine maintenance, replenishing currency, removing sheets, disengaging sheets from the currency dispenser mechanism, replacing components and the like.

The machine can include connections and/or cables that extend between the processor case and lower banking machine components that are generally housed within the secure chest. The chest housing may include various openings 350 through the walls to accommodate the connections and/or cables (FIGS. 10-11 and 17). When the processor case is in the service position, the connections can be readily established, maintained and/or changed.

An exemplary method of constructing an automated banking machine apparatus is provided. The exemplary method includes mounting a top housing in supporting connection with a chest adapted for use in an automated banking machine apparatus. A first chest door is operable to selectively close a first opening in the chest housing.

The method further includes mounting an upper fascia in supporting connection with the top housing and mounting a lower fascia in movable supporting connection with the chest housing.

The upper fascia and the top housing are selectively positioned relative each other so that a front opening in the top housing is selectively covered by the upper fascia, and wherein a rearwardly extending portion of the upper fascia overlies a forward region of the top housing.

The lower fascia is selectively positioned in a covering position relative a chest door wherein a first side extension of the lower fascia overlies a first forward portion of the chest housing and wherein a second side extension of the lower fascia overlies a second forward portion of the chest housing.

In an exemplary method, a lower edge surface of the upper fascia is placed in substantially parallel alignment with an upper edge surface of the lower fascia and an end edge of a rearwardly extending portion of the upper fascia is substantially vertically aligned with an end edge of a first side extension of the lower fascia at a first side of the machine.

In an exemplary method, a second chest door is moveably mounted in supporting connection with the chest housing to operably close a second opening in the chest housing. A first locking bolt mechanism may be mounted to the first chest door and an alternate securing mechanism may be mounted to the second chest door.

In an exemplary method, a processor case is mounted in supporting rotational connection with a top wall of the chest housing wherein the processor case is selectively movable between an operational position and a service position, and wherein the processor case houses at least one processor.

In an exemplary method, at least one upper banking machine component is mounted in supporting connection with a rollout tray which is mounted in movable supporting connection with the chest housing, wherein the rollout tray is selectively movable between a retracted position wherein the rollout tray is within an interior area, and an extended position wherein the rollout tray extends outwardly from the interior area through the front opening in the top housing.

The exemplary method includes selectively placing the rollout tray in the extended position, selectively rotating the processor case into the service position, and establishing an operable connection between the at least one upper banking machine component and the at least one processor.

In an exemplary method, the lower fascia is equipped with an inwardly extending flange operative to selectively engage the chest door when the lower fascia is in the accessible position and the chest door is in the open position.

Figure 18:
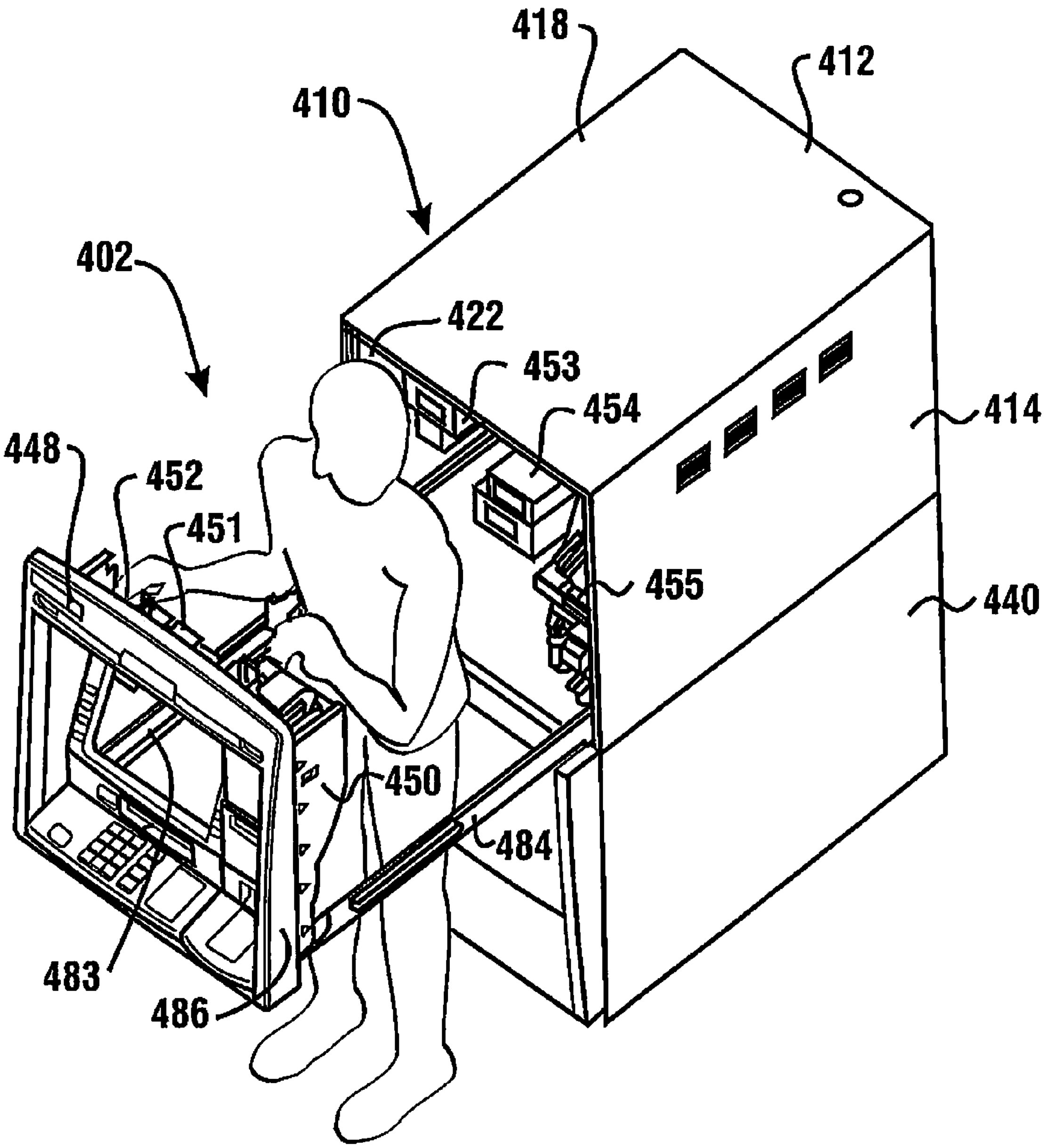
FIG. 18 is an isometric view of an automated banking machine of an exemplary embodiment.

With reference to FIG. 18, in this exemplary embodiment there is shown therein an automated banking machine, generally indicated as 410. In this exemplary embodiment, the automated banking machine 410 is an automated teller machine. The machine 410 includes a housing 412 mounted atop a chest 440. The housing 412 includes a first side wall 414, a second side wall 416 (FIG. 19), a rear wall or panel 419, and a top wall 418, and defines a front opening 422. A fascia 486 is adapted to cover the front opening 422 of the housing 412 and may be secured to the housing 412 with a lock 448. The fascia 486 is in operatively supported connection with the housing 412 and is operatively supported by the housing 412 through two horizontally disposed members 483, 484. As will be appreciated by those skilled in the art, the fascia 486 may additionally or alternatively be secured to the chest 440. In an exemplary embodiment, the two horizontally disposed members 483, 484 are slidable members adapted to enable the fascia 486 to be moved away from the front opening 422 of the housing 412. Further, the fascia 486, when moved away from the front opening 422, cooperates with the housing 412 and the two horizontally disposed members 483, 484 to define a space which may be at least partially occupied by a servicer 402 while servicing the machine 410. Various serviceable components, generally identified in FIG. 18 as components 450-455, may be supported by the fascia 486, the housing 412, the chest 440, or combinations thereof.

Figure 19:
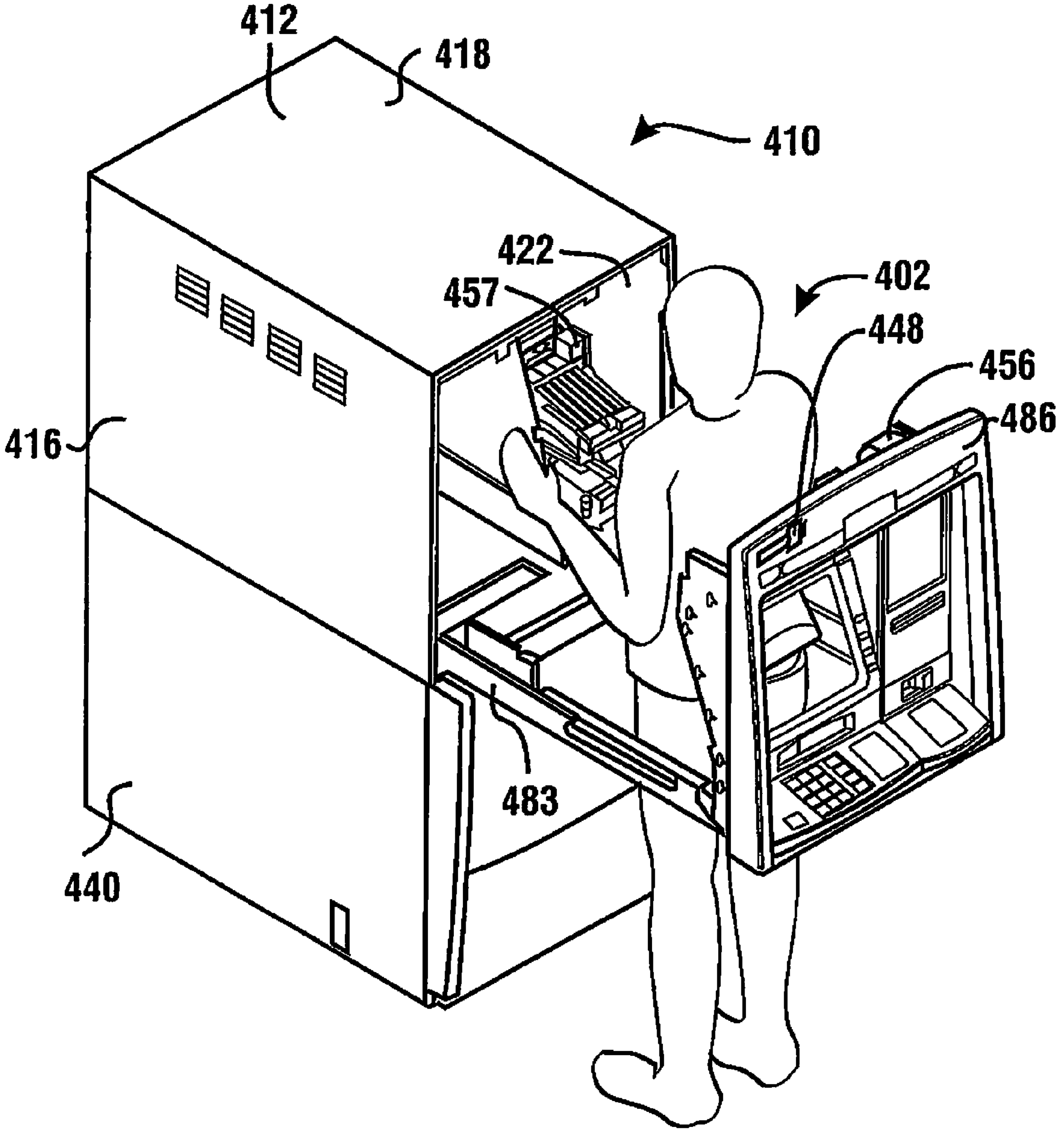
FIG. 19 is a further isometric view of the automated banking machine of the exemplary embodiment shown in FIG. 18.

With reference to FIG. 19, there is shown a further view of the exemplary embodiment of the machine 410 described under FIG. 18. Shown is the servicer 402 at least partially occupying the space defined by the fascia 486, the housing 412, and the two horizontally disposed members 483, 484.

Figure 20:
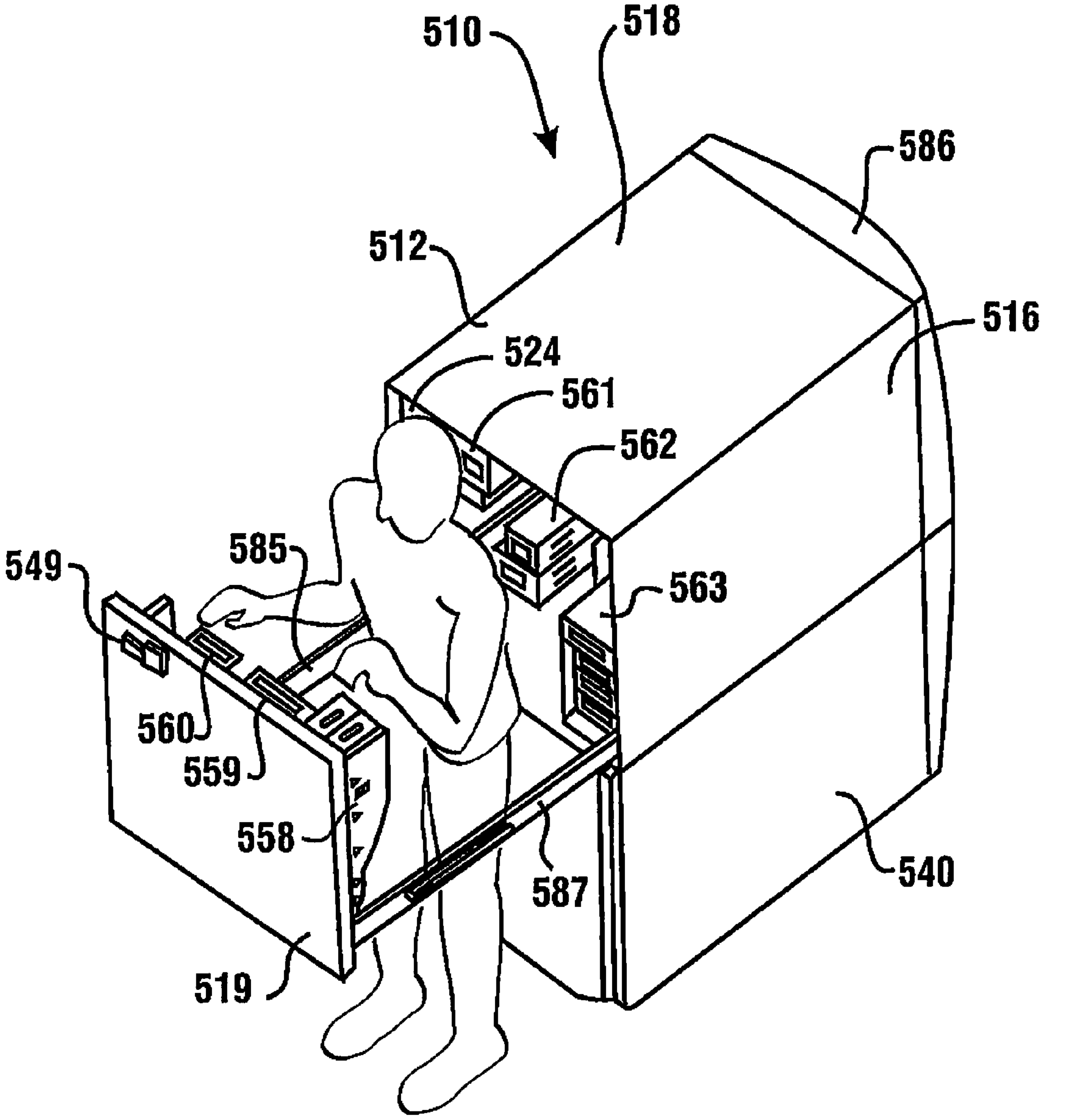
FIG. 20 is an isometric view of an automated banking machine of an exemplary embodiment.

With reference to FIG. 20, in this exemplary embodiment there is shown therein an automated banking machine, generally indicated as 510. In this exemplary embodiment, the automated banking machine 510 is an automated teller machine. The machine 510 includes a housing 512 mounted atop a chest 540. The housing 512 includes a first side wall 514 (not shown), a second side wall 516, and a top wall 518, and defines a rear opening 524. A rear panel 519 is adapted to cover the rear opening 524 of the housing 512 and may be secured to the housing 512 with a lock 549. The rear panel 519 is in operatively supported connection with the housing 512 and is operatively supported by the housing 512 through two-horizontally disposed members 585, 587. In an exemplary embodiment, the two horizontally disposed members 585, 587 are slidable members adapted to enable the rear panel 519 to be moved away from the rear opening 524 of the housing 512. Further, the rear panel 519, when moved away from the rear opening 524, cooperates with the housing 512 and the two horizontally disposed members 585, 587 to define a space which may be at least partially occupied by the servicer 402 while servicing the machine 510. Various serviceable components, generally identified in FIG. 20 as components 558-563, may be supported by the rear panel 519, the housing 512, the chest 540, or combinations thereof.

Figure 21:
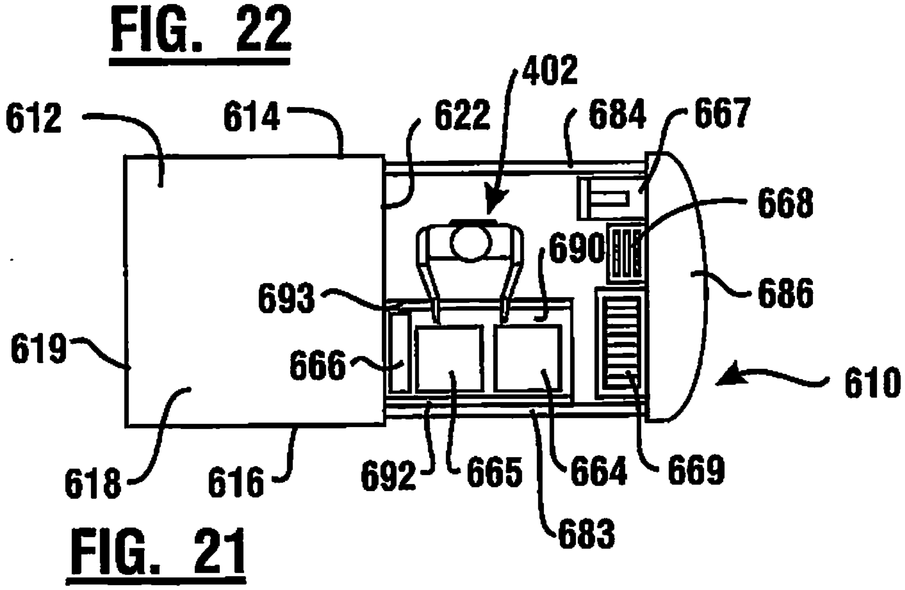
FIG. 21 is a plan view of an automated banking machine of an exemplary embodiment.

With reference to FIG. 21, in this exemplary embodiment there is shown therein an automated banking machine, generally indicated as 610. In this exemplary embodiment, the automated banking machine 610 is an automated transaction machine. The machine 610 includes a housing 612 mounted atop a chest (not shown). The housing 612 includes a first side wall 614, a second side wall 616, a rear wall 619, and a top wall 618, and defines a front opening 622. A fascia 686 is adapted to cover the front opening 622 of the housing 612 and may be secured to the housing 612 with a lock (not shown). The fascia 686 is in operatively supported connection with the housing 612 and is operatively supported by the housing 612 through two horizontally disposed members 683, 684. In an exemplary embodiment, the two horizontally disposed members 683, 684 are slidable members adapted to enable the fascia 686 to be moved away from the front opening 622 of the housing 612. Further, the fascia 686, when moved away from the front opening, 622, cooperates with the housing 612 and the two horizontally disposed members 683, 684 to define a space which may be at least partially occupied by the servicer 402 while servicing the machine 610. Various serviceable components, generally identified in FIG. 21 as components 664-669, may be supported by the fascia 686, the housing 612, the chest (not shown), or combinations thereof.

Also shown in FIG. 21, is an exemplary embodiment of a moveable component tray 690. The moveable component tray 690 may support one or more components, generally 664-666. The tray 690 is in operatively supported connection with the housing 612 and is operatively supported by the housing 612 through two horizontally disposed members 692, 693. In an exemplary embodiment, the two horizontally disposed members 692, 693 are slidable members adapted to enable the one or more components, generally 664-669, and their support tray 690 to be moved away from the housing 612 for servicing by the servicer 402. Even when the support tray 690 is moved away from the housing 612, the housing 612, the tray 690, one of the horizontally disposed members 684, for example, and the fascia 686 cooperate to define a space which may be at least partially occupied by the servicer 402. As will be appreciated by those skilled in the relevant art, the moveable tray 690 described herein and illustrated in FIG. 21 may also or additionally be included in a rear-access housing as illustrated in exemplary fashion in FIG. 20. As will also be appreciated by those skilled in the art, the support tray 690 may be disposed in a vertical orientation.

Figure 22:
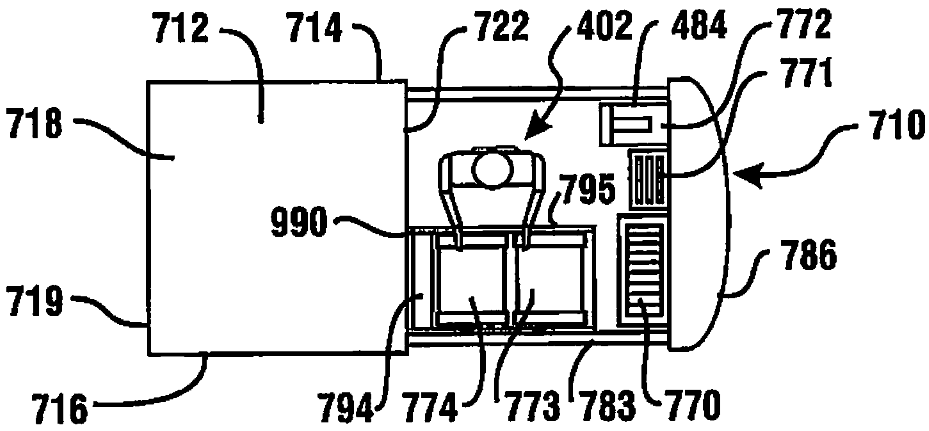
FIG. 22 is a plan view of an automated banking machine of an exemplary embodiment.

With reference to FIG. 22, in this exemplary embodiment there is shown therein an automated banking machine, generally indicated as 710. In this exemplary embodiment, the automated banking machine 710 is an automated teller machine. The machine 710 includes a housing 712 mounted atop a chest (not shown). The housing 712 includes a first side wall 714, a second side wall 716, a rear wall 719, and a top wall 718, and defines a front opening 722. A fascia 786 is adapted to cover the front opening 722 of the housing 712 and may be secured to the housing 712 with a lock (not shown). The fascia 786 is in operatively supported connection with the housing 712 and is operatively supported by the housing 712 through two horizontally disposed members 783, 784. In an exemplary embodiment, the two horizontally disposed members 783, 784 are slidable members adapted to enable the fascia 786 to be moved away from the front opening 722 of the housing 712. Further, the fascia 786, when moved away from the front opening 722, cooperates with the housing 712 and the two horizontally disposed members 783, 784 to define a space which may be at least partially occupied by the servicer 402 while servicing the machine 710. Various serviceable components, generally identified in FIG. 22 as components 770-775, may be supported by the fascia 786, the housing 712, the chest (not shown), or combinations thereof.

Also shown in FIG. 22, is an exemplary embodiment of a moveable component rack 790. The moveable component rack 790 may support one or more serviceable components, generally 773-775. The rack 790 is in operatively supported connection with the housing 712 and is operatively supported by the housing 712 through two horizontally disposed members 794, 795. In an exemplary embodiment, the two horizontally disposed members 794, 795 are slidable members adapted to enable the one or more components, generally 773-775, and their supporting rack 790 to be moved away from the housing 712 for servicing by the servicer 402. Even when the supporting rack 790 is moved away from the housing 712, the housing 712, the rack 790, one of the horizontally disposed members 784, for example, and the fascia 786 cooperate to define a space which may be at least partially occupied by the servicer 402. As will be appreciated by those skilled in the relevant art, the moveable rack 790 described herein and illustrated in FIG. 22 may also or additionally be included in a rear-access housing as illustrated in exemplary fashion in FIG. 20. As will also be appreciated by those skilled in the art, the supporting rack 790 may be disposed in a vertical direction.

Figure 23:
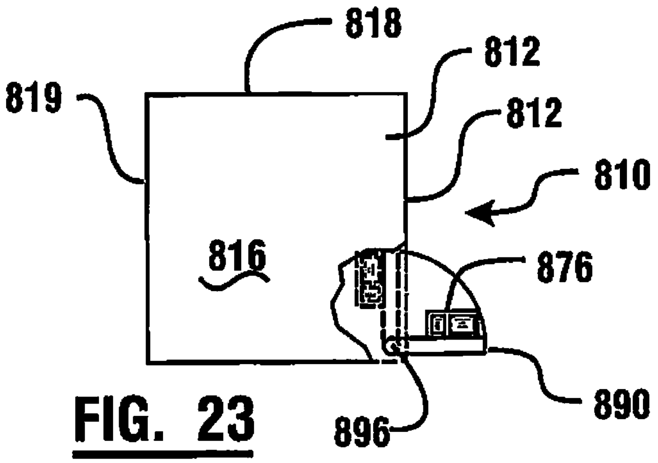
FIG. 23 is an elevation view, partly in phantom, of a portion of an automated banking machine of an exemplary embodiment.

With reference to FIG. 23, in this exemplary embodiment there is shown therein a portion of an automated banking machine, generally indicated as 810. In this exemplary embodiment, the automated banking machine 810 is an automated teller machine. The machine 810 includes a housing 812 mounted atop a chest (not shown). The housing includes a first side wall (not shown), a second side wall 816, a rear wall 819, and a top wall 818, and defines a front opening 822. Also shown in FIG. 23, is an exemplary embodiment of a pivotable component rack 890. The pivotable component rack 890 is in operatively supported connection with the housing 812 and is operatively supported by the housing 812 through a pivot 896. The pivotable component rack 890 may support one or more serviceable components, generally 876.

The pivot 896 is adapted to enable the one or more components, generally 876, and their pivotable component rack 890 to be moved away from the housing 812 for servicing by the servicer 402. As will be appreciated by those skilled in the art, the pivot 896 may alternatively be disposed in a vertical orientation.

An exemplary embodiment includes a method for accessing and servicing the contents, and particularly the serviceable components, of the housing to, but not limited to, clean, repair, or replace parts, make adjustments, replenish consumables such as paper, print materials, and lubricants, or exchange components. The method includes releasing the lock holding the cover adjacent to the opening of the housing of the automated banking machine and moving the cover away from the housing, wherein the cover remains in operatively supported connection with the housing, and wherein the cover is operatively supported by the housing through two horizontally disposed members. In an exemplary embodiment, the members are slidable horizontally disposed members and the method includes the step of sliding the cover away from the housing. The method further includes standing between the two horizontally disposed members and servicing at least one serviceable component of the automated banking machine. In a further exemplary embodiment, the method includes moving out from between the two horizontally disposed members, moving the cover back toward the housing, whereby the cover is positioned adjacent the housing opening, and securing the lock.

In a further exemplary embodiment, the method further includes moving the at least one component away from the housing for servicing. In a further exemplary embodiment, the step of moving the at least one component away from the housing includes sliding the at least one component away from the housing, pivoting at least a portion of the at least one component away from the housing, sliding a tray supporting the at least one component away from the housing, and sliding a rack supporting the at least one component away from the housing while standing between the two horizontally disposed members.

In a further exemplary embodiment, the method further includes moving the at least one component back into the housing after servicing. In a further exemplary embodiment, the step of moving the at least one component back into the housing includes sliding the at least one component back into the housing, pivoting the at least one portion of the at least one component back into the housing, sliding the tray supporting the at least one component back into the housing, and sliding the rack supporting the at least one component back into the housing while standing between the two horizontally disposed members.

As will be appreciated by those skilled in the art, the at least one component may alternatively be in operatively supported connection with the cover and the method include moving the at least one component moved away from the cover for servicing, servicing the at least one component, and subsequently moving the at least one component back to the cover. As will also be appreciated by those skilled in the art, the cover may comprise a fascia or a rear panel.

Exemplary embodiments may also include features described in U.S. Pat. Nos. 7,255,266; 7,251,626; 7,249,761; 7,246,082; 7,240,829; 7,240,827; 7,234,636; 7,229,009; 7,229,012; 7,229,008; 7,222,782; 7,216,801; 7,216,800; 7,216,083; 7,207,478; 7,204,411; 7,195,153; and 7,195,237 the disclosures of each of which are incorporated herein by reference in their entirety.

Figure 24:
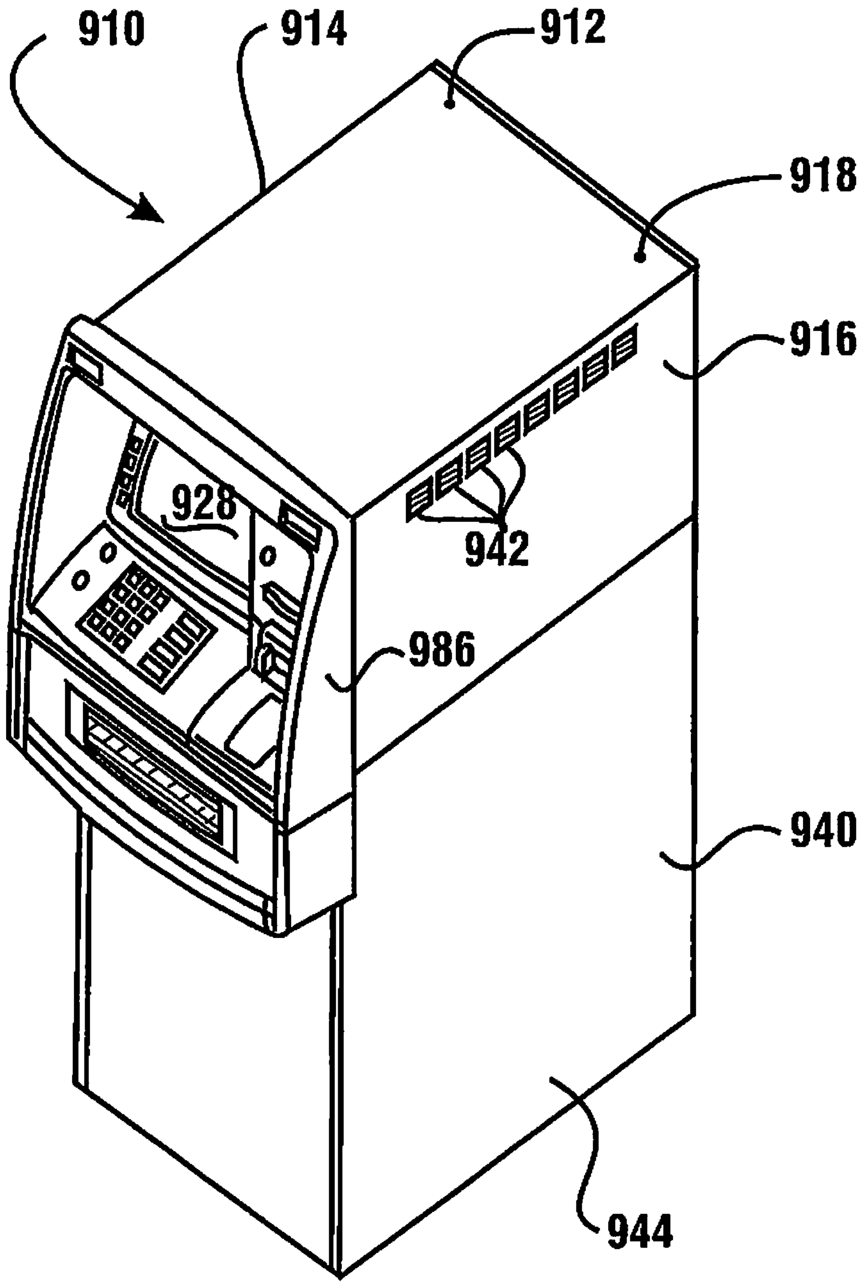
FIG. 24 is an isometric view of an automated banking machine of an exemplary embodiment.
Figure 25:
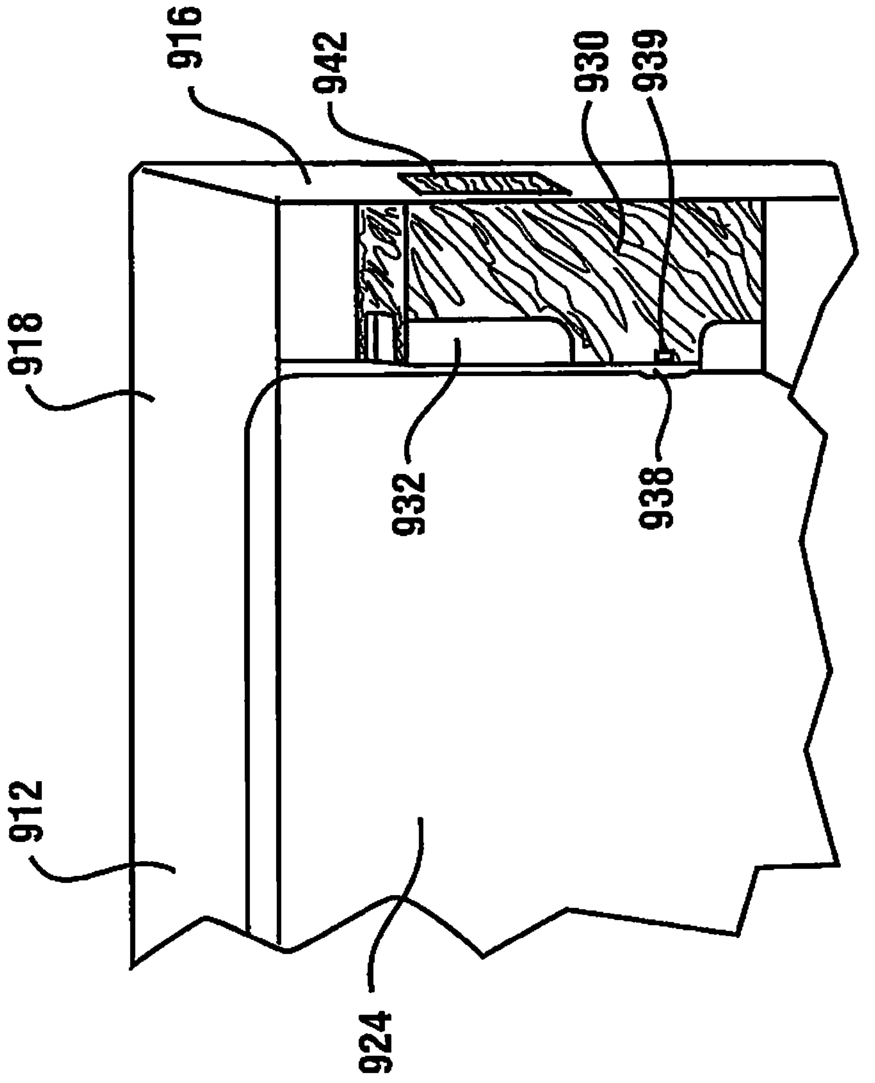
FIG. 25 is a view of a portion of an automated banking machine of an exemplary embodiment illustrating a component case assembled into a top housing.
Figure 26:
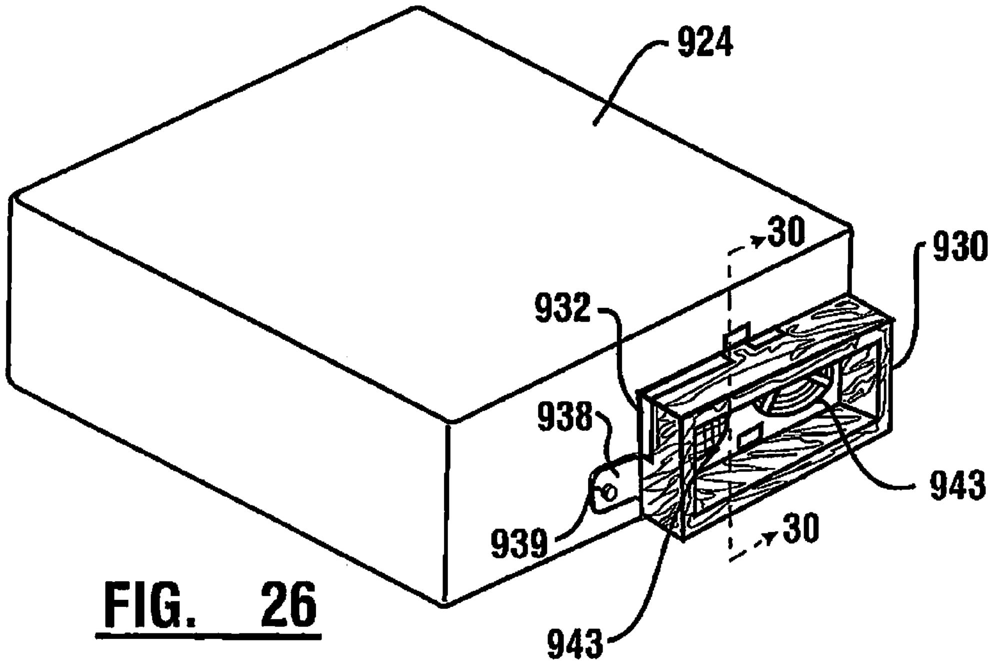
FIG. 26 is an isometric view of a portion of an automated banking machine of an exemplary embodiment illustrating a component case in combination with a duct assembly.

With reference to FIG. 24, in this exemplary embodiment there is shown therein an automated banking machine, generally indicated as 910. In this exemplary embodiment, the automated banking machine 910 is an automated teller machine. The machine 910 includes a housing 912 mounted atop a chest 940. The chest 940 may be enclosed in a chest housing 944. The housing 912 includes a first sidewall 914, a second sidewall 916, and a top wall 918, and defines an opening 22 (shown in exemplary fashion in FIG. 2) to an interior area 20 (shown in exemplary fashion in FIG. 2). The housing 912 further includes housing vents 942 formed in the sidewalls 914, 916 which provide ventilation and enable the movement of air from within the housing 912, in particular to help cool electronic parts contained, for example, in a component case 924 (FIG. 25). An upper fascia 986 provides an attractive appearance as well as security. The fascia 986 is in operatively supported connection with the housing 912 and moveable between a secure closed position adjacent to the housing opening 22 and a released away position (FIGS. 1 and 2). In the exemplary embodiment, a card reader 24 (shown in exemplary fashion in FIG. 3) is in operatively supported connection with the housing 912 and is operative to read indicia on user cards corresponding to financial accounts. Also in the exemplary embodiment, a display 928 and a cash dispenser 64 (shown in exemplary fashion in FIG. 3) are in operatively supported connection with the housing 912. The component case 924 (FIG. 25), which may be a processor case, is in operatively supported connection with the housing 912 and may contain computer processors and related electronic components (not shown). As shown in FIG. 26, but best seen in FIG. 27, the component case 924 further includes one or more component case vents 943 which may cooperate with one or more fans or other air movement devices (not shown) to help ventilate the interior of the component case 924.

As will be understood from FIGS. 24 and 25, ventilation air from the interior of the component case 924 may not easily circulate outside the housing 912 which encloses the case 924 as well as other components of the machine 910. As shown in exemplary fashion in FIG. 25, a duct 930 is disposed between the component case 924 at the component case vents 943 (FIGS. 26 and 27) and the housing sidewall 916 at the at least one housing vent 942 (FIGS. 24 and 25). Air from the interior of the component case 924, by way of example only, warm air heated by the operation of processors or other components within the case 924, may then be guided to outside the housing 912. Likewise, depending upon the direction of air flow, cooler air from outside the housing 912 may be guided to the interior of the component case 924. In an exemplary embodiment, the duct 930 is adhered to the component case 924 with an adhesive 936 (shown in exemplary fashion in FIG. 30). In a further exemplary embodiment, the duct 930 may be adhered to the housing 912. In a further exemplary embodiment, the adhesive 936 is releasable. In a further exemplary embodiment, the adhesive is resealable. Thus, the duct 930 may be released from its position and later resealed.

Figure 27:
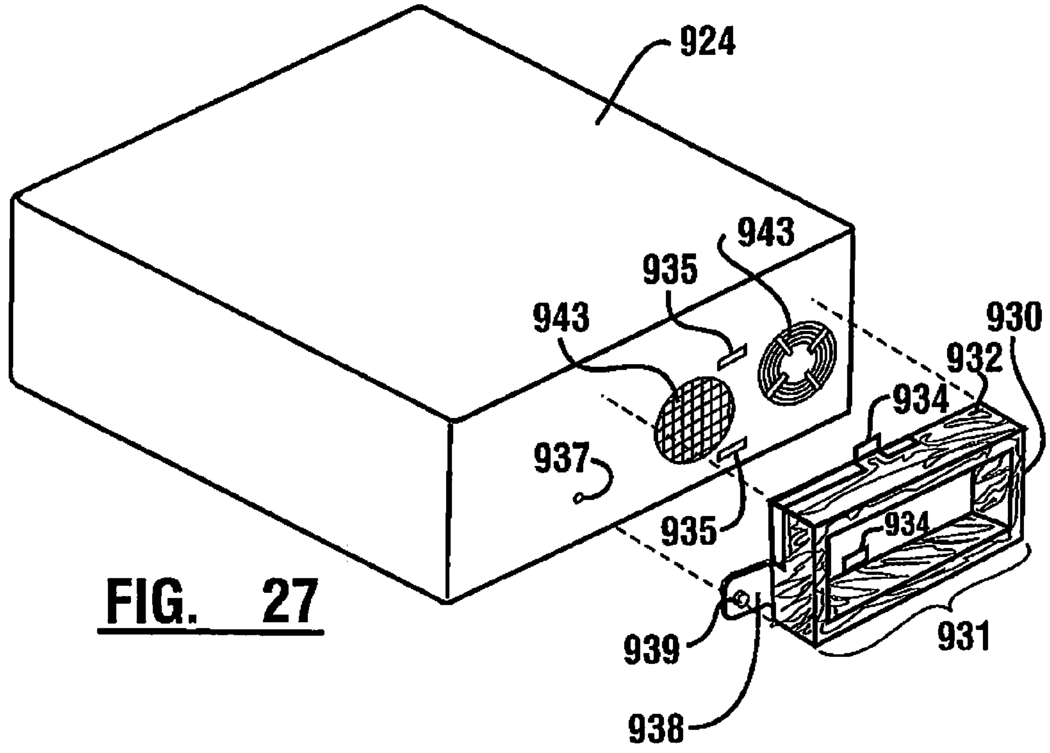
FIG. 27 is an exploded isometric view of the automated banking machine of the exemplary embodiment of FIG. 26.
Figure 28:
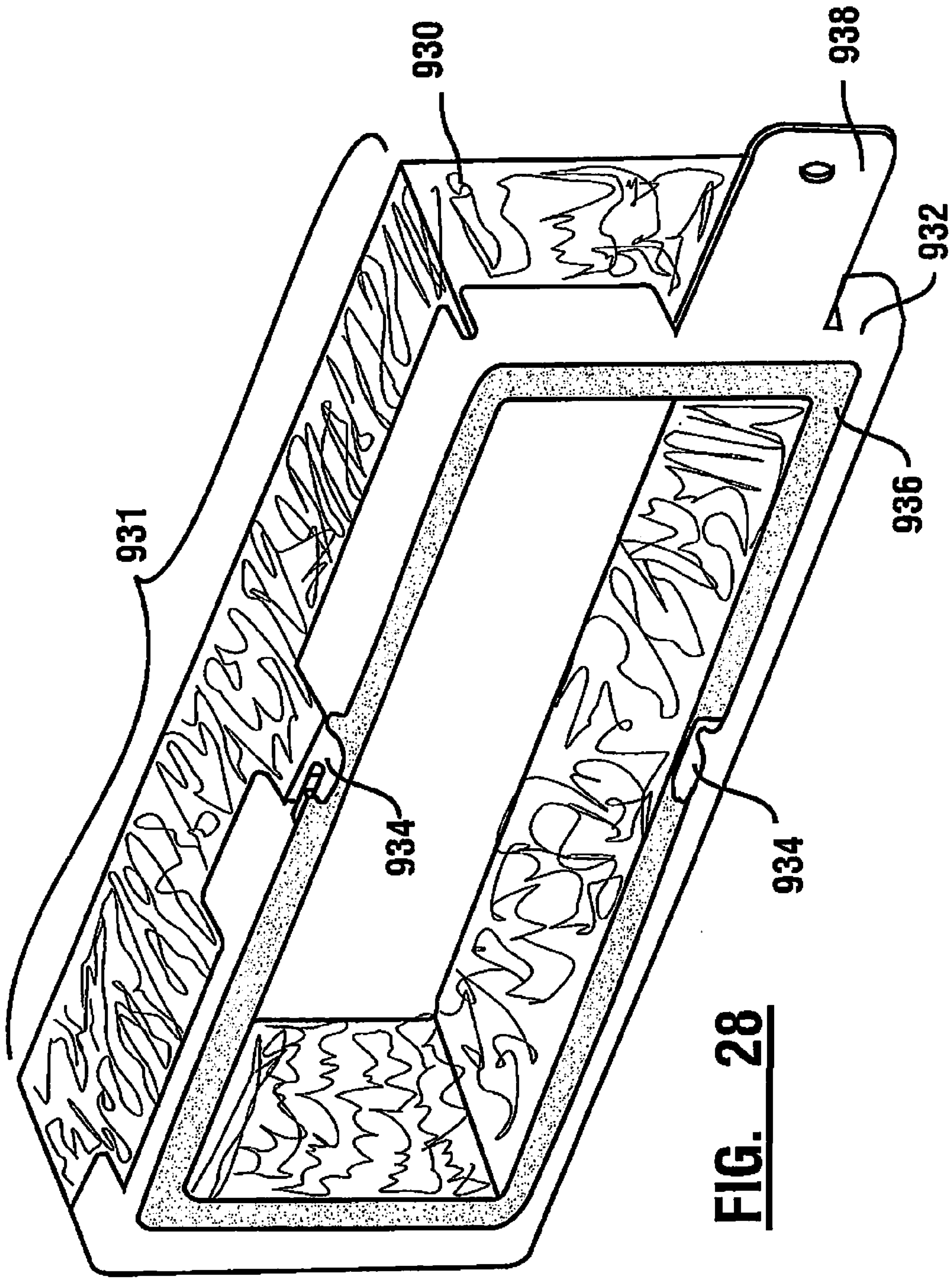
FIG. 28 is an isometric view of a duct assembly portion of an automated banking machine of an exemplary embodiment illustrating the details of the duct assembly.
Figure 30:
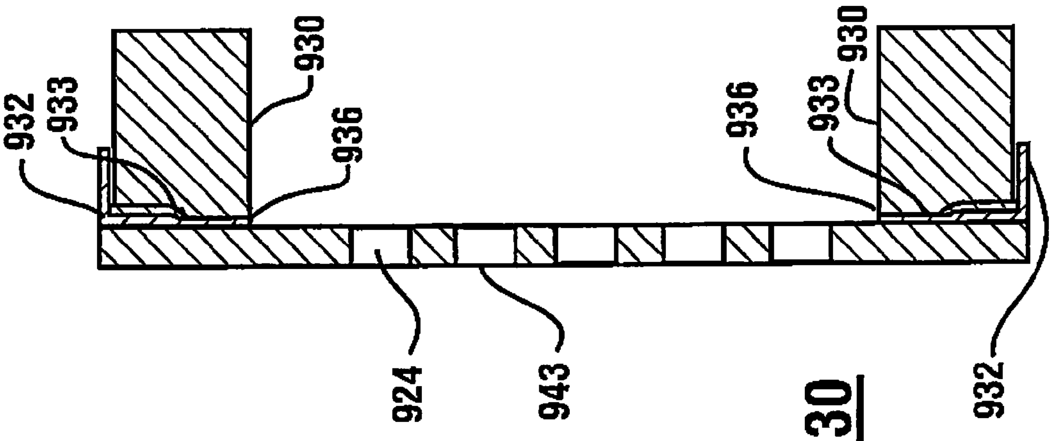
FIG. 30 is a partial section view taken along the line 30-30 of FIG. 26.
Figure 29:
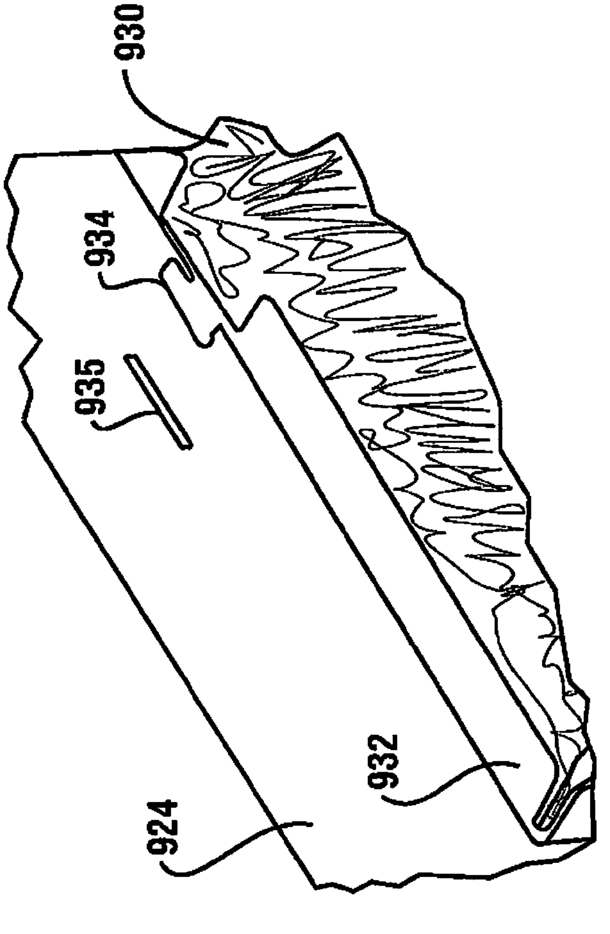
FIG. 29 is an isometric view of a portion of a duct assembly portion and a portion of a component case portion of an automated banking machine of an exemplary embodiment illustrating the details of the duct assembly and component case.

A further exemplary embodiment is shown in FIGS. 27 and 28 which generally illustrate a duct assembly 931. The duct assembly 931 may comprise a duct 930 to which a frame 932 has been secured. In a further exemplary embodiment, the frame 932 may include one or more tabs 938, one or more hooks 934, or combinations of tabs 938 and hooks 934. In an exemplary embodiment, the frame 932 is adhered to the duct 930 with an adhesive 936 (FIGS. 28 and 30). In a further exemplary embodiment, the one or more tabs 938 cooperate with, for example, one or more fasteners 939 (FIGS. 25 and 27) and one or more apertures 937 in the component case 924 to secure the duct 930 to the component case 924. While the fastener 939 is shown as a screw, it is to be understood that other fasteners may be employed. In an exemplary embodiment, the one or more hooks 934 cooperate with one or more component case slots 935 to secure the duct 930 to the component case 924. While the duct assembly 931 is shown in exemplary fashion as secured to the component case 924, the duct assembly 931 may be secured to the housing 912, for example, the housing sidewall 916, or to other cases or elements of the machine 910.

In a further exemplary embodiment, as shown in FIG. 30, the duct assembly 931 is adhered to the component case 924 with adhesive 936. The adhesive 936 is secured to an edge 933, proximate the component case 924, and the duct assembly 931 adhered to the component case 924. As shown in FIG. 30, the adhesive 936 may secure the frame 932 to the duct 930 and the adhesive 936 may secure the duct assembly 931 to the component case 924. It is to be understood that the adhesive material used to secure the frame 932 to the duct 930 may not be the same adhesive material used to secure the duct assembly 931 to the component case 924. In a further exemplary embodiment, the frame 932 is secured to the duct 930 by other means. As can be seen from FIG. 30, forming the duct 930 from deformable material, such as foam, enables the duct 930 to deform around the frame 932 thickness and contact the component case 924.

In an exemplary embodiment, a method is provided. The fascia 986 is moved from a position adjacent the opening 22 (FIG. 2) to the interior 20 of the housing 912 of the automated banking machine 910 to a position away from the opening 22. The component case 924 is moved from a position within the interior 20 of the housing 912 to a position at least partially extending through the opening 22. The duct assembly 931, at least partially secured to the component case 924 with the releasable resealable adhesive 936, is released from the component case 924. A component (not shown), at least partially contained within the component case 924 is serviced, the duct assembly 931 adhered to the component case 924, and the component case 924 moved from the position at least partially extending through the opening 22 to the position within the interior 20 of the housing 912. The fascia 986 is moved from the position away from the opening 22 of the housing 912 to the position adjacent the opening. In a further embodiment, the duct assembly 931, comprising the deformable duct 930 with releasable resealable adhesive 936 secured thereto, the duct 930 is deformed to adhere to the component case 924. The duct 930 may also be comprised of resilient material. In a further embodiment, the duct assembly 931, further comprising the duct frame 932 having at least one hook 934 and the component case 924, further comprising the at least one slot 935, the at least one hook 934 is mated with the at least one slot 935. In a further embodiment, the duct assembly 931 further comprises the frame 932 having at least one tab 938 and at least one fastener 939 in operative connection with the at least one tab 938 and the component case 924 further includes at least one fastener hole 937. The at least one fastener 939 is mated with the at least one fastener hole 937.

In a further exemplary embodiment, a method is provided. The housing 912 is mounted in supporting connection with the chest 44 (FIG. 2). The card reader 24 (FIG. 3) is installed in operatively supported connection with the housing 912, the display 928 is installed in operatively supported connection with the housing 912, and a cash dispenser 64 (FIG. 3) is installed in operatively supported connection with the housing 912. The component case 924, having at least one component case vent 943, is installed in operatively supported connection with the housing 912. The duct assembly 931, including a duct 930 is adhered to the component case 924. In a further exemplary embodiment, the duct assembly 931 further includes a frame 932 and the method further includes securing the frame 932 to the duct 930. In a further exemplary embodiment, the frame 932 is adhered to the duct 930. In a further exemplary embodiment, the frame includes at least one hook 934 and the component case 924 further includes at least one slot 935, the slot 935 adapted to accept the at least one hook 934, the method further comprising mating the at least one hook 934 and the at least one slot 935. In a further exemplary embodiment, the frame 932 includes at least one tab 938, the duct assembly 931 further includes at least one fastener 939, and the component case 924 further includes at least one fastener hole 937. The method further comprises mating the at least one fastener 939 and the at least one fastener hole 937.

The machine may be installed in location such as a pedestrian walkway or parking garage where the machine may be subject to wear and tear from the weather or other elements of the outside environment. FIGS. 31-34 show an exemplary arrangement that helps protect an automated banking machine from the outside environment. The exemplary arrangement includes an outer housing or enclosure 1000 that encloses a machine such as the machine 910 shown in FIGS. 24-30. The enclosure 1000 is box shaped and includes a base portion 1002 at a lower end of the enclosure 1000. The enclosure 1000 further includes a front wall 1004 and left and right sidewalls 1006, 1008 (as viewed in FIG. 33) that all extend upwardly from the enclosure base portion 1002. The enclosure 1000 also includes a top wall 1010 interconnecting the front wall 1004 and sidewalls at the top end of the enclosure 1000. The enclosure 1000 includes a rear access opening 1012 that allows access to an interior area. The access opening 1012 is opened and closed by a door 1014. Alternatively, the rear access opening may be opened and closed by an access panel. A doorstop 1016 is provided inwardly adjacent the right sidewall 1008 of the enclosure. A first seal portion 1018 is mounted to the doorstop at the upper portion. The enclosure 1000 includes an opening 1020 in the front wall for access to the fascia of the machine 910. The enclosure 1000 may be made of metal or other suitable material that helps protect the enclosure and the machine 910 from the outside environment. The enclosure 1000 may be anchored to a mounting structure 1001 such as a cement pad or other base surface via suitable anchors or mounting fasteners.

The housing 912 of the machine may be removably positioned in the enclosure 1000. As previously mentioned, the component case 924 of the machine 910 is in operatively supported connection with the housing 912 and may contain computer processors and related electronic equipment. The component case further includes component case vents 943 which may cooperate with one of more fans or other air movement devices to help ventilate the interior of the component case. However, the enclosure 1000 that encloses the machine facilitates the flow of air into and out of the component case via the housing vents 942 in the housing 912. Hence, the heat in the processor will be able to readily escape from the enclosure 1000.

Figure 34:
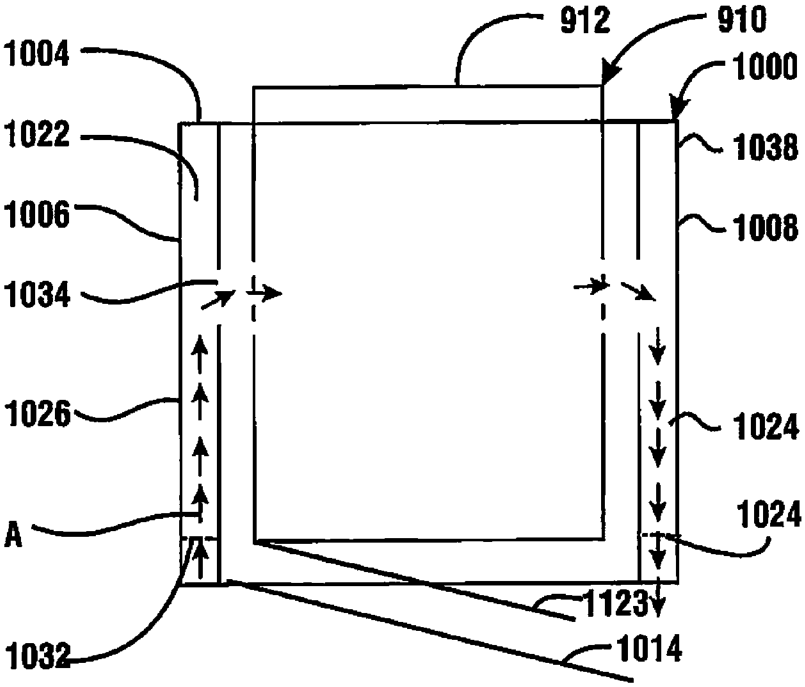
FIG. 34 is a top schematic plan view of the enclosure of FIG. 31 with an automated banking inside the enclosure of FIG. 31 with the top wall removed for illustration purposes.

The exemplary enclosure includes a duct system that helps improve the air flow into and out of the component case to cool the processor and other components in the component case. In particular, the enclosure includes left and right duct portions 1022, 1024. The left duct portion 1022 is provided within the left sidewall 1006. Specifically, the left sidewall 1006 includes outer and inner faces or panels 1026, 1028 interconnected by a rear face 1030 of the left sidewall 1006 and the front wall 1004. The left duct portion 1022 is generally rectangular in cross section and defined by the front and top walls 1004, 1010 and the outer and inner faces 1026, 1028 of the left sidewall 1006. The left duct portion 1022 includes an air intake opening 1032 that is formed in the rear face 1030 of the left sidewall 1006 near the top of the left sidewall 1006. The left duct portion 1022 includes an outlet opening 1034 formed in the inner face 1028 of the left sidewall 1006. The outlet opening 1034 may be aligned with housing vents 942 of the housing 912 as seen in FIG. 34.

The right duct portion 1024 is provided within the right sidewall 1008. Specifically, the right sidewall 1008 includes inner and outer faces or panels 1036, 1038 interconnected by the front wall 1004 and a rear face 1039. The right duct portion 1024 is generally rectangular in shape and defined by the front and top walls 1004, 1010 and inner and outer faces 1036, 1038 of the right sidewall 1008. The right duct portion 1024 includes an air exhaust opening 1040 that is formed in the rear face 1039 of the right sidewall 1008 near the top of the right sidewall 1008. The right duct portion 1024 includes an inlet opening 1042 formed in the inner face 1036 of the right sidewall 1006. The inlet opening 1042 may be generally aligned with housing vents 942 of the housing 912. Optionally, the right and left duct portions may each be further defined by a respective bottom panel that is located at a height that is approximately the height of the bottom end of their associated intake and exhaust openings 1032, 1040.

Figure 31:
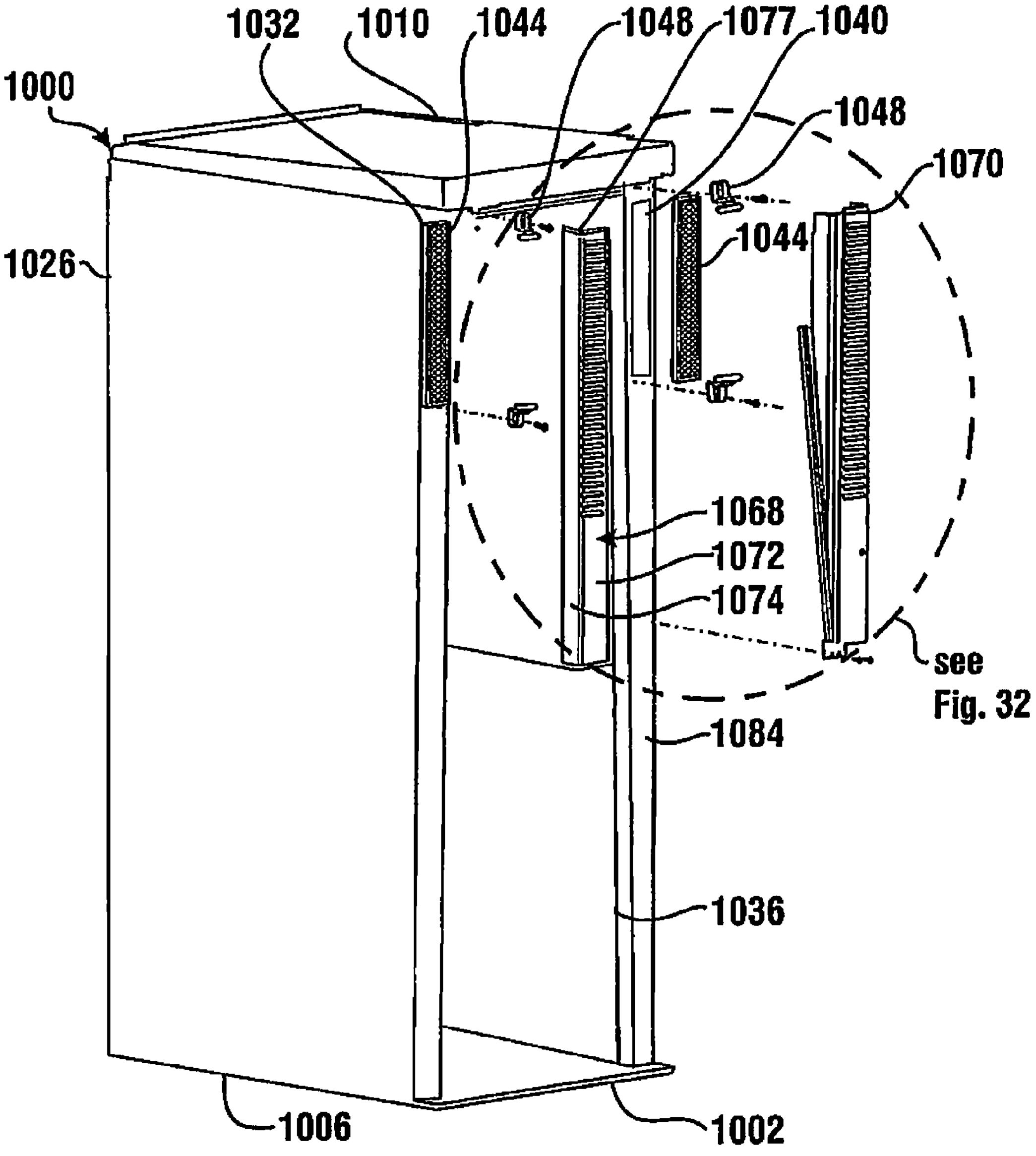
FIG. 31 is an exploded isometric view of an apparatus that includes an enclosure and related elements according to an exemplary embodiment.
Figure 32:
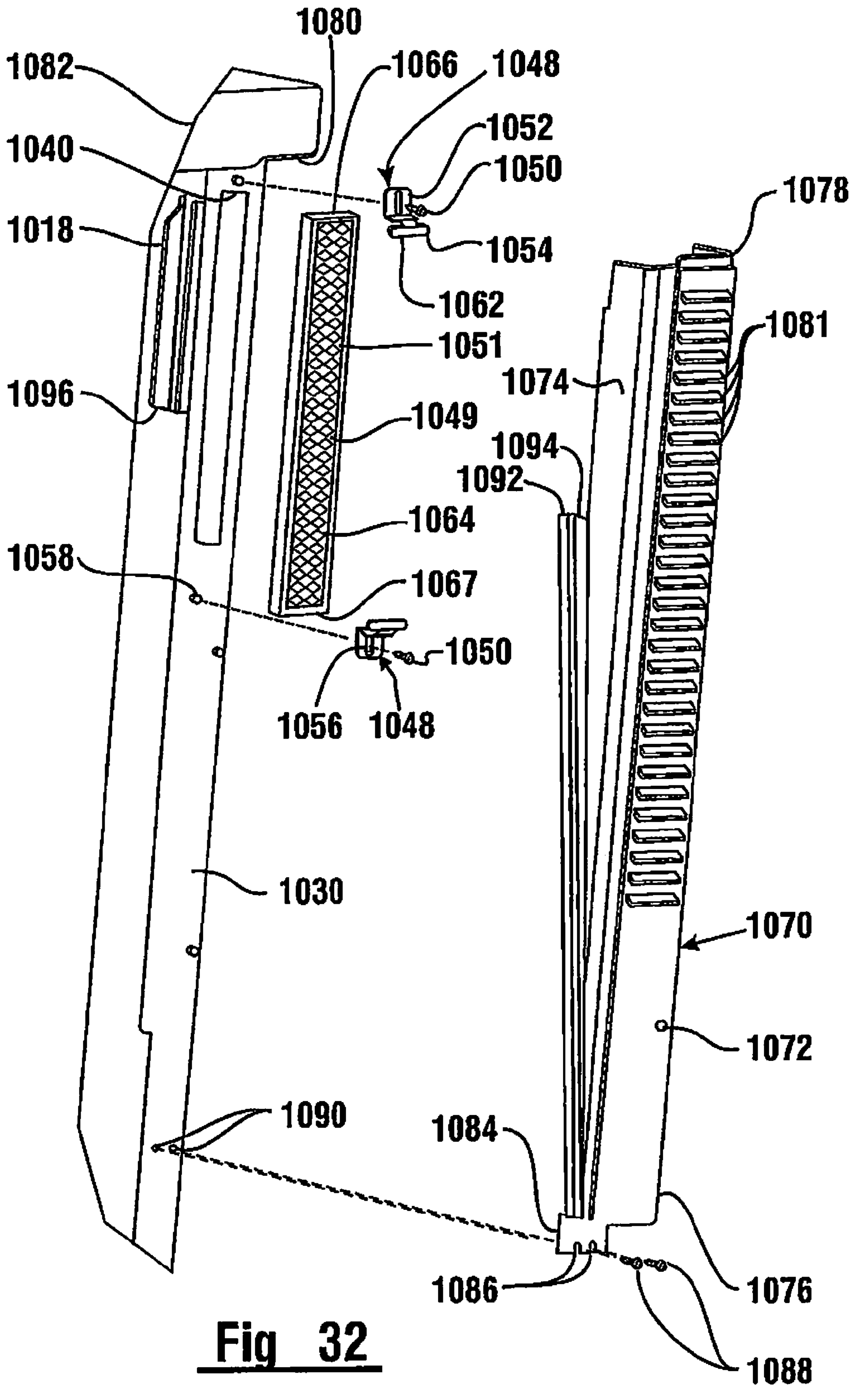
FIG. 32 is an enlarged view of a portion of the apparatus as indicated in FIG. 31.
Figure 33:
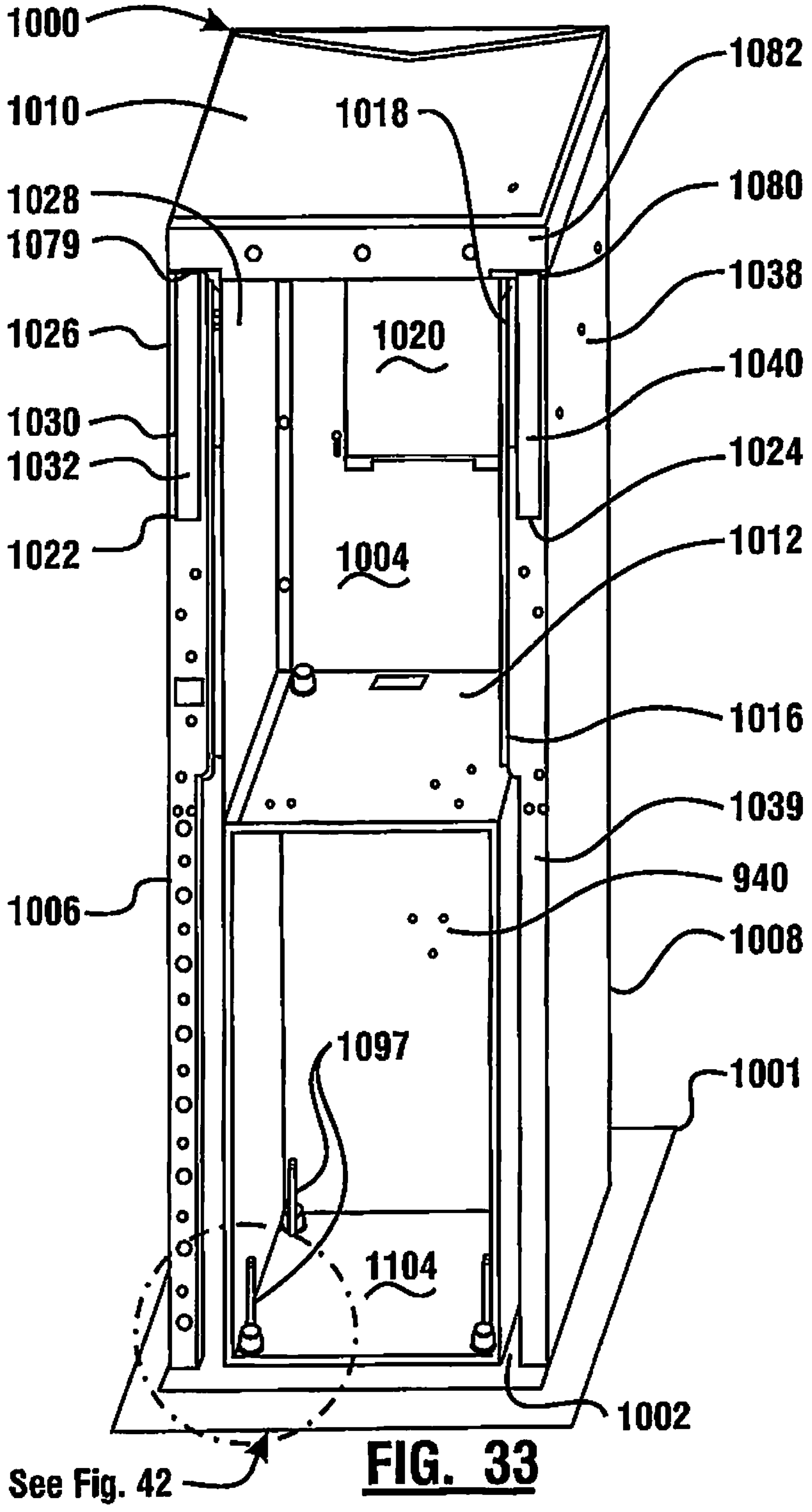
FIG. 33 is a rear isometric view of the enclosure of FIG. 31 enclosing elements of an automated banking machine.

Referring to FIGS. 31 and 32, a first air filter 1044 is removably mounted to the enclosure 1000 and covers the air intake opening 1032. A second air filter 1046 is removably mounted to the enclosure 1000 and covers the air exhaust opening 1040. Filter clips 1048 and fasteners 1050 are used to removably mount the filters 1044, 1046 to the rear faces 1030, 1039 of their corresponding left and right sidewalls 1006, 1008. Each filter, filter clip, and fastener is of similar construction function and thus only one will be described. Referring to FIG. 32, each of the filters includes a rectangular frame 1049 that surrounds meshed fibers or wires 1051 made of suitable filter material. Alternatively, the filter may be a pleated paper filter. Each clip 1048 is formed in one piece and includes a base plate 1052 and a retainer 1054. The base plate 1052 includes a mounting aperture 1056 for allowing the fastener 1050 such as a screw to threadily engage into an aperture 1058 of the rear face to mount the clip 1048 to the rear face. This mounting aperture 1056 is sized larger than the aperture to allow adjustment of the mounting position of the filter. The retainer 1054 is T-shaped and includes a stop 1060 that extends rearwardly from the base plate 1052 when the clip 1048 is mounted to the rear face. The retainer 1054 further includes a rectangular flange 1062 that extends radially outwardly relative to the stop 1060 from the rear end of the stop 1060.

When the filter is mounted to the rear face, the flange 1062 of one clip engages a rear surface 1064 of the filter at its upper end 1066 and the flange 1062 of another clip 1048 engages the rear surface of the filter at its lower end 1067 to retain the filter to the rear face. Also, the stops 1060 engage the upper and lower ends 1066, 1067 of the filter to prevent the filter from sliding along the rear face and out of its associated opening.

To mount the filter to the enclosure 1000, the filter is first aligned over its respective opening. Then the lower filter clip is positioned on the rear face such that the mounting aperture 1056 is aligned over the aperture 1058 in the rear face, the flange 1062 of the lower filter clip engages the rear surface 1064 of the filter and the stop 1060 engages the lower end 1067 of the filter. The fastener 1050 is screwed into the aperture 1058 of the rear face. Then, the upper filter clip is positioned on the rear face such that the mounting aperture 1056 is aligned over the aperture 1058 in the rear face, the flange 1062 of the upper filter clip engages the rear surface 1064 of the filter and the stop 1060 engages the upper end 1066 of the filter. The fastener is then screwed into the aperture of the rear face. Alternatively, the lower filter clip could mount the filter first or the filter could be mounted by both clips at the same time.

In the exemplary arrangement first and second filter covers 1068, 1070 are removably mounted to the enclosure and cover their respective first and second filters 1044, 1046 in an overlying relationship with the filters as depicted in FIGS. 31 and 32. Referring to FIG. 32, each cover is made of sheet metal and includes a rear wall 1072 that is interconnected by left and right sidewalls 1074, 1076. Louvers 1081 are spaced along the rear wall 1072 of the cover to allow the air to the flow through the cover. As depicted in FIG. 31, the first filter cover 1068 includes a tab 1077 that extends upwardly from the upper ends of the rear wall 1072 and left side wall 1074 of the first filter cover 1068. When the first filter cover 1068 is mounted to the enclosure, the tab 1077 extends into a slot 1079 (FIG. 33) formed between a lip 1082 of the top wall 1010 and the left sidewall 1006. As best depicted in FIG. 32, the second filter cover 1070 includes a tab 1078 that extends upwardly from the upper ends of the rear wall 1072 and right sidewall 1076 of the second filter cover 1070. When the second filter cover is mounted to the rear face, the tab 1078 extends into a slot 1080 formed between a lip 1082 of the top wall 1010 and the right sidewall 1008. Each cover also includes a mounting flange 1084 that extends downwardly from the lower end of the cover. The mounting flange 1084 also spans the left and right sidewalls 1074, 1076 at their front ends. The mounting flange 1084 includes a pair of mounting apertures 1086 for allowing fasteners 1088 such as screws to threadily engage corresponding apertures 1090 of the rear face to mount the lower end of the cover to the rear face. Each mounting aperture 1086 is sized larger than its respective aperture 1090 of the rear face to allow adjustment of the mounting position of the filter.

The second filter cover 1070 further includes a second seal portion 1092 that is attached to the front end of the left side wall 1074 and extends radially outwardly therefrom. The second seal portion 1092 also extends upwardly from the lower end of the second filter cover 1070 to a distance such that an upper end 1094 of the second seal portion 1092 is axially aligned and adjacent the lower end 1096 of the first seal portion 1018 when the second filter cover 1070 is mounted to the rear face 1030. Thus, when the second filter cover 1070 is mounted to the rear face 1030 of the right sidewall 1008, the first and second seal portions 1018, 1092 in combination extend along the door stop 1016 between the upper and lower end of the outer housing 912 of the machine 910 that houses the component case. The first and second seal portions 1018, 1092 are engaged by the door 1014 when the door 1014 is closed.

Each filter cover is mounted to the rear face of its associated sidewall by first inserting the tabs 1077, 1078 into their respective slots 1079, 1080 and then aligning the mounting apertures 1086 of the mounting flange 1084 with the apertures 1090 of the rear face. For the second filter cover 1070, the second seal portion 1092 is also aligned with the first seal portion 1018 as previously mentioned. The screws 1088 are then screwed into the apertures 1090 of the rear face and tightened to hold the filter with the enclosure. To remove the filter from the rear face, the filter cover is first removed by loosening the screws 1088 from the mounting flange 1084. Optionally the screws 1088 may be removed. Then the filter cover is moved downwardly to disengage the tab from the slot and then outwardly to move the filter cover away from the filter. The screw 1050 for the upper filter clip 1048 is then loosened and optionally removed, and the upper filter clip 1048 is removed. Then, the screw 1050 for the lower filter clip 1048 is loosened to enable disengagement of the filter from the enclosure 1000. Optionally, the screws 1050 and filter clips 1048 may be unfastened and removed from the enclosure to detach the filter from the rear face. It should be noted that the door 1014 should be opened first to move it away from the seal portions 1018, 1092 before removing the second filter cover 1070. After the filter is removed from the enclosure, another filter may then be installed according the previously mentioned steps.

The operation of the exemplary arrangement is as follows. Referring to FIGS. 31 and 34, fan 913 in the component case operates to draw air in through louvers 1081 of the first filter cover 1068 and then through the first filter 1044 to filter out dirt, dust and particulates. As shown by the arrows A of FIG. 34, the filtered air is then directed into intake opening 1032 of the left duct portion 1022 and out of the outlet opening 1034 and into the vents 942 located on the right side wall of the housing 912. The filtered air flows into the vents of the component case to cool the processor and other components. The filtered air then exits the component case through the vents and flows out of the vents 942 located in the left side wall of the housing 912. The air then flows into the inlet opening 1042 of the right duct portion 1024 and then out of the exhaust opening 1040. The air passes through by the second filter 1046 and then exits through the louvers 1081 of the second filter cover 1070. The duct system allows filtered air to flow readily into and out of the component case and thus provides greater heat dissipation. Also, the air is additionally filtered by the second filter 1046 on the exhaust opening 1040. Of course it should be understood that the enclosure is suitable for housing other types of automated banking machines where the internal components may cause air to flow in the opposite direction from that described.

Figure 36:
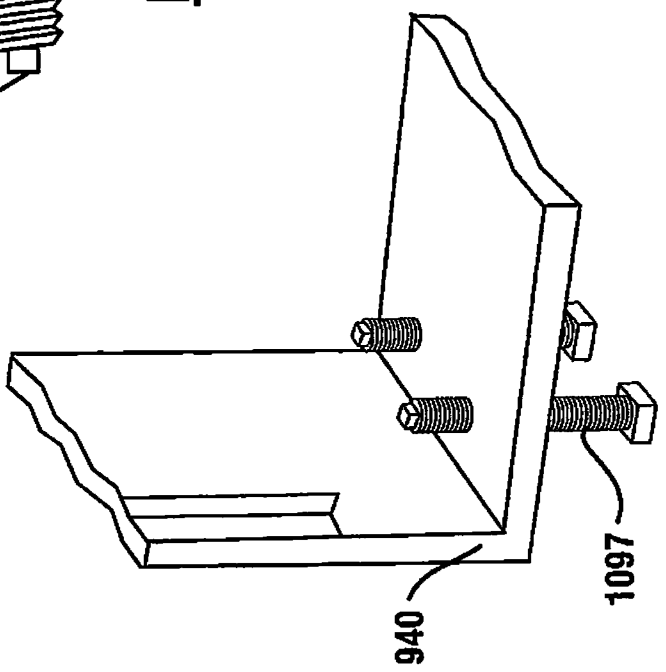
FIGS. 36-38 show exemplary embodiments of leveling legs for the automated banking of FIG. 33.
Figure 37:
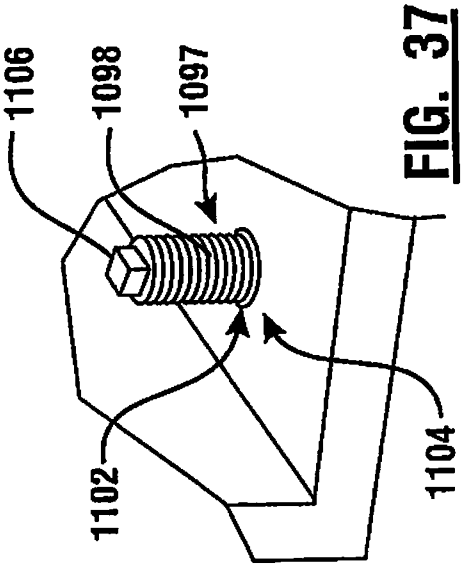
Figure 38:
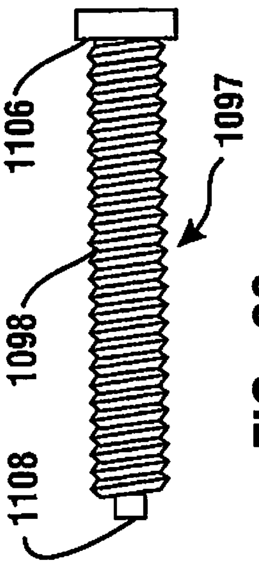

Exemplary embodiments of the automated banking machine may include a plurality of legs that extend under the chest which are operative to support the machine above the enclosure base portion, a floor or other surface. In an exemplary embodiment such legs may be adjustable in height to account for surfaces which are not level or are uneven. In addition in exemplary embodiments the legs may be adjustable in height from within the chest. FIG. 36 shows an exemplary embodiment of a leveling leg 1097 in operative connection with the chest 940 of the machine. As shown in FIGS. 37 and 38 the leveling leg 1097 may include a threaded shaft 1098 that is operative to screw up or down within a threaded hole 1102 through the bottom or base portion 1104 of the chest 940. The leg 1097 may include a base or foot end 1106 that is operative to engage and rest on a floor or other support surface. The foot 1106 can comprise a flange extending in a radial direction perpendicular to the axis of the shaft 1098. The flange can have a diameter greater than the diameter of the threaded portion of the shaft. The flange can have a circular, square, slotted, or other known shape or configuration. The foot end 1106 can be of a size to ensure a sufficient contact area with the supporting surface. The support strength and the diameter of the threaded shaft and the flange can be predetermined based on the weight of the machine.

As shown in FIG. 38, the leg 1097 may include a tool receiving end 1108 which has a size that is adapted to be turned by a wrench. In the exemplary embodiment the tool receiving end may include a square projection which is relatively narrower than the diameter of the threaded shaft 1098. When the automated banking machine is being assembled, the tool receiving end of the leveling leg may be inserted into the hole 1102 from underneath the chest. The leveling leg 1097 may then be rotated to screw the leveling leg further upward into the chest. To make an automated banking machine level on an uneven surface, one or more of the leveling legs may be rotated to increase or decrease the length of the leveling legs that extend below the chest. In an exemplary embodiment, the leveling process may include opening the chest door and turning one or more of the square tool receiving ends of the leveling legs with a wrench. For automated banking machines which include hardware devices in the chest such as currency cassettes, the hardware device may be either removed from the chest or the hardware device may be moved outward from the chest into a service position to provide access to the leveling legs. Examples of leveling legs are disclosed in U.S. Pat. No. 7,793,828, the entire disclosure of which is incorporated by reference in its entirety.

Figure 39:
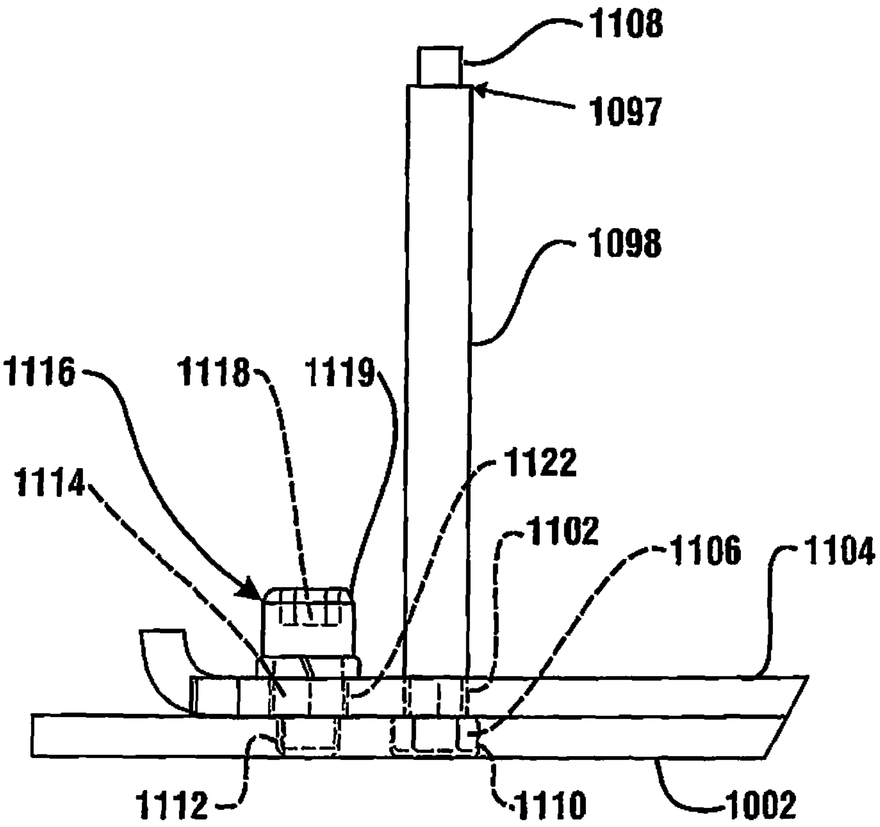
FIG. 39 is an enlarged view of a portion of the apparatus as indicated in FIG. 35.
Figure 41:
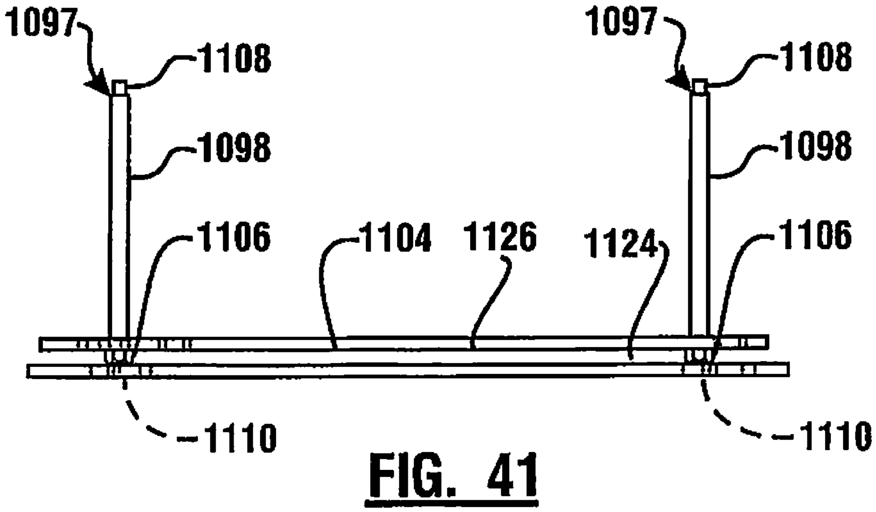
FIG. 41 a rear plan view of the chest base portion of the automated banking machine and the enclosure base portion shown in FIG. 33 with a skid member placed between them and the leveling legs positioned out of their apertures.
Figure 42:
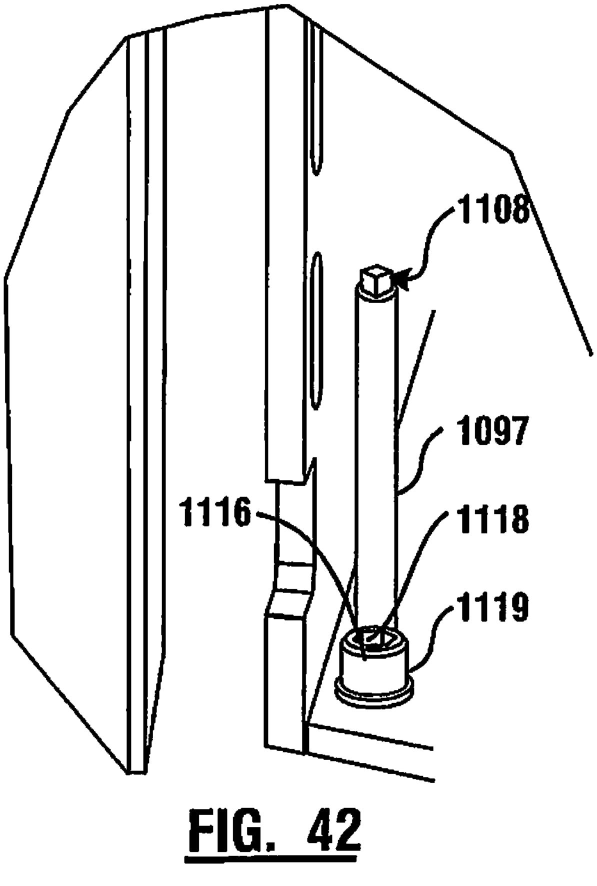
FIG. 42 is an enlarged view of a portion of the apparatus as indicated in FIG. 33.

The machine 910 may be installed in the exemplary enclosure and also at times may need to be removed from the enclosure for servicing, replacement or other reasons. Since the machine may be heavy, this may require additional labor to do so. An exemplary arrangement and method of installing and removing a machine in the enclosure that reduces the labor involved will now be discussed. In this arrangement, the base portion 1002 of the enclosure includes apertures 1110 as best seen in FIGS. 39 and 41. Referring to FIG. 39, each of the apertures 1110 receives a foot 1106 of the leveling leg 1097. The aperture 1110 has a cross section that is sized larger than the perimeter of the foot 1106 to allow the foot 1106 to slide or move freely downwardly into and upwardly out of the aperture. Alternatively, a recess may be provided instead of an aperture. The exemplary enclosure base portion 1002 further includes threaded holes 1112. Each of the threaded holes 1112 may receive a corresponding threaded shank 1114 of a bolt 1116. As seen in FIG. 42, the bolt 1116 includes a hexagonal socket 1118 in the head 1119 that can receive a corresponding hexagonal shaped projection of a tool such as an Allen wrench to screw the bolt into the threaded hole 1112.

Figure 35:
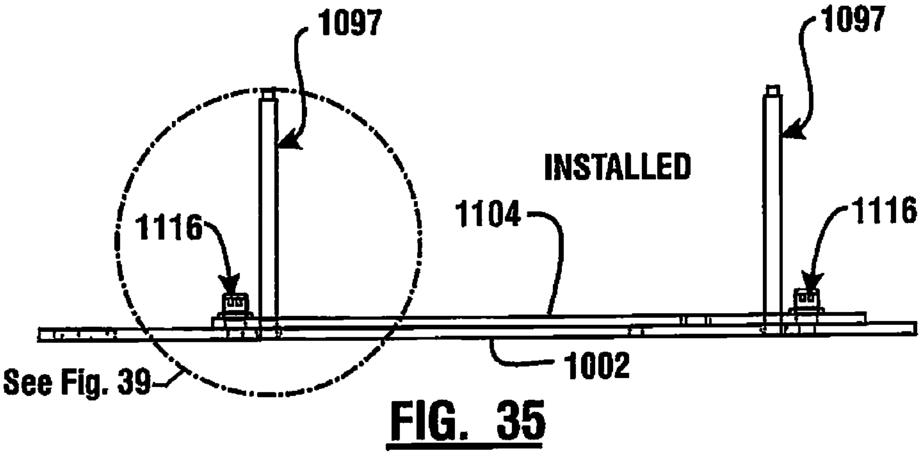
FIG. 35 is a rear plan view of the chest base portion of the automated banking machine installed on the enclosure base portion according to the exemplary embodiment shown in FIG. 33.
Figure 40:
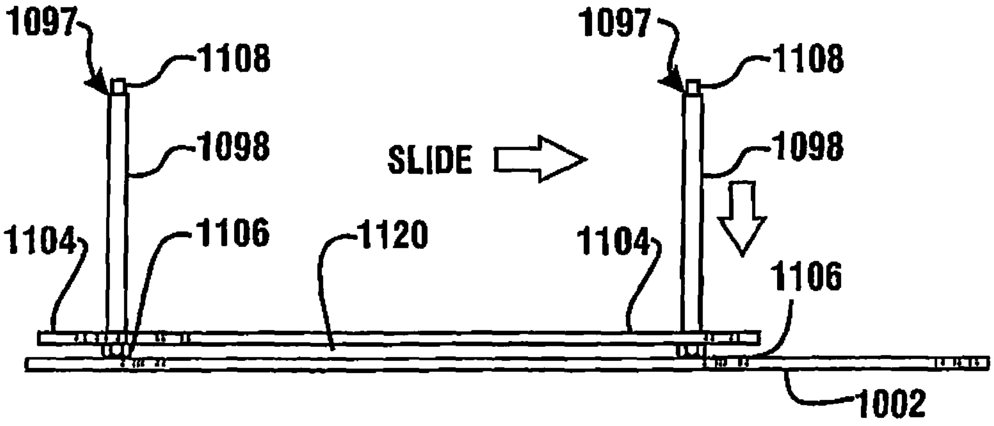
FIG. 40 is a view similar to FIG. 35 but with the leveling legs on the top surface of enclosure base portion prior to being placed in the apertures of the enclosure base portion.

To install the machine into the enclosure 1000, the machine is first positioned in the enclosure 1000 such that the foot portions 1106 of the leveling legs 1097 are on the interior surface 1120 of the enclosure base portion 1002 as shown in FIG. 40. Then, the machine is slid along the interior surface until the foot portions 1106 of the leveling legs 1097 drop into the apertures 1110 of the enclosure base portion 1002 as seen in FIGS. 35 and 39. In this position, apertures 1122 formed in the chest base portion 1104 align with the threaded holes 1112 of the enclosure base portion. This assures that the machine housing is moved to the proper position in the enclosure. The bolts 1116 are then inserted through the apertures 1122 and screwed into their corresponding threaded holes 1112 by an Allen wrench to hold the machine to the enclosure 1000. Door 1123 (FIG. 34) of the machine chest 940 is closed and then the door 1014 of the enclosure 1000 is then closed 1014.

To remove the machine 910 from the enclosure 1000, the door 1014 of the enclosure is first opened to gain access to the machine. Then the door 1123 of the chest 940 is opened to gain access to the heads of bolts 1116 and the tops of leveling legs 1097 in the interior area of the chest 940. This is done by unlocking the associated locking mechanisms on the enclosure door and chest. The bolts 1116 are then unfastened and removed from the threaded holes 1112 and apertures 1122 using an Allen wrench. The wrench for the leveling legs 1097 is then used to engage the tool receiving end 1108 of each of the leveling legs 1097. Each of the leveling legs 1097 is then rotated by the wrench in a clockwise direction (as viewed from the top of the chest base portion 1104), which rotation causes the chest base portion 1104 to move up and away from the enclosure base portion 1002 at least a predetermined distance. Then, as depicted in FIG. 41, one or more skid members 1124, which have a thickness that is less than the predetermined distance between the chest base portion 1104 and the enclosure base portion 1002, is inserted between the chest base portion and the enclosure base portion. The skid member 1124 should also have a width that is less than the distance between adjacent left and right leveling legs 1097 to allow the skid member 1124 to be inserted between the left and right leveling legs. The top surface 1126 of the skid member may include strips made of metal, wood or other suitable relatively low friction material that allows the chest base portion to slide along the skid member 1124.

After one or more skid members 1124 are inserted between the chest and enclosure base portions, each of the leveling legs 1097 are rotated in the counterclockwise direction (as viewed from the top of the chest base portion) to move the foot 1106 up and away from the associated aperture 1110 in the enclosure base portion as seen in FIG. 41 to allow the chest base portion 1104 to slide in engagement with the top surface 1126 of the skid member 1124. Then, the chest door 1123 is closed and the machine is slid along the skid member 1124 and out of the enclosure 1000. The exemplary enclosure shown and described houses an automated banking machine that has a rear chest door. Alternatively, an enclosure may have a front door for accommodating machines with a chest door that opens from the front of the chest. This will enable removal of the machine from the front of the enclosure rather than the rear. Of course, various configurations may be provided using the teachings herein.

FIGS. 43-56 show another alternative exemplary embodiment of an automated banking machine generally indicated 1150. This exemplary embodiment comprises a machine that operates to provide goods or services in response to value provided by a user. The exemplary machine shown comprises a vending machine that operates to provide a user with a service. Specifically, the embodiment shown comprises a commercial laundry machine such as a machine that operates to provide a washing or drying function for clothes in exchange for payment via currency or other received value. Of course it should be understood that this type of machine is merely exemplary of automated banking machines that may include the described features.

This exemplary embodiment accepts currency, which shall be defined for purposes hereof is including currency bills, coins, tokens, vouchers and other items of value. The exemplary embodiment includes a coin acceptor 1152. Coin acceptor 1152 is operative to receive a plurality of coins which may be provided as payment for operation of the machine. In the exemplary embodiment, the coin acceptor may be pushed inward so as to deposit coins positioned therein into an interior area of a coin holder housing 1154. As represented schematically in FIG. 54, the coin acceptor 1154 is in operative connection with at lease one machine control circuit 1156. The machine control circuit is in operative connection with one or more transaction function devices schematically represented 1158. In the exemplary embodiment the transaction function devices 1158 may include motors, solenoids, transmissions, cylinders, actuators or other types of devices that are operatively controlled to carry out washing or drying functions. Of course in other embodiments other types of transaction function devices may be employed. These may include, for example, cash dispensers, cash acceptors, cash recyclers, bill acceptors and other types of devices such as those previously discussed.

Figure 45:
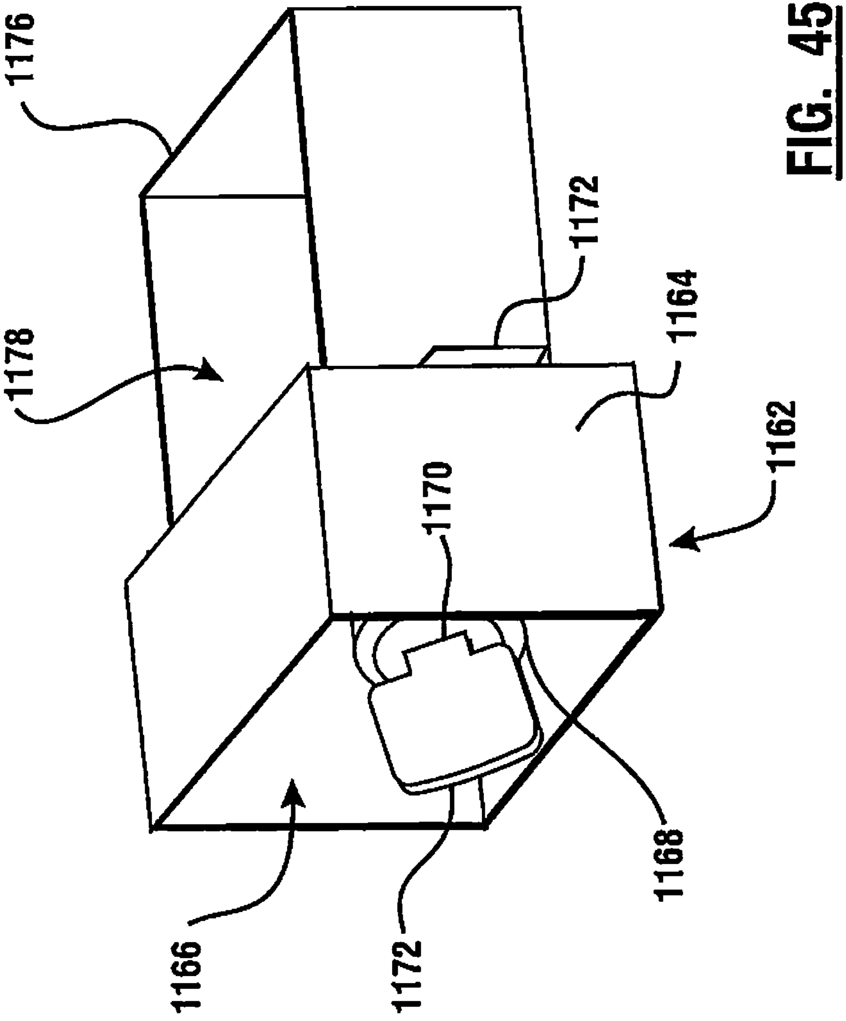
FIG. 45 is an isometric view showing a lockable door for a coin removal opening having an attached coin holding tray portion.
Figure 46:
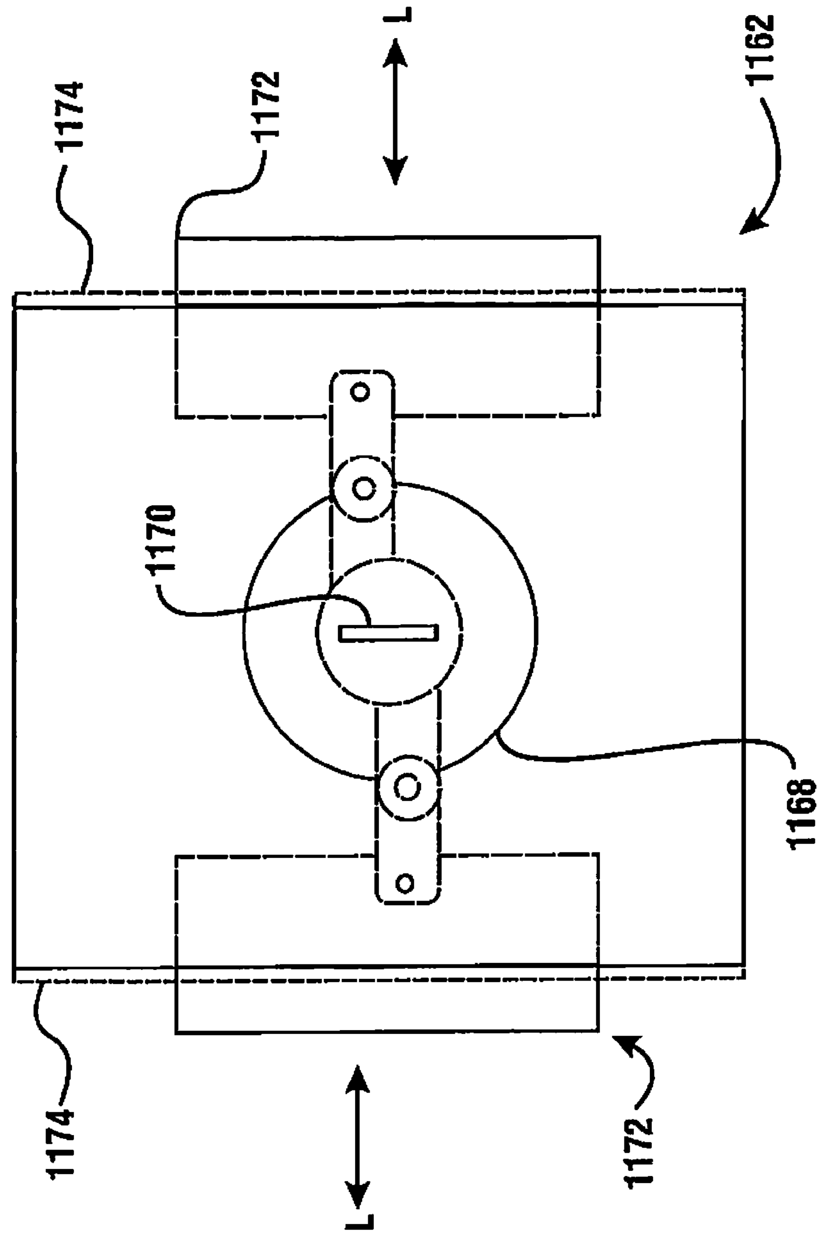
FIG. 46 is a plan view of an exemplary door as shown in FIG. 45.
Figure 47:
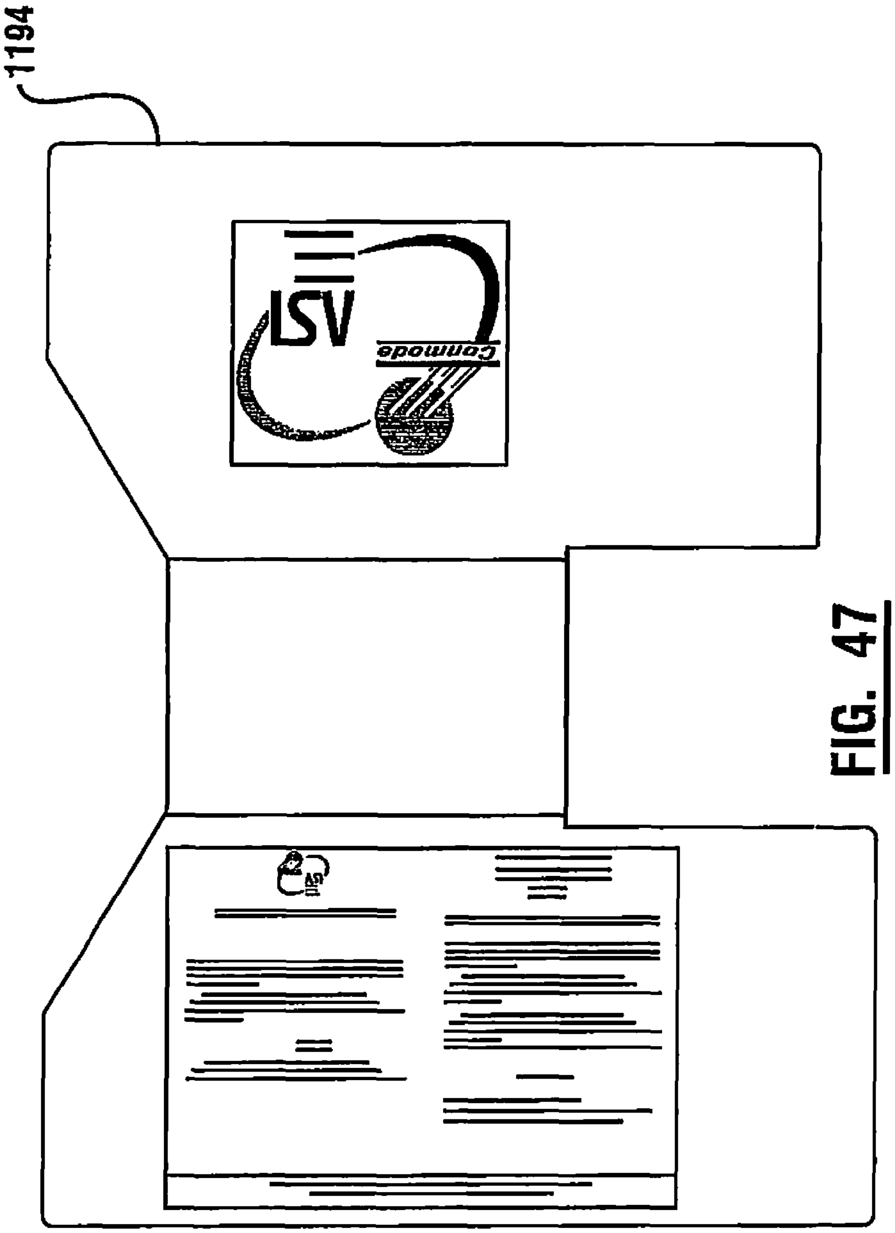
FIG. 47 is a plan view of the outside of an adhesive label adapted for attachment to a coin holder housing of the exemplary machine.
Figure 49:
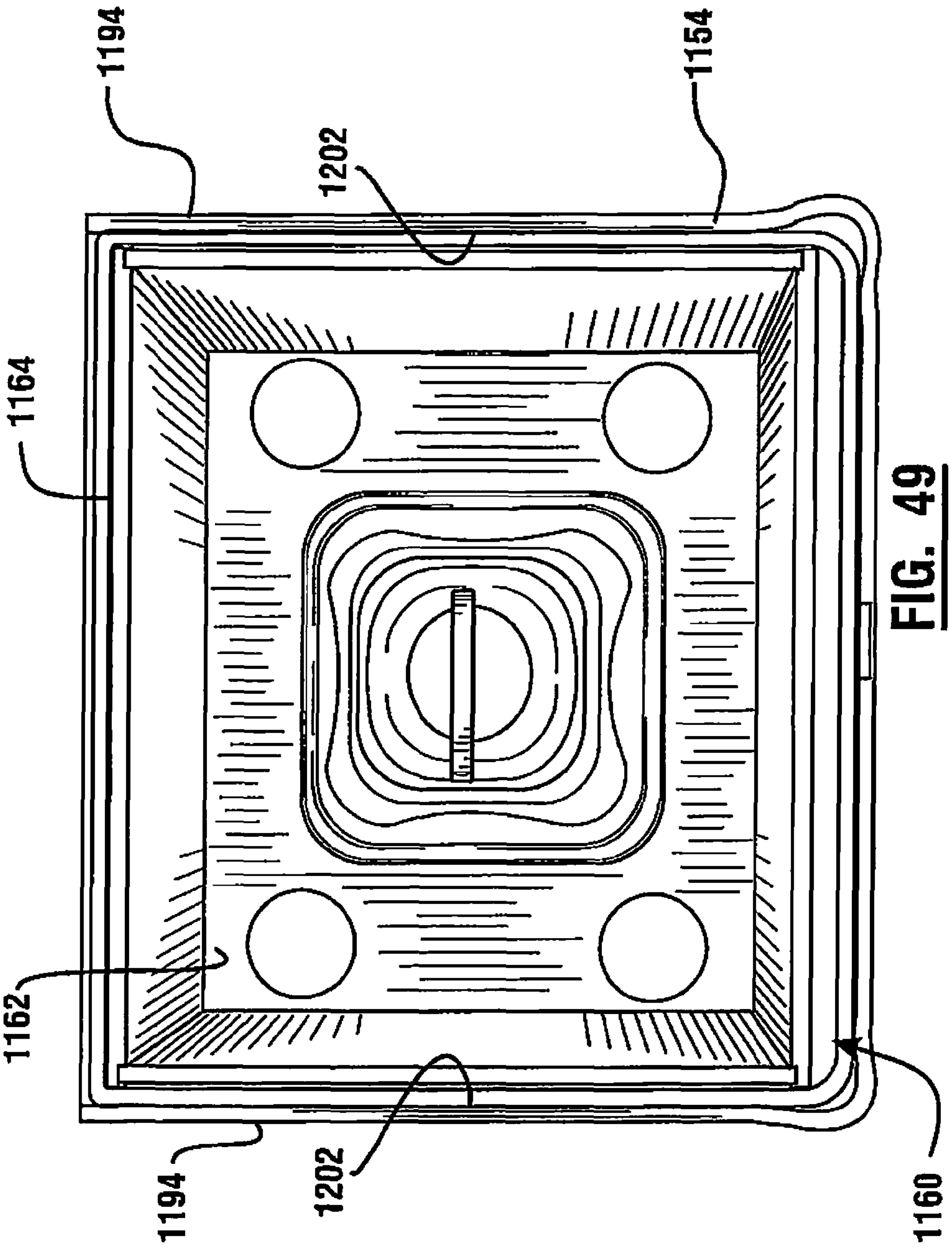
FIG. 49 is a front plan view of an exemplary coin holder housing with the coin removal opening thereof having the exemplary door positioned therein.

In the exemplary embodiment, the coin holder housing includes a coin removal opening 1160. In the operative position of the machine, the coin removal opening is closed by a door 1162. The exemplary door 1162 which is shown in greater detail in FIGS. 45, 46 and 49 is removably positionable in the coin removal opening. Thus in the exemplary embodiment, the door 1162 may be selectively positioned in a closed position so as to block the opening. Alternatively the door may be removed from the opening so as to allow access through the opening.

The exemplary door 1162 includes a box portion 1164. Box portion 1164 in the exemplary embodiment bounds an interior recess 1166. A lock 1168 is accessible within the recess in the exemplary embodiment. In the exemplary embodiment, the lock is changeable between a locked condition and an unlocked condition. The exemplary lock is changeable in condition responsive to an actuator which is accessible in the recess. In the exemplary embodiment, the actuator includes a key slot 1170 that can be rotated through use of a proper key 1172. Of course this actuator is exemplary and in other embodiments, other approaches may be used.

As best shown in FIG. 46, the exemplary lock 1168 is operative to change the position of a pair of opposed bolt portions 1172. The bolt portions are operative to extend outward in the locked condition of the lock relative to the position of the bolt portions when the lock is in the unlocked condition. In the locked condition of the bolt portions shown in FIG. 46, the bolt portions extend behind respective strike plates shown in phantom 1174. The strike plates are operative to prevent the door 1162 from being moved from the closed position to the open position when the lock is in the locked condition. In this exemplary embodiment, changing the lock to the unlocked condition causes the bolt portions 1172 to move inward along the direction of arrows L. This causes the bolt portions to be retracted inward relative to the strike plates. This enables the door to be removed from the coin removal opening and thus places the coin removal opening in the open position. Of course it should be understood that this arrangement is exemplary and in other embodiments, other approaches may be used.

Figure 50:
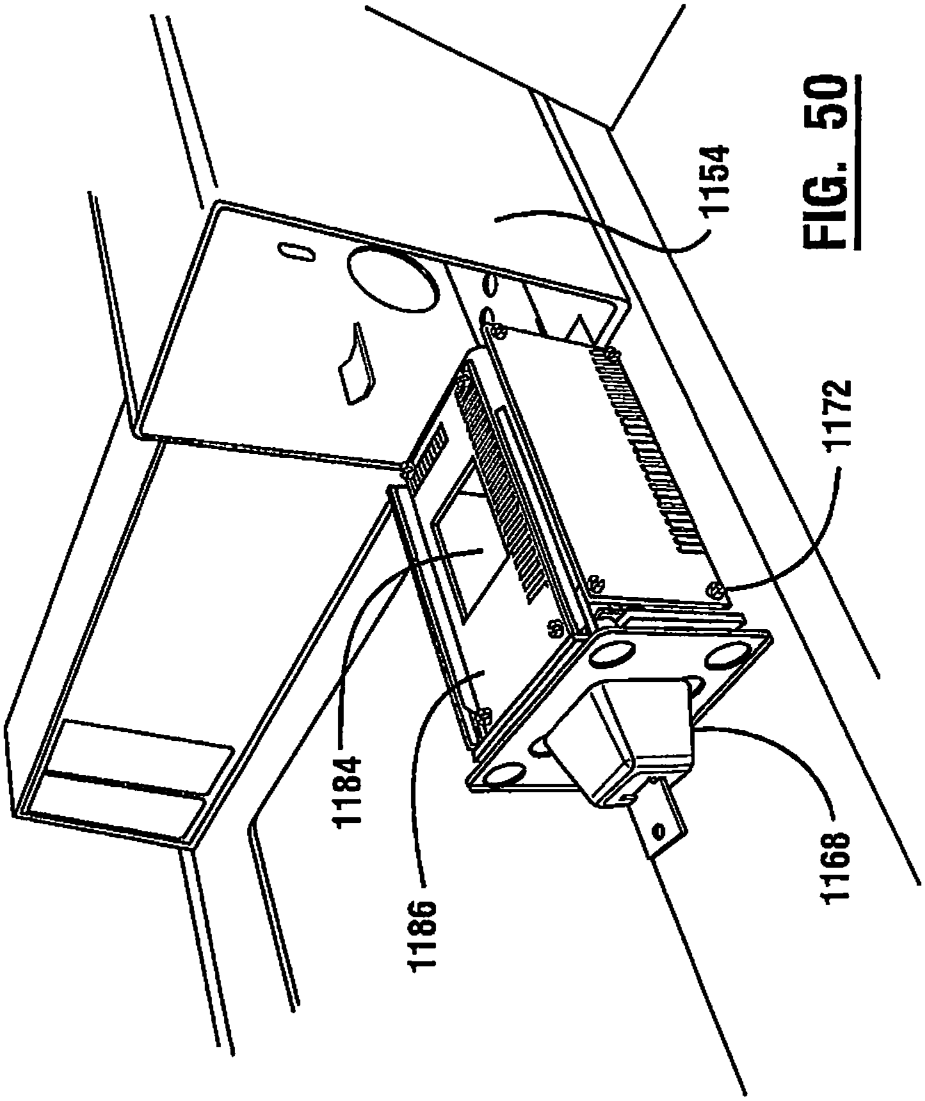
FIG. 50 is an isometric view of a portion of the exemplary door and tray portion with circuitry mounted thereto.
Figure 51:
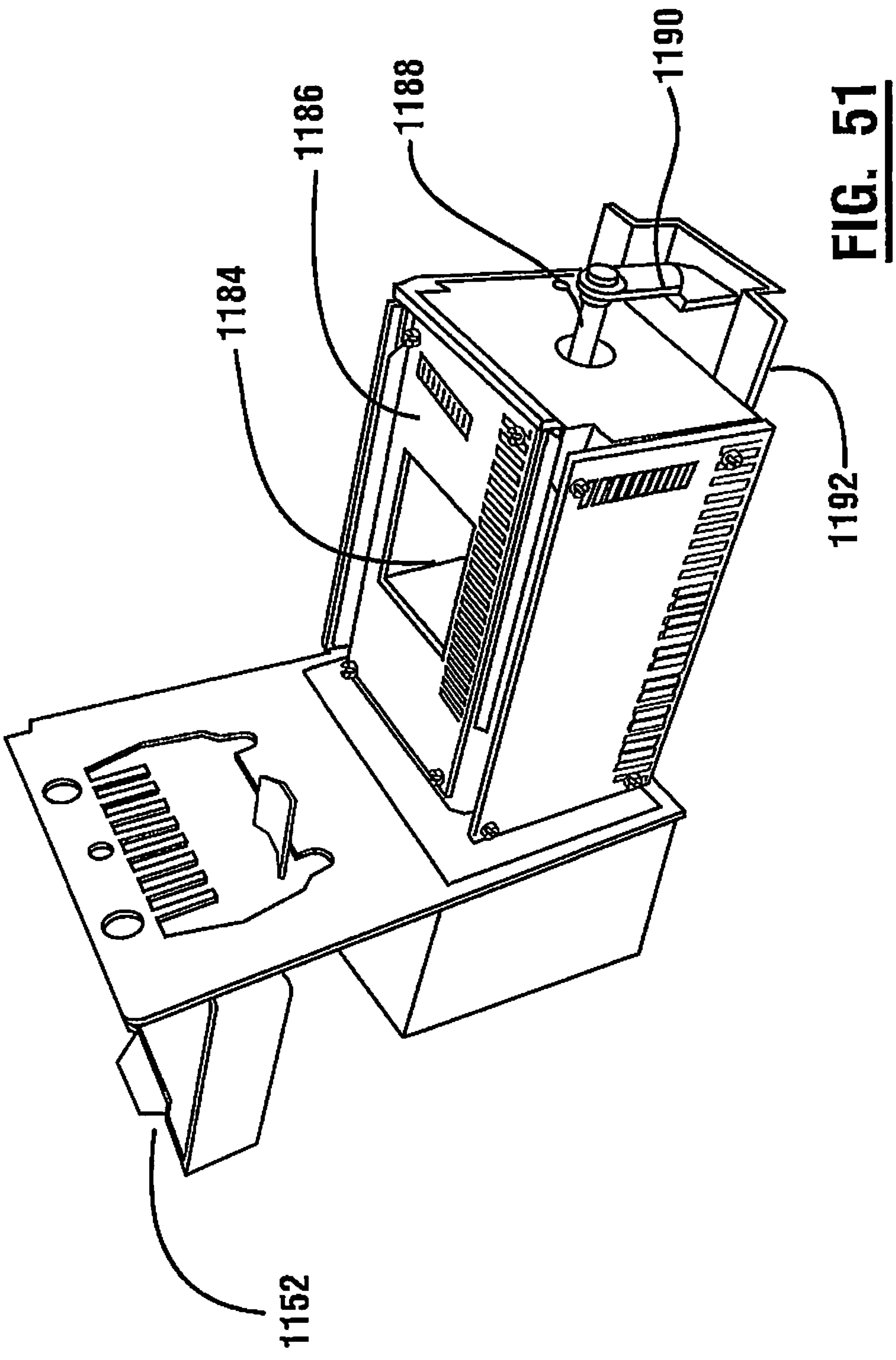
FIG. 51 is an isometric view of a portion of the coin holder housing, coin acceptor and removable tray portion of an exemplary embodiment.
Figure 52:
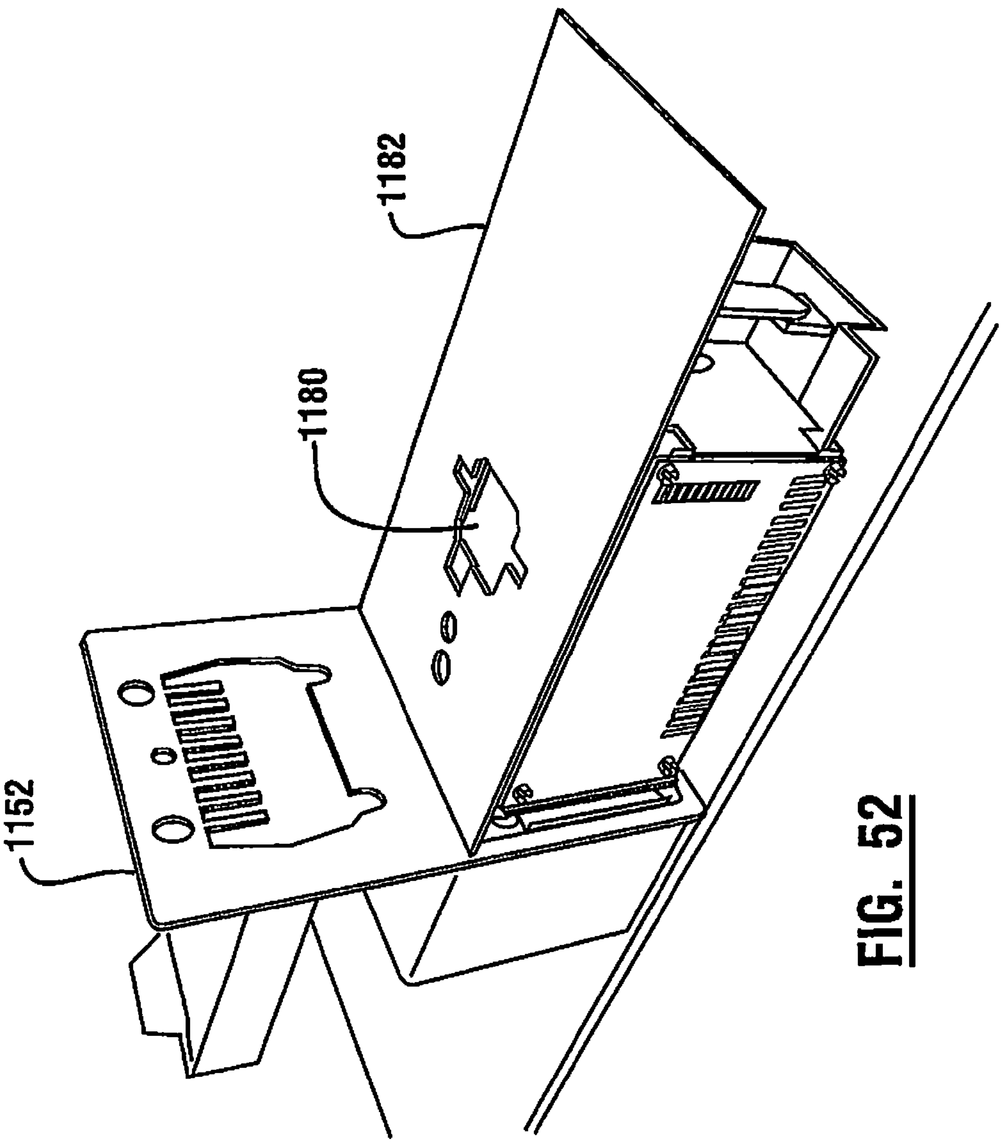
FIG. 52 is an isometric view similar to FIG. 51 showing the security plate positioned between the area of the coin acceptor and the coin holding tray portion.

As shown in FIG. 45, the exemplary door has in attached operative connection therewith, a tray portion 1176. Tray portion 1176 includes a holding area 1178. Holding area 1178 is configured for holding a plurality of coins that can be accepted through operation of the coin acceptor. As represented in FIGS. 50-52, the coin acceptor 1152 has an internal mechanism (not shown) which allows the determination to be made that the correct number and type of coins have been deposited in the coin acceptor to operate the machine. When the correct number and type of coins are present, the coin acceptor operates to allow the coins to move downward through an opening 1180 in a security plate 1182 that is positioned above the tray portion when the tray portion is in the operative position. In the exemplary arrangement, the opening 180 generally corresponds to an opening 1184 in a circuit card 1186 that in the exemplary embodiment is operatively connected to the tray portion. Coins accepted through operation of the coin acceptor pass through the opening 1184 and into the holding area of the tray portion. Of course this approach is exemplary and in other arrangements, other structures may be used.

Figure 53:
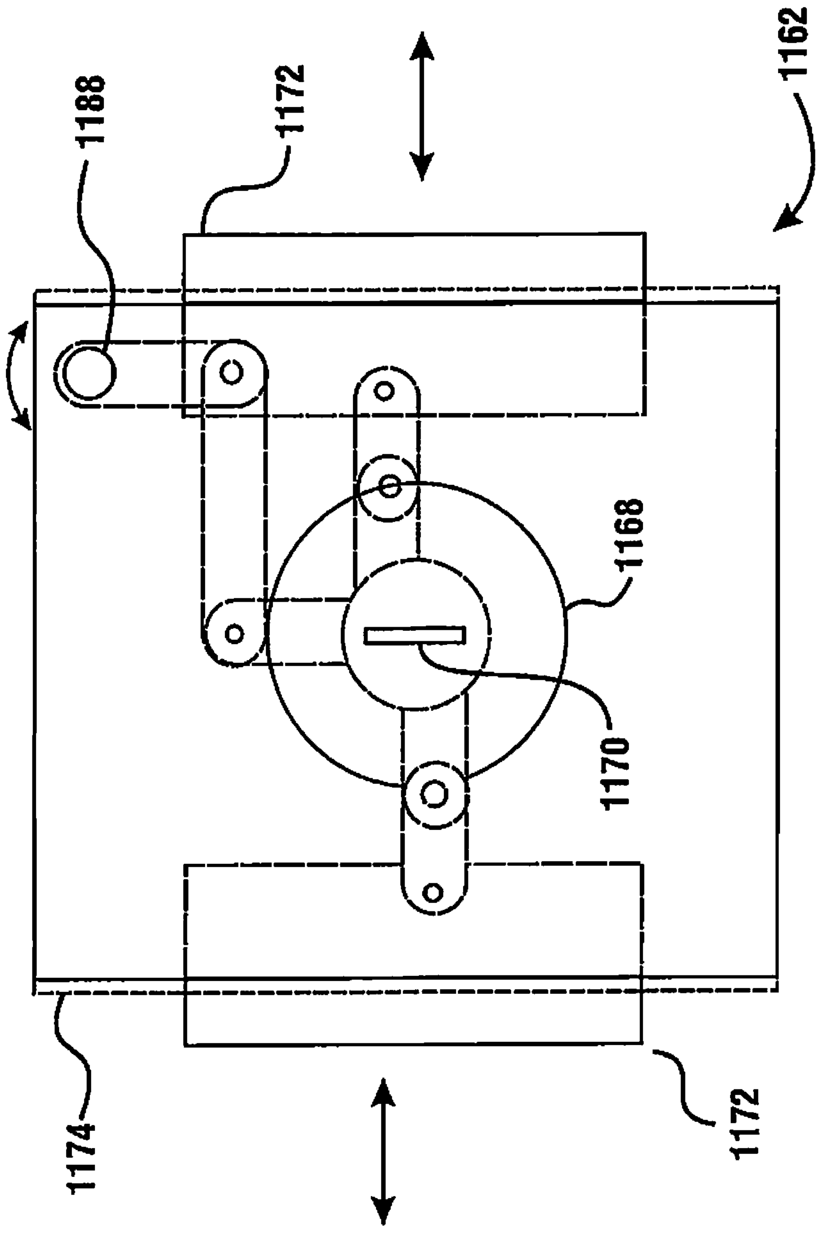
FIG. 53 is a plan view of an alternate door for the coin removal opening including an additional locking mechanism.

In some alternative arrangements, additional structures may be used in connection with locking the door in the closed position. Such an alternative arrangement is indicated schematically in FIGS. 51 and 53. The door shown in FIG. 53 is similar in most material respects to the embodiment of the door shown in FIG. 46. However, in this example embodiment the lock is also operative to cause rotation of a shaft 1188 when the lock is changed between the locked and unlocked conditions. In this exemplary embodiment the shaft 1188 is in operative connection with a movable arm 1190. Arm 1190 in the locked condition of the lock is operative to extend inwardly of an upward extending strike lug 1192. The operative engagement of the arm 1190 and strike lug 1192 in the locked condition of the lock prevents the door from being opened. When the lock is changed to the unlocked condition, the arm rotates so as to enable the door to be moved outward from the coin removal opening. Of course it should be understood that in some alternative arrangements, locking structures of this type may be used instead of, rather than in addition to, the bolt portions of the type described. Further, in other alternative arrangements, mechanisms which rely on lateral, rotational or other types of movement may be utilized. Further, other types of locking structures such as magnetic, electric or other types of mechanisms may be used.

In the exemplary arrangement, the housing 1154 includes thereon a card reader 1194. In example embodiments, the card reader operates to read data which corresponds to a user's financial account from a data bearing record that is provided by the user. In some arrangements, the card reader may be operative to read the card data on a magnetic stripe on a user's credit or debit card. In other embodiments, the card reader may be operative to read a chip card which includes an integrated circuit thereon. The integrated circuit may include data corresponding to stored value or alternatively may include additional data either for verifying the authenticity of the card or for identifying the user and/or an account.

In still other embodiments, the card reader may correspond to a contactless reader which operates to read wireless signals. Such wireless signals may include radio frequency (RF) signals, inductance signals or other radiation signals. In some example arrangements, the card reader may operate to read RF signals that are provided from a contactless card such as an RFID card or a card that includes a near field communication (NFC) chip which outputs data corresponding to a financial account. In still other arrangements, the card reader may be operative to read account data that is presented in a wireless manner from a circuit card included in a mobile phone, smartphone or other wireless device. This may include, for example, a card reader that can read account data transmitted via Bluetooth signals, NFC signals or other data which identifies an account. In addition, other arrangements may include input devices such as PIN pads, biometric readers, or other types of sensors that can receive data which identifies a user and/or their account. Inputs through such devices may provide additional factors which can help to verify that the operator of the machine is authorized to utilize the account to which the fees associated with operation of the machine are charged. In alternative arrangements the machine may read an output from a display of a smart phone which corresponds to an account or source of value. This may include, for example, a multi-dimensional bar code or a QR code. Alternatively the mobile device may include a reader usable to read indicia from the machine that is usable to provide a financial transfer. Approaches like those shown in U.S. Patent application 61/795,499 filed Oct. 18, 2012 may also be utilized in some arrangements, and the disclosure thereof is incorporated herein by reference in its entirety. Of course these arrangements are exemplary and in other embodiments other arrangements may be used.

In the exemplary machine, the coin holder housing has a flexible adhesive member which comprises a label 1194 attached thereto. In the example embodiment, the label is an adhesive label that extends around three sides of the card holder housing. The exemplary embodiment of the label is shown in greater detail in FIGS. 47 and 48. The exemplary label includes an electrically conductive trace 1196 that extends in a serpentine fashion about generally the entire surface of the label. The exemplary conductive trace is continuous across the label and extends to a pair of electrical contacts 1198. It should be understood, however, that although in the example arrangement a single continuous electronic trace is used, in other embodiments a plurality of conductive traces or other electrically conductive trace arrangements may be utilized to accomplish functions like those described hereafter.

In the example embodiment the label 1194 is an adhesive label that can be adhered to the coin holder housing 1154. The conductive trace 1196 is electrically isolated from the metal structure of the underlying housing by a suitable insulating coating such as a plastic coating so as to avoid any shorting of the trace when it is installed in engagement with the housing.

Figure 48:
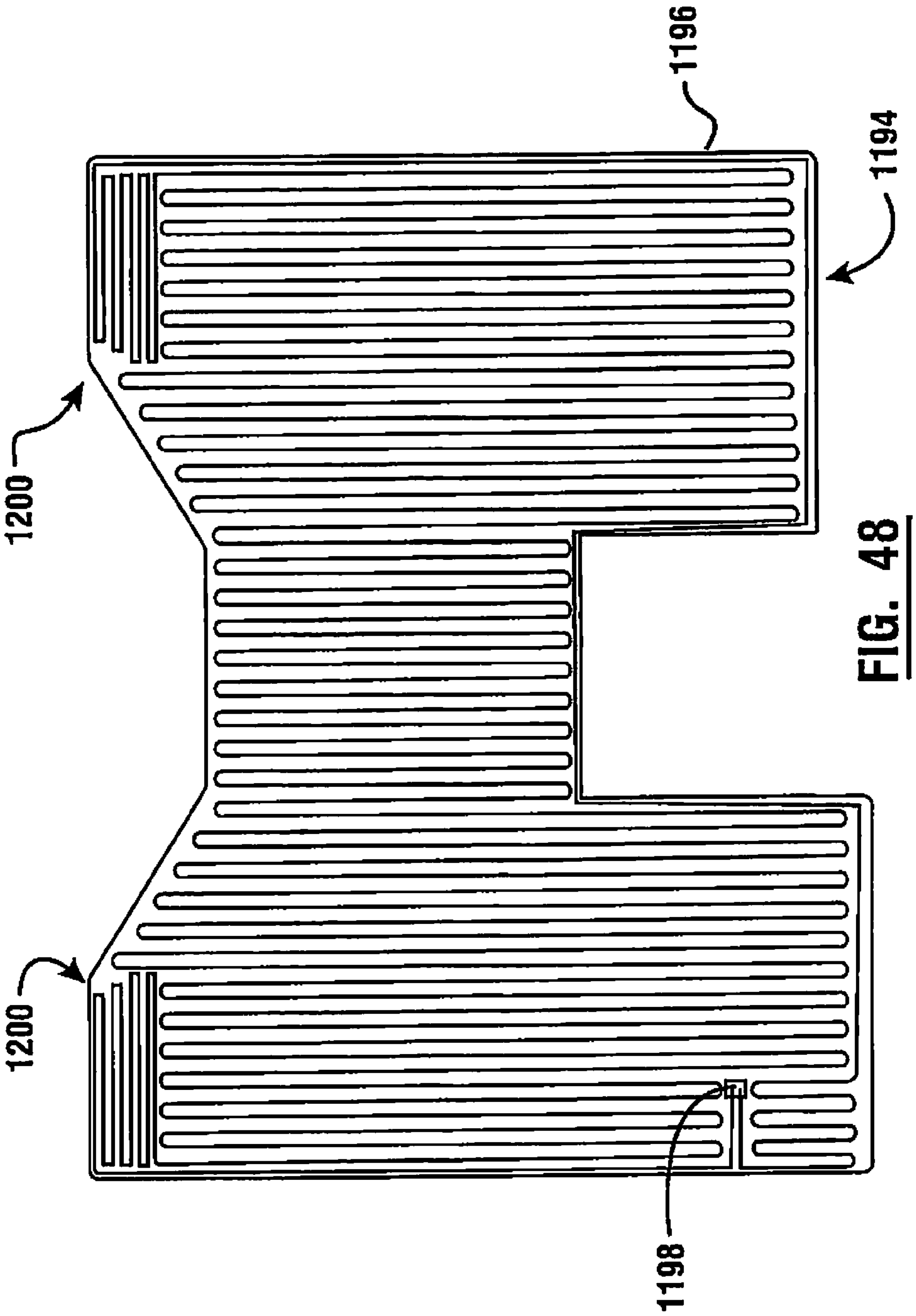
FIG. 48 is a plan view of the label shown in FIG. 47 displaying the opposite side, including an electrically conductive trace.

As can be seen in FIG. 48, the example conductive trace includes areas where the trace is thinned 1200. In these thinned areas of the trace, the trace is somewhat thinner than in the other areas. Further, the trace is arranged so as to extend generally perpendicular to the longitudinal lines of the trace away from the thinned areas.

Figure 43:
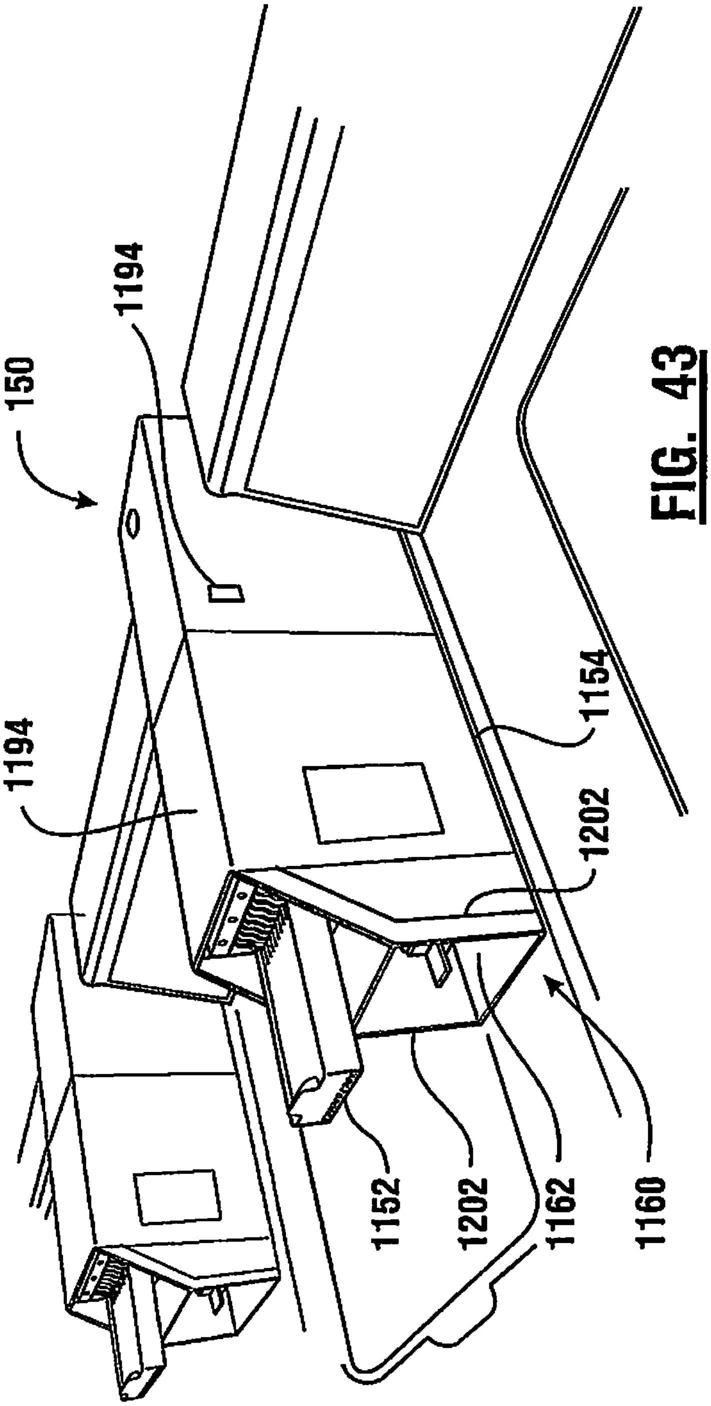
FIG. 43 is a partial isometric view of an alternative automated banking machine which in this embodiment is a vending terminal in the nature of a commercial laundry machine.

As can be seen from FIG. 43, these thin portions 1200 in the operative position of the label correspond to areas of the coin holder housing that overlie first areas 1202 that are disposed inside the housing and which extend interiorly of the coin removal opening. These first areas correspond to the inside of the coin holder housing which is adjacent to the lateral sides of the box portion 1164 of the door when the door is positioned to close the opening. In the example arrangement, the box portion 1164 is made from more rigid material or material that otherwise has a structure that is more difficult to deform than the overlying material of the coin holder housing.

As a result, as can be best appreciated from the enlarged view of the door and coin holder housing view represented in FIG. 49, if a criminal attempts to pry open the coin holder housing by extending a tool between the box portion 1164 and the wall of the coin holder housing 1154. The first areas 1202 will bow outward. This will be caused by the tool penetrating between the box portion and the first area bounding the interior of the housing adjacent thereto. The deformation of the wall of the coin holder housing is operative to cause a change in condition of the overlying trace in the thinned portion. Specifically deformation in this region will cause the thinned areas of the trace to break, thus breaking continuity. This change in condition can be detected by electrical circuitry in the manner described and used for purposes of generating signals to indicate an alarm. Alternatively changes in other properties that may correspond to attacks may be detected in alternative arrangements. Such properties may include for example, changes in resistance, current flow, impedance, capacitance, inductance or other electrical, magnetic, electromagnetic or other detectable properties.

In addition in the exemplary arrangement, the conductive trace which extends in generally surrounding relation of three sides of the coin holder housing may also be used to indicate different types of attacks. For example, if criminals drill a hole through the coin holder housing in order to gain access to the area of the coin holding tray portion, the trace in the area overlying the tray portion will be severed. This again can be detected causing the generation of signals to use an alarm or other indication of an attack. Likewise, efforts to tamper with the coin mechanism which is surrounded by the trace on three sides will be detected. Further, efforts to access circuitry housed within the coin holder housing can also be detected and alerts given so as to reduce the risk of criminal attack on the machine.

Figure 44:
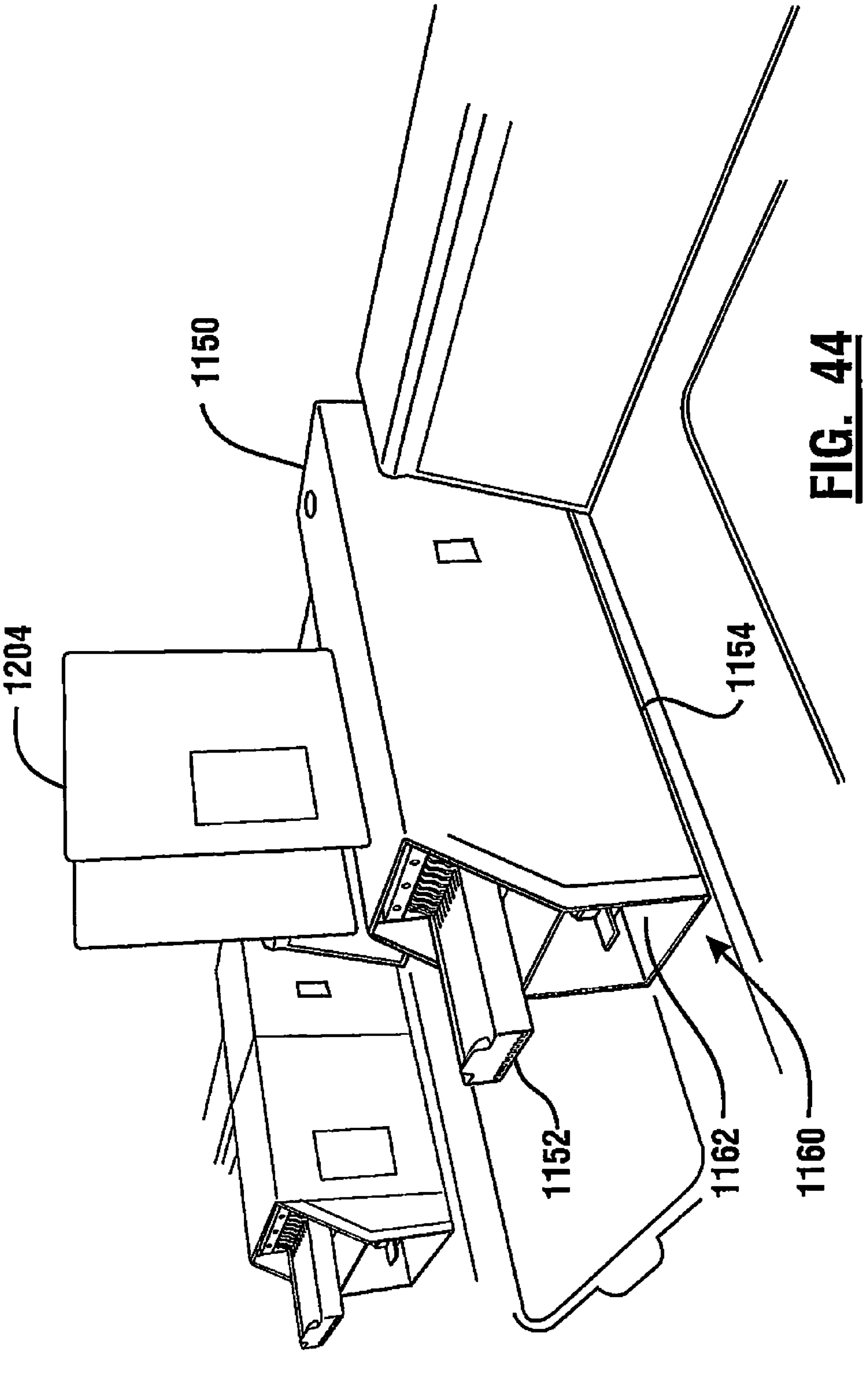
FIG. 44 is a view similar to FIG. 43 with the overlying adhesive label for the coin holder housing shown disposed upward from the housing.

Of course it should be understood that the configuration of label 1194 is exemplary. Other arrangements of labels and members including conductive traces may be used. An example of an alternative label 1204 is shown in FIG. 44. This alternative label is generally rectangular and extends to cover areas of the coin holder housing when moved downward and applied into the operative position. Alternatively different arrangements of flexible members or other conductive trace supporting structures may be utilized so as to detect intrusion into areas that are to be protected of the automated banking machine. This may include, for example, the provision of a plurality of members in different locations. Such members may also be positioned within the interior area of the housing rather than the exterior as represented in this example embodiment. Further alternative arrangements may include conductive trace structures within paint coatings or other items which are present in overlying or adjacent relation to structures to be protected. Further in some alternative arrangements, circuit cards or other structures in adjacent relation to the tray portion or other currency holding structures may include sensors that detect intrusion or tampering so as to provide an indication thereof. Of course these structures are exemplary and in other arrangements other structures may be used.

Figure 57:
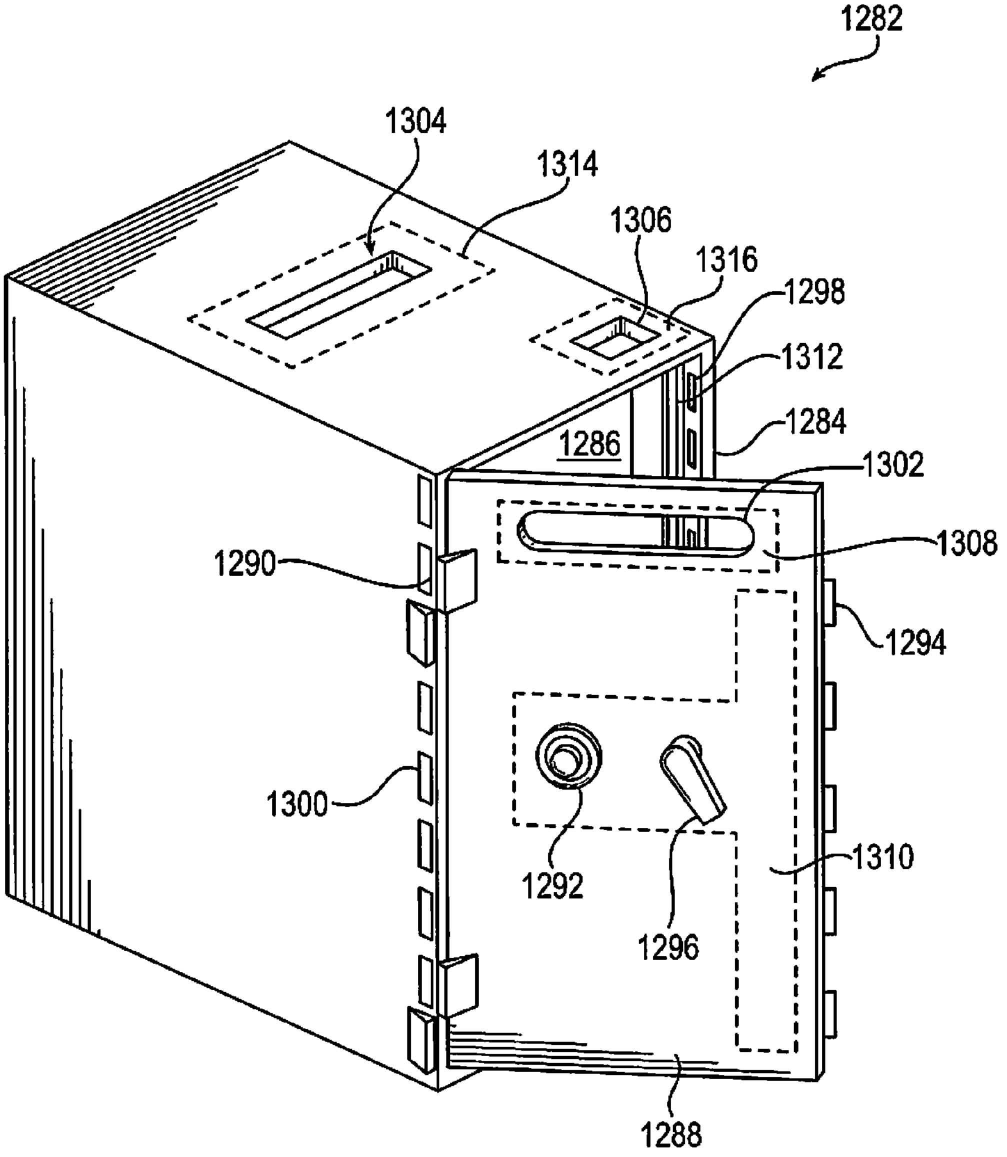
FIG. 57 is an isometric view of a housing including a chest portion of an alternative automated banking machine.

FIG. 57 shows an isometric view of a currency holding housing of an automated banking machine which in this embodiment is a secure chest 1282 of an automated banking machine. The exemplary chest may be part of a machine like those previously described which houses transaction function devices such as a currency dispenser, a currency acceptor, a bill recycler or other device which receives and/or stores currency. Exemplary arrangements may include currency housed in cassettes which can be removably positioned within an interior area of the chest in the manner similar to that previously described. Other arrangements may include other types of currency holding structures.

The exemplary chest 1282 includes a housing 1284. The housing includes an opening 1286. A door 1288 is movably mounted in operatively supported connection with the housing 1284 through hinges 1290. The exemplary chest includes a lock 1292 which is changeable between locked and unlocked conditions. In a locked condition the lock 1292 is operative to hold a boltwork 1294 in a locked condition so as to secure the chest door 1288 in a closed position. In an unlocked condition of the lock 1292, the boltwork is enabled to be moved through movement of a handle 1296 to enable opening the door.

In the exemplary arrangement the housing 1284 includes apertures 1298 that engage and hold the extending portions of the boltwork when the door 1288 is in the closed and locked condition. Further apertures 1300 are configured to accept extending portions of a deadbolt structure, which engages the apertures 1300 when the door is in a closed position. The exemplary chest further includes an opening 1302 which in the example arrangement extends through the door. Opening 1302 may in some arrangements serve as a opening through which currency such as bills may be dispensed from or received into the interior area of the chest. The example chest further includes an opening 1304 which extends through a top portion of the chest. Opening 1304 may be used for passing currency or other valuable items into or out of the chest. The exemplary chest may also include an opening 1306. Opening 1306 may be used for passing wires or other conduits between portions of the banking machine that extend outside the chest and those inside the chest. Of course it should be understood that this configuration and the openings shown are exemplary and in other embodiments, other openings may be used.

In the exemplary arrangement members including conductive elements may be positioned in operative connection with the chest for purposes of detecting attacks on areas of the chest. In exemplary embodiments, the members may include flexible adhesive members including suitable electrical trace elements and/or other sensors that are suitable for detecting, cutting, deforming, burning or other conditions that may represent an attack. For example in this exemplary arrangement a member 1308 is positioned adjacent to the currency opening 1302 which extends through the chest door. Thus, for example, efforts to deform the area of the currency opening or to cut into that area of the chest can be detected. Similarly one or more members 1310 may be positioned in areas adjacent to the lock 1392 and/or elements of the boltwork 1294. Such members may be positioned so that if criminals attempt to attack areas of the lock or boltwork by cutting, deformation or similar means, such activity can be detected via suitable circuitry and alarms given and/or other action automatically taken.

Other members may be positioned adjacent to the apertures into which the extending bolt portions of the boltwork are accepted. This may be done, for example, by positioning a member such as member 1312 adjacent to apertures 1298. Of course it should be understood that such members may be positioned adjacent to or within numerous different apertures or in other areas of the walls of the chest so as to detect attacks in those areas.

A member 1314 may be positioned in the chest adjacent to opening 1304. Alternatively or in addition, member 1314 or a separate member may extend on the walls of the chest which bound the through hole of the opening 1304. In this way prying devices in the opening or other cutting efforts to reach mechanisms therethrough can be detected. Similarly members such as member 1316 adjacent to opening 1306, can detect efforts to reach the interior of the chest therethrough as a result of cutting or prying activity therethrough. Of course it should be understood that these structures and approaches are exemplary, and in other embodiments other arrangements, structures and approaches may be used.

Figure 54:
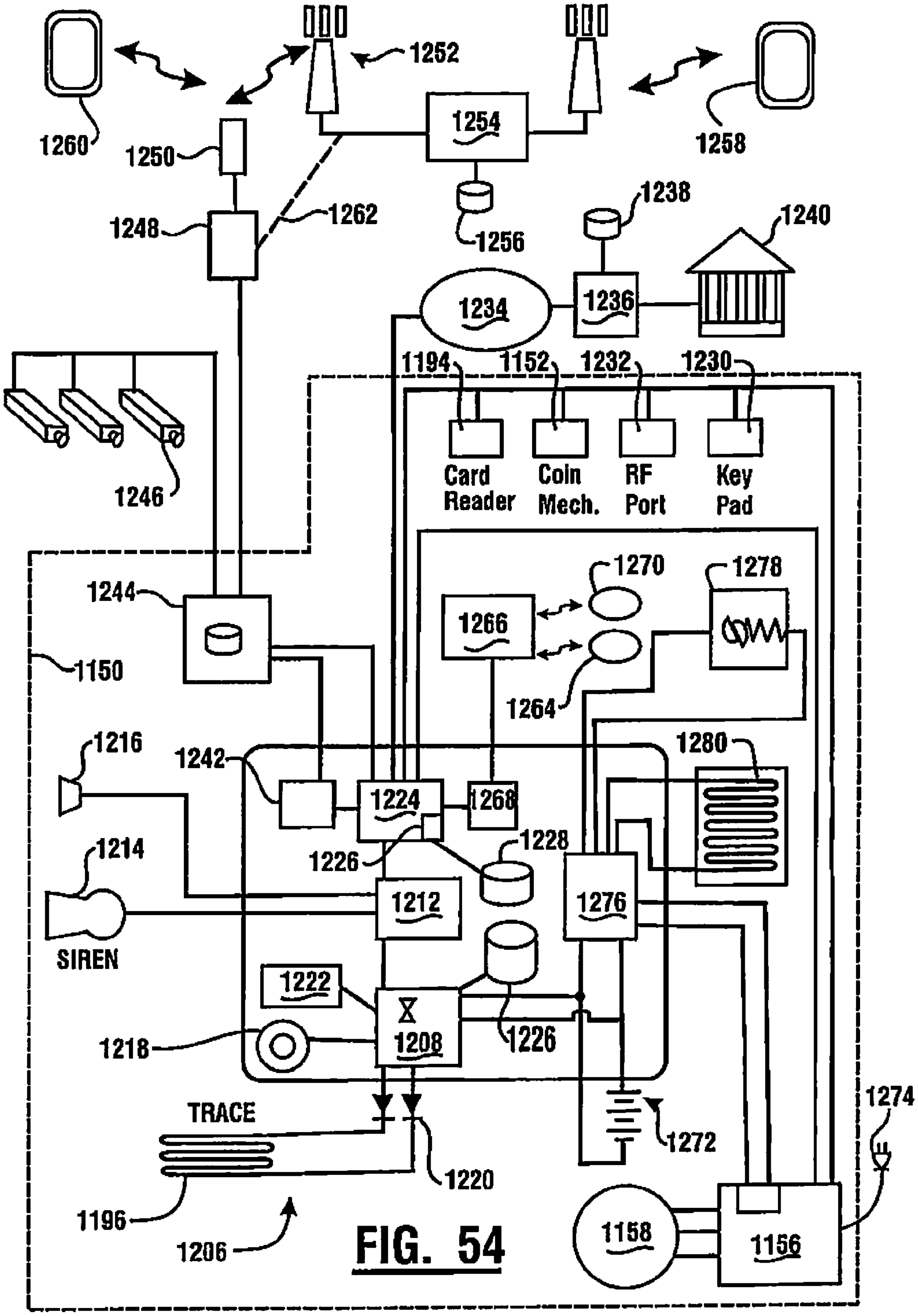
FIG. 54 is a schematic view of the components of the automated banking machine shown in FIG. 43 and components of an associated system in which the machine is operated.
Figure 55:
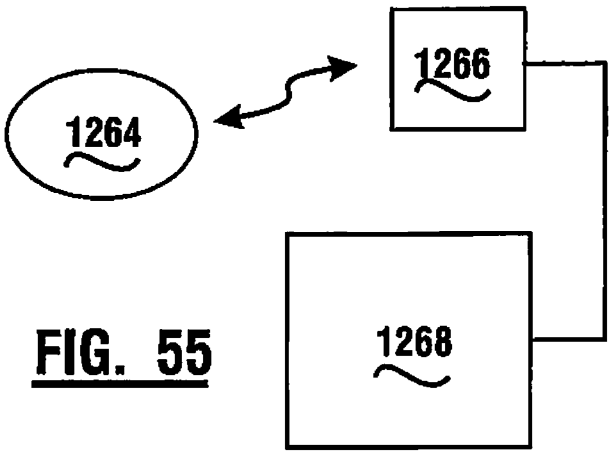
FIG. 55 is a schematic view of a generally coin sized token configured to be positioned in the tray portion and components which provide an indication that the token is removed from proximity to the coin holder housing.
Figure 56:
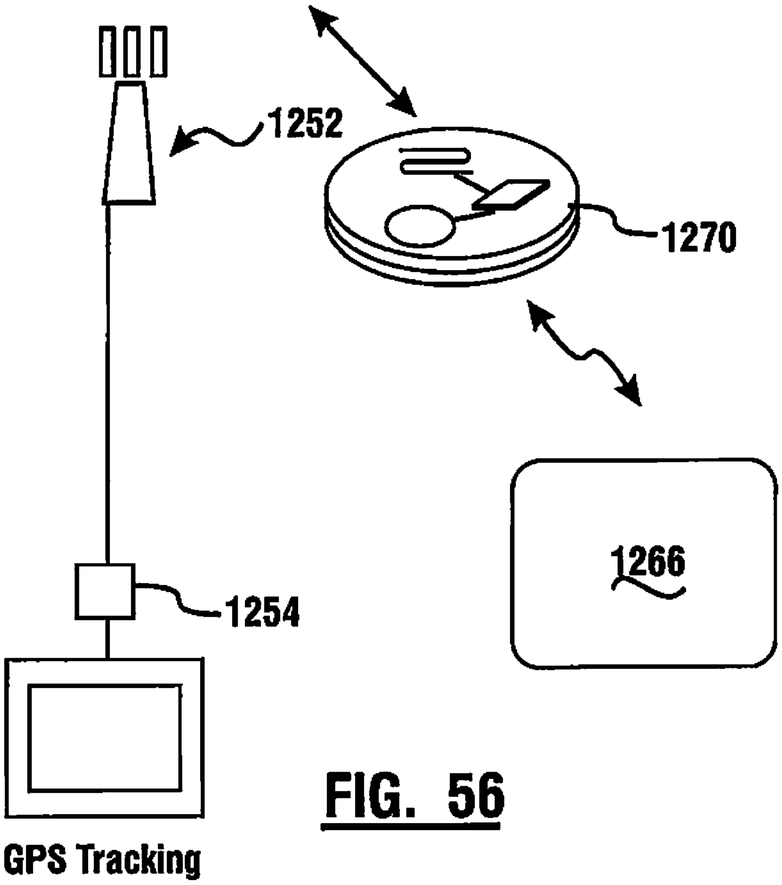
FIG. 56 is a schematic view of an alternative generally coin sized token including GPS tracking capabilities and associated component usable in connection with tracking of such token.

As represented in FIG. 54, the machine 1150 may include circuitry generally indicated 1206 which is operative to provide capabilities for protecting the security and integrity of the machine, as well as for facilitating the operation thereof.

In the exemplary arrangement, the circuitry includes one or more processors schematically indicated 1208 which is in operative connection with the trace. In the exemplary arrangement, the processor 1208 operates in accordance with programmed instructions stored in one or more data stores 1210. The programmed instructions are operative to cause the at least one processor 1208 to monitor the continuity condition of the trace 1196 and to cause at least one signal to be output in response to a change in condition of the trace. As indicated previously, in some arrangements the change in condition may be a break in continuity of a trace. In other arrangements the change in condition may correspond to a change in voltage, current, resistance or other property that may correspond to tampering with the machine.

In an exemplary arrangement, the at least one signal is output to alarm circuitry 1212. In the exemplary embodiment, the alarm circuitry may include one or more processors, device drivers, interfaces or other suitable items so as to cause the operation of an audio output device schematically indicated 1214. In the exemplary arrangement, the audio output device includes an electronic siren. The electronic siren operates in response to the at least one signal indicating the breaking of conductivity of the trace so as to indicate that an attack has occurred. In some arrangements, the siren may operate at such a high decibel level so as to cause the criminals to be forced to leave the area of the machine.

Further, in some example arrangements, at least one sensor 1216 may be in operative connection with the alarm circuitry 1212. In the example arrangement, the sensor 1216 comprises an audio sensor that operates to sense the sound signals from the audio output device as they are reflected from the environment in which the machine is installed. The sound signals sensed by the audio sensor 1216 cause signals to be sent to the alarm circuitry 1212 which operates to adjust the frequency and/or other output characteristics of the audio output device in response thereto. In the exemplary arrangement, the alarm circuitry 1212 operates to adjust the audio output so as to maximize the amplitude of the sound as sensed by the at least one audio sensor 1216. This enables the audio output device to achieve even higher effective decibel levels by capitalizing on the resonance properties of the environment. Thus the effective notice given by the audio output device and the amplitude of the sound that is generated may be more effective in forcing criminals to leave the area. Of course these approaches are exemplary and in other embodiments other arrangements may be used.

In the exemplary arrangement the circuitry associated with processor 1208 has in operative connection therewith, an arming switch schematically indicated 1218. In this example arrangement, the arming switch is a manually actuatable switch that a user may actuate to place the circuitry in condition to output an alarm in response to a change in condition of the trace. In some exemplary arrangements, the arming switch is in operatively supported connection with the movable door. This may be used in configurations where circuitry associated therewith is in operatively attached relation with the door. In such arrangements, the processor 1208 includes a time delay function which will not cause the output signal to be generated until after the expiration of a time delay period from when the arming switch is actuated. The processor 1208 performs this function in response to its programmed instructions. In an exemplary arrangement, this enables the arming switch to be manually actuated and the door to be placed in the closed position before the processor becomes operative to generate the signal in response to a sensed change in condition of the trace. This may provide time in some exemplary arrangements for the trace to be operatively connected to the at least one processor 1208 such as through a pair of connectors schematically indicated 1220. Of course this arrangement is exemplary and in other embodiments, other arrangements may be used.

The exemplary embodiment further includes a disarming switch 1222. The disarming switch is in operative connection with the at least one processor 1208. The disarming switch when actuated is operative to send at least one signal which causes the processor to operate so as to not output the at least one signal or to otherwise provide an output to prevent actions that would otherwise be caused by generation of the signal. In the exemplary embodiment if the at least one signal has been output and the audio output device 1214 is operating, actuation of the disarming switch 1222 is operative to cause the audio output device to cease operation. While in some exemplary embodiments the disarming switch may include a manually actuatable switch similar to the arming switch 1218, in other embodiments the disarming switch may be actuated in a contactless manner. This might be done, for example, using RF signals or other wireless signals that are produced by a device such as a portable terminal, cell phone, mobile device or other item that is in the possession of an authorized servicer. In some example embodiments, the disarming switch may be operated through an encrypted code or other secure communication protocol which enables only an authorized individual to prevent the operation of the audio output device or to shut it off after it has been actuated. Various approaches to suitable wireless communications that are encrypted and that provide authenticated data to assure that the audio output and other alarm indications are disabled only in response to an authorized individual may be used.

The example embodiment further includes at least one interface circuit 1224. The at least one interface circuit includes at least one processor 1226. The at least one processor 1226 is in operative connection with at least one data store 1228. The at least one data store 1228 includes programmed instructions associated with operation of the machine and/or the devices to which it is connected.

In the example embodiment, the at least one processor 1226 is in operative connection with the coin acceptor 1152.

In an example embodiment, the at least one processor may be operative to send signals to the machine control circuit 1156 so as to cause the machine to operate or to cease operation. In some example embodiments, the at least one processor 1226 may operate to cause the machine to operate responsive to the correct amount of value being input through the coin acceptor. However, in other embodiments, the coin acceptor may independently operate with the machine control circuitry 1156 so as to control operation of the machine. In still other embodiments, the at least one processor may operate to record events such as each operation of the machine, the amount and types of currency received, the times of machine operation, the number of hours or cycles that each machine has undergone and other data that may be useful in tracking operation or planning maintenance activities related to the machine. Of course these features are exemplary and in other embodiments, other features may be tracked.

In the exemplary embodiment, the at least one processor 1226 is in operative connection with the card reader 1994. As previously mentioned, the card reader is operative to read data bearing records that include card data which identifies a user account. In example embodiments, the machine may further include other types of input devices such as a keypad 1230 for receiving inputs from users. The keypad may be used for example for receiving instructions concerning operation of the machine. The keypad may also be used to provide identifying data such as a personal identification number (PIN). Such data may be useful when the charge associated with operating the machine is assessed to a debit card account or other account that requires additional identification factors beyond those that are read by the card reader. In some example embodiments the keypad may comprise a physical keypad while in alternative embodiments, input devices such as a touchscreen display may be used to perform this function. The example machine may also include an RF port 1232. The RF port 1232 may be suitable for receiving wireless communications associated with operation of the machine. These may include, for example, instructions to the machine that can be provided through a portable wireless device. Such instructions may include identifying data associated with identifying the user. Alternatively the RF port may receive inputs associated with operation of the machine. For example in some embodiments, the RF port may include the ability of receiving signals that cause performing the functions described in connection with the disarming switch 1222. Other example embodiments may include other types of input devices for users or authorized service personnel such as biometric input devices, wired network ports, radio antennas and the like.

In the example embodiment, a user desiring to operate the machine may provide account data through operation of the card reader 1194. For example, this may include the card reader operating to read account data from the magnetic stripe of the credit or debit card. It may alternatively receive card data wirelessly from a card, phone or other device. Responsive to reading of the card data, the at least one processor 1226 is operative to cause the interface circuitry 1224 to send messages including data corresponding to the card data into a suitable network schematically indicated 1244. The network may include a wired network or a wireless network for transmitting messages to and from the machine. In other embodiments, the network may be comprised of a local area network (LAN), a wide area network (WAN) or even the Internet. Suitable encryption is generally provided to provide security for the messages.

The at least one message corresponding to the card data is received through the network by at least one computer 1236. The computer is operative to determine if the card data corresponds to an authorized account. This is done using stored data included in at least one data store schematically represented 1238. If the card data and/or data corresponding to other user identifying inputs does not correspond to an authorized account and/or user, the computer 1236 is operative to dispatch at least one message to the machine indicating that the account is not authorized. In response to such a message, the at least one processor 1226 is operative not to cause the machine to operate. Alternatively if the data sent to the at least one computer 1236 corresponds to an authorized account and/or user data, at least one message indicating that the transaction is accepted is sent to the machine. The charge associated with the transaction is assessed to the user's account at a bank or other account holding entity schematically indicated 1240. Responsive to receipt of the at least one message indicating that the charge to the account is authorized, the at least one processor 1226 operates to allow the machine to operate. Of course, this approach is exemplary and in other example embodiments, other approaches may be used.

In some embodiments, wireless methods may be used for communicating account data or other transaction data associated with operation of the machine. These features and other features such as those may be utilized in connection with various example embodiments. Each of the following patents is incorporated herein by reference in its entirety: U.S. Pat. Nos. 7,657,473; 6,315,195; 6,702,181; 7,638,448; 7,040,533; 7,201,313; 7,216,800; 6,905,072; 7,207,477; 7,445,155; 7,712,656; 7,555,461; 7,959,077; 7,874,479; 8,052,050; 7,418,427; 6,796,490; 7,150,393; 7,025,256; 7,392,938; 7,461,779; 7,896,235; 7,686,213; 7,946,477; 7,992,776; 7,992,778; and 7,946,480; 8,302,856; and 8,317,092.

The exemplary at least one interface circuit 1224 is in operative connection with the processor 1208. The alarm circuitry 1212 is also in operative connection with a data reporting interface 1242. The reporting interface 1242 is in operative connection with image capture circuitry schematically represented 1244. The image capture circuitry 1244 is in operative connection with one or more cameras 1246. The image capture circuitry 1244 includes at least one processor and data store and is operative to capture data corresponding to images within the field of view of the one or more cameras. The video capture circuitry may be of the type that continually operates to capture images in a data store for a period of time until such image data is overwritten. The at least one processor of the image capture circuitry may operate in response to one or more signals to the reporting interface 1242 to store image data in more permanent storage or other data store that is not overwritten, responsive to signals that correspond to occurrence of an event that is sensed as occurring at the machine.

For example, in an example embodiment the generation of the at least one signal through operation of the processor 1208 may be indicative of the trace being severed due to an attack by criminals. In addition to causing operation of the at least one audio output device, the at least one signal may cause responsive to the programming of the processor 1226, the reporting interface to communicate with the image capture circuitry. Signals may be indicative of nature of the event which has occurred and at least one processor of the image capture circuitry may cause images from the cameras to be stored related to the time of the sensed event as well as for a period before and after the event. These captured images may correspond to the attack by the criminals on the machine. As a result, the stored data may show the criminal attack and the actions of the criminals in conducting the attack. Further, in exemplary embodiments signals may operate to indicate the area of the attack on the particular machine. This may cause the at least one processor in the image capture circuitry to cause particular cameras to point at and capture image data from particular areas. It may also cause cameras to zoom in, zoom out and pan toward an exit door or move so as to capture image data particularly from areas likely to show the criminal activity.

Further it should be understood that while the exemplary embodiment discusses a change in condition of the conductive trace as a triggering event for purposes of causing operation of the image capture circuitry, in other embodiments other events may also cause the image capture circuitry to operate. This may include, for example, capturing images of individuals operating the machine. This may be done in response to one or more switches or other sensors associated with coin acceptor mechanisms or other controls on the machine. Alternatively or in addition, images may be captured of users of the machine in response to inputs through the card reader, the RF port, keypad, biometric reader or other input devices on the machine, for example. Images may also be captured in response to the operation of the controls on the machine. Other sensors or triggering events may also occur so as to cause the capture of images either initially or in more permanent storage. Some example embodiments may use features of the type described in U.S. Pat. Nos. 7,533,805 and 7,533,806, the disclosures of which are incorporated herein by reference. Other example systems may include features like those described in U.S. Pat. Nos. 7,946,476 and/or 7,942,314, the disclosures of each of which are also incorporated herein by reference in their entirety.

In some example embodiments, data related to activities that are occurring at the machine may be sent to a remote monitoring system or to individuals responsible for security or operation of the machine. In other embodiments, information may be sent to security monitoring agencies, police or other authorities concerning events that occur at the machine. This is done in an example embodiment through suitable interfaces such as interface 1248. In some embodiments, interface 1248 is in operative connection with a wireless transceiver 1250. Transceiver 1250 may be operative responsive to one or more processors in the machine to cause data to be sent wirelessly through a wireless phone network or other type network indicated 1252. Communications through the wireless network may be received by one or more computers 1254 through appropriate interfaces. The one or more computers may be associated with a monitoring center and are in operative communication with one or more data stores 1256. The data stores include programmed instructions and other data associated with the various machines, locations or other items that may be monitored. The at least one computer 1254 may also include capabilities for receiving image data, displaying image data to user operators and/or storing and/or retransmitting image data to other systems.

In the exemplary embodiment messages may be communicated to the computer 1254 responsive to an attack on the particular machine. Messages to the computer 1254 may be operative to identify the particular location and/or machine subject to the attack. The data included in messages sent responsive to operation of one or more processors, may also include data representative of the nature of the attack or other condition. Communication from the machine to the computer 1254 may also include image data showing images of the machine images of areas including the criminals or other items that may potentially be of interest for purposes of monitoring the conditions at the machine or location.

The at least one computer may be operative responsive to data stored in the at least one data store 1256, to resolve data concerning entities to be notified of the particular condition. This may include, for example, system or network addresses associated with particular management personnel, governmental authorities or other entities that need to be notified. The computer, responsive to its programming, and/or in response to inputs from users, may operate to cause notification of the particular conditions to be sent to one or more remote devices schematically indicated 1258. Remote devices 1258 may be associated with individuals to be notified about the conditions. The messages to the remote devices may include information about what has occurred and where. The information may also include captured images or video showing conditions at the particular location.

Alternatively in other example embodiments, the transceiver 1250 may operate responsive to the one or more processors to cause communications directly to particular remote devices schematically indicated 1260. These remote devices may include a wireless device such as a cell phone or tablet computer carried by persons responsible for the facility where the machine is located. Thus individuals may receive status data, images or other appropriate data corresponding to conditions which occur at the location and/or at the machine.

It should be understood that while wireless communications have been described in connection with the transceiver and other messages, other example embodiments may communicate via wired network or other communications methodologies. This is represented by the phantom line 1262, which corresponds to wired communication lines or other suitable communications connections such as satellite communications, Internet connections or other suitable methodologies.

In some exemplary embodiments, data regarding normal operation of the machine may also be reported to and/or stored at a remote monitoring center. This may include, for example, data regarding current status of the machine such as whether it is operating or not. It may also include other data such as the number of operating cycles the machine has undergone within a given time frame or since a particular event. Reported data may also include statistics regarding funds received as coin via card transactions or other data. Captured images or other conditions related to the location may also be reported to the remote monitoring center. This may enable the remote monitoring center to keep track of whether the machines are operating properly, needs for repair of the machines, needs to conduct further repairs or other activities at machine locations, needs to remove funds from the machines or other activities. As can be appreciated, appropriate programming may be associated with a processor included in the machines or other devices so as to gather data corresponding to parameters of interest and to report this data to the one or more computers 1254 located at the monitoring location. As can be appreciated, such capabilities may enable individuals responsible for monitoring the machines to obtain this data either via automatic reporting or through periodic reports when certain events occur so that they can take appropriate action with regard to machines or machine locations.

Alternatively or in addition, one or more processors located in or in association with machines or locations may operate to compile data regarding the various parameters. Data may be stored in one or more data stores for transmission to designated users through the transceiver 1250. Thus for example in such embodiments certain events which occur such as attacks on machines or machine malfunctions may be reported to the devices associated with responsible managers automatically. Alternatively or in addition, other statistical data that may correspond to normal operation of the machines or facilities may be recovered from one or more data stores and reported and delivered to the device associated with the manager in response to or request therefor. This may enable a responsible manager to check the status of numerous machines and/or numerous locations from their portable wireless device periodically. This way a responsible manager may be able to determine that everything is operating properly and/or there are requirements to correct errors, cleaning, replenishment of supplies or other activities in connection with particular machines or at particular locations where machines are located. Of course these approaches are exemplary and in other embodiments other approaches may be used.

Other example embodiments of machines may include conditions for detecting unauthorized activities or attacks on particular machines. In some example embodiments, a generally coin sized token 1264 may be positioned in the coin holding tray. Token 1264 in some exemplary embodiments may include an RF transmitter such as an RFID tag, NFC chip or other suitable communication device.

The machine includes one or more RF sensors schematically indicated 1266. The at least one sensor 1266 is in operative connection with one or more suitable interfaces 1268. Interface 1268 is in operative connection with the at least one processor 1226.

In the exemplary embodiment, the at least one sensor and interface are operative to monitor for the presence of the token 1264 within the tray portion or other coin holding area within the machine. Removal of the token with the other coins such as during an attack is sensed through operation of the at least one sensor 1266. This change in condition is detected through operation of the interface 1268. The at least one processor then operates in accordance with its programming to identify the received signals from the interface as corresponding to an event of removal of the token from proximity to the machine. In exemplary embodiments the at least one processor then operates to cause the occurrence of this condition to be reported. As previously discussed, this condition can be reported by sending signals to one or more computers such as computer 1254 associated with a monitoring center. Alternatively such conditions may be reported directly to a portable device associated with an individual responsible for the machine for the facility in which the machine is located.

Thus, for example, in exemplary embodiments the tray portion may hold a token 1264 therein. The token may generally look like other coins or perhaps a pair of stacked coins. Individuals who have been trained and are authorized to remove coins from the machine may recognize the token and be sure that it is not removed from the vicinity of the machine. This might include, for example, a distance of several feet from the at least one sensor. Users who have been trained concerning the machine may make sure not to remove the token or at least not take it far from the machine. A criminal, however, who has broken into the coin holding housing will generally be in a hurry and will take all things that look like coins that are positioned therein. When the token 1264 is removed a sufficient distance from the machine, the at least one processor operates to generate at least one second signal. This at least one second signal causes communication corresponding to the condition sent to the appropriate remote computer or other device. Alternatively or in addition, generation of the at least one second signal may cause the audio output device 1214 to be operated. Likewise generation of the at least one second signal may cause the image capture circuitry to capture and/or deliver image data which will facilitate identifying the criminal activity or other event which caused removal of the token. Of course it should be understood that these approaches are exemplary and in other embodiments, other approaches may be used.

Other exemplary embodiments may include a further token 1270. Token 1270 may also be a generally coin sized token. In some embodiments the token 1270 may be the size of a single coin or alternatively may be sized to appear similar in configuration to several stacked coins.

The exemplary token 1270 includes an RF emitter which is capable of producing a GPS tracking signal. The GPS tracking signal may be sensed through operation of acting systems to determine its then current location.

In the exemplary embodiment, the sensor 1266 is included in a transceiver. The transceiver is operative to communicate with circuitry in the token 1270 so as to cause the GPS tracking signals to be output responsive to certain conditions. Such conditions may include signals that are generated in response to a change in condition of the trace. Alternatively or in addition, signals may be communicated responsive to other conditions that may correspond to an attack. These may include, for example, a situation where the door of the coin holder housing is changed to the open condition without an authorized user providing appropriate communications to the disarming switch. Alternatively or in addition, communication to the circuitry of the token may be operated responsive to remote communications of the machine. This may include, for example, an individual at the remote monitoring center observing that the machine is subject to an attack and sending communications that cause the RF emitter in the token to turn on.

This exemplary approach is used to conserve the capabilities of the battery that power the RF emitter in the token. Thus, for example, the batteries in the token may only be able to provide the RF emitter signal for a limited period of time. As a result operating the transceiver circuitry responsive to at least one processor to turn on the RF emitter only in cases where an attack has apparently occurred, will assure that the RF emitter signal can be sensed at least for a period of time after the attack so as to track the position of the criminals who have removed it for a reasonable time.

Further in some example arrangements, the transceiver circuitry may be operative to not only turn on the token to output the RF emitter signal, but also to turn it off. It may be needed, for example, in the event that operation of the RF emitter token is inadvertently triggered by authorized personnel servicing the machine. This may be done, for example, through communication from a wireless device such as through the RF port or through the input of suitable codes or other data through other input devices such as the keypad and/or the card reader. The input of codes that are generally not known to criminals or other suitable identification data may be used through operation of the at least one processor, to communicate with the token 1270 so as to cause the token to cease emitting RF signals. Of course these approaches are exemplary and in other embodiments other approaches may be used.

In some exemplary embodiments at least some of the circuitry in the machine is powered by at least one battery schematically indicated 1272. In some example embodiments battery power may be desirable for purposes of assuring that features of the machine such as the audio output device 1214 or the interface for arming the removable tokens and the like can be operated even when the machine control circuitry is disconnected from its normal power supply such as household current which is represented by the cord and plug 1274.

The exemplary embodiment includes charger control circuitry 1276. The charger control circuitry 1276 is in operative connection with the battery and one or more types of chargers. In the example embodiment shown, the charger control circuit is connected to the machine control circuit 1156. This provides a supply of electricity which should be used to keep the at least one battery charged. Additional types of battery chargers may also be connected in various embodiments. For example because the exemplary machine comprises a laundry machine which normally vibrates in the course of its operation, one form of battery charger includes a charger that operates to generate electricity in response to vibration. Such a charger schematically indicated 1278 may comprise a piezoelectric type charger that generates electricity responsive to the vibration of the machine. Alternatively or in addition, an inductance type charger may operate to cause movement of a body or other structures so as to generate electricity in response to the vibratory action of the machine.

In still other embodiments, the charger may include a device that uses ambient RF signals to produce electricity. This is represented by a charger 1280. Such a charger may be particularly effective in a high static environment such as where laundry machines are being used due to the presence of static, RF signals that are derived from fluorescent lights, motors and other sources of RF energy. Of course these types of battery chargers are exemplary.

In each case, the charger control circuit 1276 which includes one or more processors operates to monitor available power and maintain the one or more batteries 1272 which serve to power the alarm and reporting circuitry of the machine in a charged condition. Of course it should be understood that these approaches are exemplary and in other embodiments, other approaches may be used.

Thus the automated banking machines and systems of the exemplary embodiments may achieve one or more of the above stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

The invention claimed is:

1. Apparatus comprising:

an automated banking machine, including:

at least one processor, a coin holder housing, wherein the coin holder housing is configured to house a plurality of coins therein, wherein the coin holder housing includes a coin removal opening, a door that is movable relative to the coin holder housing, and is movable between a closed position wherein the door closes the coin removal opening and an open position wherein the door is disposed away from the coin removal opening, a lock that is in operative connection with at least one of the coin holder housing and the door, wherein the lock is changeable between locked and unlocked conditions, wherein in the locked condition the door is held in the closed position responsive at least in part to the lock, at least one electrically conductive trace that is in operatively attached connection to the at least one coin holder housing, wherein the at least one trace is in operative connection with at least one trace connected processor of the at least one processor, wherein the at least one trace connected processor is operative to cause at least one output signal responsive at least in part to a changed condition of the at least one trace.

2. The apparatus according to claim 1 and further comprising, a label, wherein the label is operatively attached to the coin holder housing, wherein the at least one trace extends in operatively supported connection with the label.

3. The apparatus according to claim 2, wherein in the closed position of the door, the door extends within the coin holder housing in a first area, wherein the label is operatively attached to an outside surface of the coin holder housing overlying the first area, whereby at least one trace extends adjacent the outside surface, wherein deformation of the outside surface causes the at least one trace to change condition.

4. The apparatus according to claim 3, wherein deformation of the outside surface causes the at least one trace to break electrical continuity of the trace.

5. The apparatus according to claim 4, wherein the label that includes the at least one trace extends in engagement with the coin holder housing in the at least one area away from the outside surface, wherein the at least one trace is relatively thinner in the first area, whereby the trace is relatively more readily broken responsive to deformation of the outside surface.

6. The apparatus according to claim 2, wherein the label comprises an adhesive label, and wherein the label and the at least one trace extends on at least two sides of the coin holder housing.

7. The apparatus according to claim 6, wherein the apparatus further comprises, a coin acceptor, wherein the label and the at least one trace overlies at least a portion of the coin acceptor.

8. The apparatus according to claim 1, and further comprising, a tray portion, wherein the tray portion is configured to hold a plurality of coins, wherein the tray portion is in fixed operative connection with the door.

9. The apparatus according to claim 1, and further comprising, an audio emitter, wherein the audio emitter is in operative connection with the at least one trace connected processor, and wherein the audio emitter is operative to provide sound output responsive at least in part to the at least one output signal.

10. The apparatus according to claim 9, and further comprising, at least one audio sensor, wherein the at least one audio sensor is in operative connection with at least one audio emitter connected processor, wherein the at least one audio emitter connected processor is operative responsive at least in part to the audio sensor to adjust output of the audio emitter to increase sound amplitude sensed through the audio sensor.

11. The apparatus according to claim 9, and further comprising, at least one battery, wherein the at least one battery is in operative connection with the audio emitter and the at least one trace connected processor.

12. The apparatus according to claim 11, wherein the machine further comprising, at least one battery charger, wherein the at least one battery charger includes at least one selected from a group consisting of a piezoelectric charger and an inductance charger, wherein the at least one charger is configured to provide energy for machine operation.

13. The apparatus according to claim 11, and further comprising a battery charger, wherein the battery charger includes a radio frequency (RF) charger.

14. The apparatus according to claim 1, wherein the machine comprises further comprising, a generally coin shaped token removably positioned within the coin holder housing, wherein the token includes an RF emitter operative to output at least one token signal.

15. The apparatus according to claim 14, and further comprising, at least one RF sensor, wherein the at least one RF sensor is operative to sense at least one signal output by the token, wherein the at least one RF sensor is in operative connection with at least one RF sensor connected processor, and wherein the at least one RF connected processor is operative responsive at least in part to at least one of the RF sensor sensing or not sensing the at least one token signal to cause output of at least one second signal.

16. The apparatus according to claim 15, wherein the at least one RF sensor connected processor is operative to output the at least one second signal responsive to the at least one RF sensor not sensing the at least one token signal.

17. The apparatus according to claim 14, wherein the at least one token signal comprises a GPS tracking signal.

18. The apparatus according to claim 1, wherein the at least one output signal is operative to cause at least one notification signal to be sent to a remote computer located at a facility remote from the machine.

19. Apparatus comprising:

an automated banking machine, including:

at least one processor, a housing that is configured to house currency, the housing includes an opening, wherein currency may be at least one of added to and removed from the housing through the opening, a door, wherein the door is movable relative to the housing, and wherein the door is movable between a closed position wherein the door closes the opening and an open position wherein the door is disposed away from the opening, a lock, wherein the lock is in operative connection with at least one of the housing and the door, wherein the lock is changeable between locked and unlocked conditions, wherein in the locked condition the door is held in the closed position responsive at least in part to the lock, at least one flexible adhesive member, wherein the member includes at least one electrically conductive trace, wherein the at least one trace is in operatively attached connection to the at least one housing, wherein the at least one trace is in operative connection with at least one trace connected processor of the at least one processor, wherein the at least one trace connected processor is operative to cause at least one output signal responsive at least in part to a changed condition of the at least one trace.

* * * * *